(12) United States Patent
Itoh et al.

(10) Patent No.: US 10,042,481 B2
(45) Date of Patent: Aug. 7, 2018

(54) TRANSPARENT ELECTROCONDUCTIVE LAMINATE AND TRANSPARENT TOUCH PANEL

(75) Inventors: Haruhiko Itoh, Hino (JP); Kouki Ikeda, Chiyoda-ku (JP)

(73) Assignees: TEIJIN LIMITED, Osaka (JP); TEIJIN CHEMICALS LTD., Tokyo (JP)

( * ) Notice: Subject to any disclaimer, the term of this patent is extended or adjusted under 35 U.S.C. 154(b) by 342 days.

(21) Appl. No.: 13/260,046

(22) PCT Filed: Mar. 31, 2010

(86) PCT No.: PCT/JP2010/055926
§ 371 (c)(1),
(2), (4) Date: Dec. 16, 2011

(87) PCT Pub. No.: WO2010/114056
PCT Pub. Date: Oct. 7, 2010

(65) Prior Publication Data
US 2012/0094071 A1    Apr. 19, 2012

(30) Foreign Application Priority Data

Mar. 31, 2009 (JP) ................. 2009-088185
Mar. 31, 2009 (JP) ................. 2009-088223

(51) Int. Cl.
*B32B 3/00* (2006.01)
*B32B 3/10* (2006.01)
(Continued)

(52) U.S. Cl.
CPC .............. *G06F 3/044* (2013.01); *G06F 3/045* (2013.01); *Y10T 428/24355* (2015.01);
(Continued)

(58) Field of Classification Search
CPC . G06F 3/044; G06F 3/045; B32B 3/00; B32B 3/10; B32B 5/16; H03K 17/975;
(Continued)

(56) References Cited

U.S. PATENT DOCUMENTS

2001/0037935 A1\* 11/2001 Oya et al. .............. 200/512
2002/0154100 A1\* 10/2002 Hatakeda et al. ....... 345/173
(Continued)

FOREIGN PATENT DOCUMENTS

EP    1 892 609 A1    2/2008
EP    1 947 551 A2    7/2008
(Continued)

OTHER PUBLICATIONS

Machine Translation of 08-240800. Sep. 17, 1996.\*
(Continued)

*Primary Examiner* — Nancy R Johnson
(74) *Attorney, Agent, or Firm* — Sughrue Mion, PLLC

(57) ABSTRACT

The present invention provides a transparent electroconductive laminate suitable for use in combination with a display device such as a liquid crystal display, and a transparent touch panel having the transparent electroconductive laminate. The transparent electroconductive laminate comprises a transparent organic polymer substrate 33 having, on at least one surface thereof, a hardcoat (HC) layer 33*h*, an optical interference layer 32, and a transparent electroconductive layer 31 in this order. The transparent electroconductive laminate satisfies the following conditions: the refractive indexes $n_3$ and $n_{3h}$ of the transparent organic polymer substrate and the HC layer satisfy the following formula: $|n_3 - n_{3h}| \leq 0.02$, the thickness of the HC layer is from 1 to 10 µm, the thickness of the optical interference layer is from 5 to 500 nm, the thickness of the transparent electroconductive layer is from 5 to 200 nm, the total light (Continued)

transmittance is 85% or more, and the b* value is from −1.0 to less than 1.5 and the transparent touch panel has the transparent electroconductive laminate.

21 Claims, 17 Drawing Sheets

(51) Int. Cl.
- *B32B 5/16* (2006.01)
- *H03K 17/96* (2006.01)
- *H03K 17/975* (2006.01)
- *G06F 3/044* (2006.01)
- *G06F 3/045* (2006.01)

(52) U.S. Cl.
CPC ............... *Y10T 428/24802* (2015.01); *Y10T 428/24893* (2015.01); *Y10T 428/24909* (2015.01)

(58) Field of Classification Search
CPC ............ H03K 17/96; Y10T 428/24893; Y10T 428/24802; Y10T 428/24909; Y10T 428/24355; Y10T 428/24372
USPC .................................................. 428/141, 143
See application file for complete search history.

(56) References Cited

U.S. PATENT DOCUMENTS

| | | | |
|---|---|---|---|
| 2006/0013967 | A1 | 1/2006 | Mikoshiba et al. |
| 2007/0252825 | A1* | 11/2007 | Nashiki et al. ............... 345/173 |
| 2008/0152879 | A1 | 6/2008 | Nashiki et al. |
| 2008/0176042 | A1* | 7/2008 | Nashiki et al. ............... 428/172 |
| 2008/0198446 | A1 | 8/2008 | Asakura et al. |
| 2009/0315849 | A1* | 12/2009 | Ito ................................. 345/173 |
| 2010/0289762 | A1 | 11/2010 | Ito et al. |

FOREIGN PATENT DOCUMENTS

| | | | |
|---|---|---|---|
| JP | 64-10507 | A | 1/1989 |
| JP | 6-99559 | A | 4/1994 |
| JP | 8-240800 | A | 9/1996 |
| JP | 10-24516 | A | 1/1998 |
| JP | 10-323931 | A | 12/1998 |
| JP | 2000-301648 | A | 10/2000 |
| JP | 2001-109388 | A | 4/2001 |
| JP | 2001-283644 | A | 10/2001 |
| JP | 2002-117724 | A | 4/2002 |
| JP | 2003-291274 | A | 10/2003 |
| JP | 2004-351744 | A | 12/2004 |
| JP | 2005-215283 | A | 8/2005 |
| JP | 2008-146927 | A | 6/2008 |
| JP | 2008-233882 | A | 10/2008 |
| JP | 2009-3354 | A | 1/2009 |
| JP | 2009-29108 | A | 2/2009 |
| JP | 2009-123685 | A | 6/2009 |
| KR | 10-2007-0017296 | A | 2/2007 |
| WO | 2004/057381 | A1 | 7/2004 |
| WO | 2005/114369 | A2 | 12/2005 |
| WO | 2008/088059 | A1 | 7/2008 |
| WO | WO 2008088059 | A1 * | 7/2008 |

OTHER PUBLICATIONS

Machine Translation of 2003-291274. Oct. 14, 2003.*
Extended European Search Report for Application No. 10758827.9 dated Oct. 17, 2013, 12 pages.

* cited by examiner

TRANSPARENT ELECTROCONDUCTIVE LAMINATE AND TRANSPARENT TOUCH PANEL

CROSS REFERENCE TO RELATED APPLICATIONS

This application is a National Stage of International Application No. PCT/JP2010/055926 filed Mar. 31, 2010, the contents of which are incorporated herein by reference in their entirety.

TECHNICAL FIELD

The present invention relates to a transparent electroconductive laminate for an electrode substrate of a transparent touch panel, and also relates to a transparent touch panel having the transparent electroconductive laminate.

BACKGROUND ART

Many kinds of transparent touch panels enabling interactive input have been put into practice as one of man-machine interfaces. Examples of the transparent touch panel include, for example, an optical-type, an ultrasonic-type, a capacitance-type and resistance film-type touch panels, according to a position-sensing system.

Such a transparent touch panel uses a transparent electroconductive laminate obtained by stacking a transparent electroconductive layer and the like on at least one surface of a transparent organic polymer substrate.

As the transparent organic polymer substrate, an organic polymer substrate having high transparency is used, and examples thereof include a cellulose-based film such as triacetyl cellulose (TAC) film, a polyester-based film such as polyethylene terephthalate (PET) film, a polycarbonate-based film, and an amorphous polyolefin-based film.

Such a transparent organic polymer substrate has a low surface hardness, and is susceptible to scratching, and therefore a resin layer, which is a hardcoat layer, is coated on a surface of the transparent organic polymer substrate. This hardcoat layer is known to be effective not only for protecting the surface of the transparent organic polymer substrate, but also for flattening the surface of the transparent organic polymer substrate by filling fine scratches thereon. With respect to the hardcoat layer, it is known to conform the refractive index of the hardcoat layer with the refractive index of the transparent organic polymer substrate, and thereby suppress coloring interference due to reflection at the interface between the hardcoat layer and the transparent organic polymer substrate (Patent Document 1).

A transparent metal oxide layer such as ITO (indium-tin oxide) is generally used as the transparent electroconductive layer. In the case of directly stacking such a transparent electroconductive layer on the transparent organic polymer substrate, coloration of light passing through the transparent electroconductive laminate occurs, for example, due to optical interference resulting from reflection at the interface between the substrate and the transparent electroconductive layer or at the interface between the transparent electroconductive layer and air, or due to light absorption by the transparent electroconductive layer itself. For example, with a transparent electroconductive layer having a film thickness of approximately from 20 to 30 nm that is generally employed, the transmitted light may be colored to a slightly brown-tinted color. Such coloration causes a change in the color hue on a display screen, and therefore is not preferred.

In order to solve this problem, by inserting an optical interference layer between a transparent electroconductive layer and a transparent organic polymer substrate suppression of reflection or the like due to the transparent electroconductive layer by using the interference effect can be obtained (see, for example, Patent Documents 2).

Among position-sensing systems for a touch panel, the resistance film-type touch panel has a simple structure and an excellent price/performance ratio, and therefore a most popular. The resistance film-type touch panel is an electronic component fabricated by holding two transparent substrates, which have transparent electroconductive layers respectively located on the opposing surface thereof, with a constant distance therebetween. By pressing a movable electrode substrate (electrode substrate on the viewing side) with a pen or a finger to sag the movable electrode substrate, contact and electrical conduction between the movable electrode substrate and a fixed electrode substrate (electrode substrate on the opposite side) are achieved, and a sensor circuit is then allowed to detect the position, thereby effecting a predetermined input.

Also, among position-sensing systems of the touch panel, the capacitance-type touch panel allows for multipoint sensing, and therefore is believed to be a promising technique in the future. According to the capacitance-type transparent touch panel, the position is sensed based on a change in the capacitance between patterned transparent electroconductive layer and a finger or the like, and a predetermined input is thereby performed.

With respect to the resistance film-type touch panel, a so-called analog-type touch using a non-patterned transparent electrode is conventionally used in general for a single-point sensing system, but in order to enable multipoint sensing, a device using a patterned transparent electrode has been also developed.

In the case where, as in these transparent touch panels for multipoint sensing, a patterned transparent electroconductive layer is used in a transparent touch panel, the transmittance or color tone of display light differs between a portion having the transparent electrical conductive layer and a portion not having it. This phenomenon causes the pattern of the electroconductive layer to be visually recognized, and thereby the display light is disturbed (hereinafter, the problem is sometimes referred to "skeleton visibility").

In order to suppress the skeleton visibility, it is known, for example, to use a relatively thin transparent electroconductive layer (Patent Document 7), or to provide, between a transparent electroconductive layer and the underlying hardcoat layer, a layer having a refractive index intermediate between refractive indexes of these layers (Patent Document 8).

Incidentally, a transparent organic polymer substrate for a transparent electroconductive laminate, when as-is used, lacks the lubricity for handling, and therefore a lubricating layer having an uneven surface is generally used to enhance the lubricity. However, in the case of improving the lubricity by an uneven surface, diffused light reflection occurs on the surface, and this decreases the transparency and increases haze. Accordingly, it is very important to provide an organic polymer substrate having excellent lubricity, while maintaining high transparency and small haze.

As a general technique for forming a lubricating layer on a transparent organic polymer substrate, it is known to incorporate, in a resin, fine particles having a submicron particle diameter, for example, inorganic particles such as silica particles, calcium carbonate particles and kaolin particles, and/or an organic particles such as silicone particles and crosslinked polystyrene particles, and thereby form a lubricating layer from such fine particle-containing resin (Patent Documents 3 and 4).

However, in the case of using a lubricating layer formed from a resin containing fine particles having a submicron particle diameter, light is scattered by such fine particles contained in the resin, and thereby the transparency or haze characteristics of the obtained transparent organic polymer substrate are impaired.

In this regard, some degree of transparency and low haze may be realized by decreasing the amount of the fine particles contained in the resin. However, in such a case, it is sometimes difficult to obtain sufficient lubricity.

Also, in the case of using a lubricating layer formed from a resin containing fine particles having a submicron particle diameter, when a writing durability test is performed, particles that form the protrusions on the surface of the transparent electroconductive layer of the electrode substrate sometimes scatter in the touch panel. The thus-scattered fine particles may prevent electrical connection between a movable electrode substrate and a fixed electrode substrate, and thus deteriorate the electrical characteristics of the touch panel. Furthermore, the scattered fine particle may damage the transparent electroconductive layers of the movable electrode substrate and the fixed electrode substrate, and thus deteriorate the electrical characteristics of the touch panel.

In order to solve these problems, for example, Patent Documents 5 and 6 have proposed to form, on a transparent substrate film used as a transparent organic polymer substrate, an anchor layer having an uneven surface, which is formed of a resin containing ultrafine particles having an average primary particle diameter of 1 to 30 nm, and provide a transparent electroconductive layer thereon to obtain a transparent electroconductive film.

By disposing an anchor layer having an uneven surface on a transparent substrate film, sticking due to adherence of films is prevented in the resistance film-system touch panel. However, in order to allow the anchor layer to have an uneven surface by using ultrafine particles having an average particle diameter of 1 to 30 nm, a relatively large amount of ultrafine particles are contained in the anchor layer. Therefore, it is understood that the anchor layer has a relatively large haze value.

RELATED ART

Patent Document

Patent Document 1: JP-A-2003-291274
Patent Document 2: JP-A-2000-301648
Patent Document 3: JP-A-2001-109388
Patent Document 4: JP-A-H06-99559
Patent Document 5: JP-A-2001-283644
Patent Document 6: JP-A-2002-117724
Patent Document 7: JP-A-S64-10507
Patent Document 8: JP-A-H08-240800

SUMMARY OF THE INVENTION

Problems to be Solved by the Invention

An object of the present invention is to provide a transparent electroconductive laminate, which is suitable for use in combination with a display device such as liquid crystal display (LCD) and organic EL display. Another object of the present invention is to provide a transparent touch panel having such a transparent electroconductive laminate.

Means for Solving the Problems

As a result of intensive investigation, the present inventors have found that, in a transparent electroconductive laminate fabricated by stacking a hardcoat layer, an optical interference layer and a transparent electroconductive layer in this order on at least one surface of a transparent organic polymer substrate, a transparent electroconductive laminate suitable for use in combination with a display device can be obtained by, for example, decreasing the difference between the refractive index of the transparent organic polymer substrate and the refractive index n of the hardcoat layer. The first present invention including the following <A1> to <A12> has been accomplished based on this finding.

<A1> A transparent electroconductive laminate,
wherein the laminate comprises a transparent organic polymer substrate which has, on at least one surface thereof, a hardcoat layer, an optical interference layer, and a transparent electroconductive layer in this order, and
wherein the laminate satisfies the following conditions (A-a) to (A-f):
(A-a) the refractive index $n_3$ of the transparent organic polymer substrate and the refractive index $n_{3h}$ of the hardcoat layer satisfy the following formula:

$$|n_3 - n_{3h}| \leq 0.02$$

(A-b) the thickness of the hardcoat layer is from 1 to 10 μm,
(A-c) the thickness of the optical interference layer is from 5 to 500 nm,
(A-d) the thickness of the transparent electroconductive layer is from 5 to 200 nm,
(A-e) the total light transmittance is 85% or more, and
(A-f) the chromaticness index b* value of the L*a*b* color system is from −1.0 to less than 1.5.

<A2> The transparent electroconductive laminate according to <A1> above, wherein the laminate further satisfies following conditions (A-g):
(A-g) with respect to the reflection spectrum measured by projecting light having a wavelength of 450 to 700 nm from the transparent electroconductive layer side of the transparent electroconductive laminate, the difference spectrum between the reflection spectrum of the transparent electroconductive laminate and the reflection spectrum obtained when the transparent electroconductive layer is removed from the transparent electroconductive laminate satisfies following conditions (A-g1) and (A-g2):
(A-g1) the maximum absolute value of the difference spectrum is 3.0% or less, and
(A-g2) the integrated value of the difference spectrum is from −200 nm·% to 200 nm·%.

<A3> The transparent electroconductive laminate according to <A1> or <A2> above, wherein (A-h) the transparent electroconductive layer is disposed only on a part of the optical interference layer to form a patterned transparent electroconductive layer.

<A4> The transparent electroconductive laminate according to any one of <A1> to <A3> above, wherein (A-i) the optical interference layer is stacked directly on the hardcoat layer.

<A5> The transparent electroconductive laminate according to any one of <A1> to <A4> above, wherein the optical interference layer contains a cured resin component and first ultrafine particles having an average primary particle diameter of 100 nm or less.

<A6> The transparent electroconductive laminate according to any one of <A1> to <A5> above, wherein the laminate further satisfies the following conditions (A-p) to (A-r):

(A-p) the optical interference layer contains a resin component and first ultrafine particles having an average primary particle diameter of 1 to 100 nm, (A-q) the resin component and the first ultrafine particles contain the same metal and/or metalloid element, and (A-r) in the optical interference layer, the content of the first ultrafine particles containing the same metal and/or metalloid element as the resin component is from 0.01 to 3 parts by mass per 100 parts by mass of the resin component.

<A7> The transparent electroconductive laminate according to <A6> above, wherein the transparent electroconductive layer has from 10 to 300 protrusions having a height of 30 to 200 nm per 50 μm square.

<A8> The transparent electroconductive laminate according to <A6> or <A7> above, wherein the surface roughness Ra of the transparent electroconductive layer is 20 nm or less.

<A9> The transparent electroconductive laminate according to any one of <A6> to <A8> above, wherein the laminate has a haze of 2% or less.

<A10> The transparent electroconductive laminate according to any one of <A6> to <A9> above, wherein the metal and/or metalloid element is/are one or more elements selected from the group consisting of Al, Bi, Ca, Hf, In, Mg, Sb, Si, Sn, Ti, Y, Zn and Zr.

<A11> A resistance film-type transparent touch panel, comprising two transparent electrode substrates each having a transparent electroconductive layer on at least one surface thereof, and disposed by arranging respective transparent electroconductive layers to face each other, wherein the laminate according to any one of <A1> to <A10> above is used as at least one of the transparent electrode substrates.

<A12> A capacitance-type transparent touch panel, comprising the transparent electroconductive laminate according to any one of <A1> to <A10> above, wherein the transparent electroconductive layer is disposed only on a part of the optical interference layer to form a patterned transparent electroconductive layer.

<A13> The transparent touch panel according to <A11> or <A12> above, wherein, on the observation side of the transparent touch panel, a polarizing plate is stacked on the transparent electroconductive laminate directly or through another substrate.

Also, as a result of intensive investigation, the present inventors have found that, in a transparent electroconductive laminate fabricated by stacking a cured resin layer and a transparent electroconductive layer in this order on at least one surface of a transparent organic polymer substrate, the skeleton visibility problem can be supressed when reflection spectrum measured by projecting light from the transparent electroconductive layer side satisfies specific conditions. The skeleton visibility problem is due the pattern of the transparent electroconductive layer of a transparent touch panel being visually recognized, and thereby the display light can not be viewed very well. The second present invention including the following <B1> to <B14> has been accomplished based on this finding.

<B1> A transparent electroconductive laminate, wherein the laminate comprises a transparent organic polymer substrate which has, on at least one surface thereof, a cured resin layer, and a transparent electroconductive layer in this order, and wherein, with respect to the reflection spectrum measured by projecting light having a wavelength of 450 to 700 nm from the transparent electroconductive layer side of the transparent electroconductive laminate, the difference spectrum between the reflection spectrum of the transparent electroconductive laminate and the reflection spectrum obtained when the transparent electroconductive layer is removed from the transparent electroconductive laminate satisfies the following conditions (B-a1) and (B-a2):

(B-a1) the maximum absolute value of the difference spectrum is 3.0% or less, and (B-a2) the integrated value of the difference spectrum is from −200 nm·% to 200 nm·%.

<B2> The transparent electroconductive laminate according to <B1> above, wherein the following conditions (B-b1) to (B-b3) are further satisfied, assuming that the refractive index of the transparent organic polymer substrate is $n_3$, the thickness and refractive index of the cured resin layer are $d_2$ (nm) and $n_2$, respectively, and the thickness and refractive index of the transparent electroconductive layer are $d_1$ (nm) and $n_1$, respectively:

$$n_1 > n_2 > n_3, \qquad \text{(B-b1)}$$

$$0.44 < n_2/(n_1+n_3) < 0.49, \qquad \text{(B-b2)}$$

and $$245 < n_2 d_2/(n_1 d_1)^{-0.12} < 275. \qquad \text{(B-b3)}$$

<B3> The transparent electroconductive laminate according to <B1> or <B2> above, wherein the laminate further satisfies the conditions (B-c) to (B-f):

(B-c) the cured resin layer contains a resin component and first ultrafine particles having an average primary particle diameter of 1 to 100 nm, (B-d) the resin component and the first ultrafine particles contain the same metal and/or metalloid element, (B-e) in the cured resin layer, the content of the first ultrafine particles is from 0.01 to 3 parts by mass per 100 parts by mass of the resin component, and (B-f) the thickness of the cured resin layer is from 0.01 to 0.5 μm.

<B4> The transparent electroconductive laminate according to <B3> above, wherein (B-g) the cured resin layer further contains second ultrafine particles having an average primary particle diameter of 1 to 100 nm and having a refractive index larger than that of the resin component.

<B5> The transparent electroconductive laminate according to <B4> above, wherein the cured resin layer contains the second ultrafine particles, and thereby the refractive index of the cured resin layer is increased by 0.01 or more, in comparison with that of the cured resin layer not containing the second ultrafine particles.

<B6> The transparent electroconductive laminate according to any one of <B3> to <B5> above, wherein the transparent electroconductive layer has from 10 to 300 protrusions having a height of 30 to 200 nm per 50 μm square.

<B7> The transparent electroconductive laminate according to any one of <B3> to <B6> above, wherein the surface roughness Ra of the transparent electroconductive layer is 20 nm or less.

<B8> The transparent electroconductive laminate according to any one of <B1> to <B7> above, wherein the laminate has the total light transmittance of 85% or more and the haze of 2% or less.

<B9> The transparent electroconductive laminate according to any one of <B3> to <B8> above, wherein the metal and/or metalloid element is/are one or more elements selected from the group consisting of Al, Bi, Ca, Hf, In, Mg, Sb, Si, Sn, Ti, Y, Zn and Zr.

<B10> The transparent electroconductive laminate according to any one of <B1> to <B9> above, wherein the laminate comprises an additional cured resin layer between the transparent organic polymer substrate and the cured resin layer.

<B11> The transparent electroconductive laminate according to <B10> above, wherein the additional cured resin layer has the surface roughness Ra of from 20 nm to less than 500 nm.

<B12> The transparent electroconductive laminate according to any one of <B3> to <B11> above, wherein an adhesive layer is provided between the transparent electroconductive layer and the cured resin layer, and wherein all of the adhesive layer, the resin component of the cured resin layer, and the ultrafine particles of the cured resin layer contain the same metal and/or metalloid element.

<B13> A capacitance-type transparent touch panel, comprising at least one transparent electrode substrate having a transparent electroconductive layer on at least one surface thereof, wherein the transparent electroconductive laminate according to any one of <B1> to <B10> and <B12> above is used as the at least one transparent electrode substrate.

<B14> A resistance film-type transparent touch panel, comprising two transparent electrode substrates each having a transparent electroconductive layer on at least one surface thereof, and disposed by arranging respective transparent electroconductive layers to face each other, wherein the transparent electroconductive laminate according to any one of <B1> to <B12> above is used as at least one of the transparent electrode substrates.

<B15> The transparent touch panel according to <B13> or <B14> above, wherein, on the observation side of the transparent touch panel, a polarizing plate is stacked on the transparent electroconductive laminate directly or through another substrate.

Effect of the Invention

According to the present invention, a transparent electroconductive laminate suitable for use in combination with a display device is provided. Also, according to the present invention, a transparent touch panel having a transparent electroconductive laminate, particularly a resistance film-type or a capacitance-type transparent touch panel, is provided.

More specifically, the transparent electroconductive laminate of the first present invention is fabricated by stacking a hardcoat layer, an optical interference layer and a transparent electroconductive layer in this order on at least one surface of a transparent organic polymer substrate. According to the laminate, due to a small difference between the refractive index of the transparent polymer substrate and the refractive index of the hardcoat layer, a color tone suitable for use in combination with a display device can be obtained.

Also, the transparent electroconductive laminate of the second present invention can prevent, in a transparent touch panel using the transparent electroconductive laminate, the pattern of the transparent electroconductive layer being visually recognized, and thereby the display light can not be viewed very well, that is, the skeleton visibility problem.

MODE FOR CARRYING OUT THE INVENTION

The embodiments for carrying out the present invention are described below, but the present invention is not limited to the following description.

First Present Invention

Figure 3:
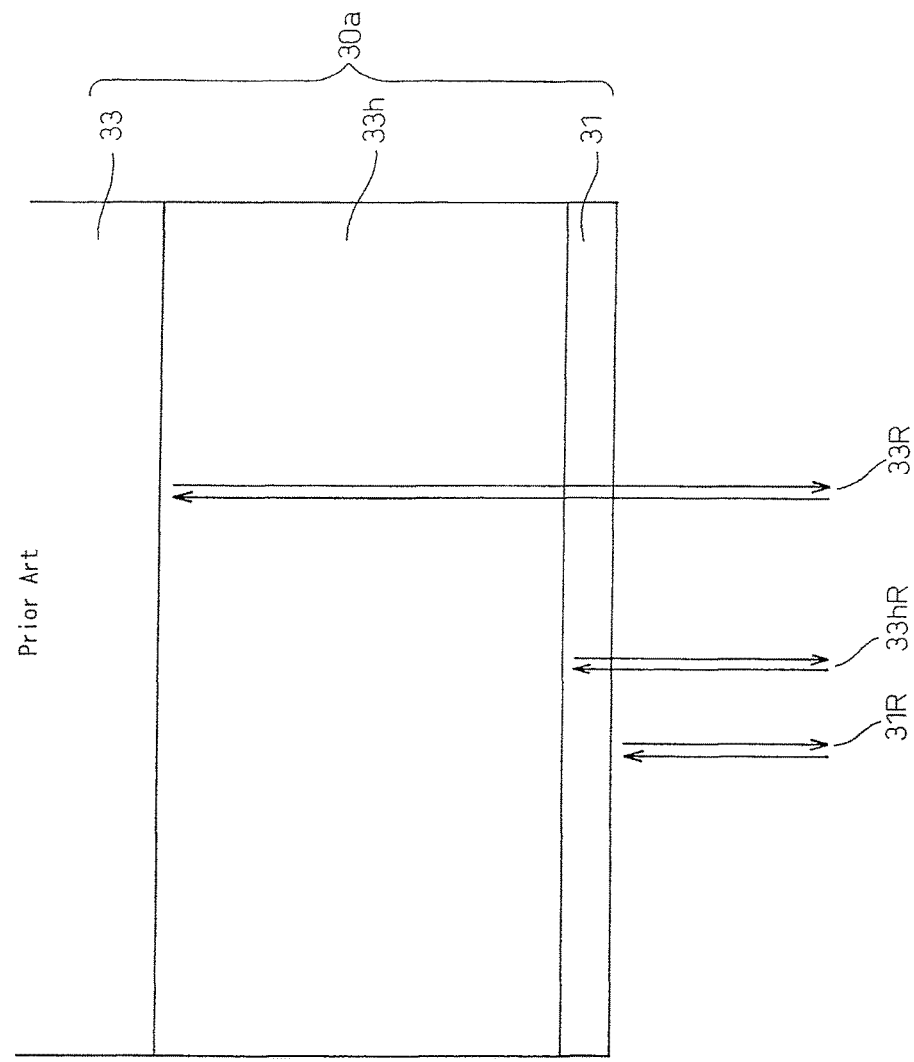
FIG. 3 A view for explaining a conventional transparent electroconductive laminate.

As described above, conventionally, a resin layer called as a hardcoat layer is provided on a surface of a transparent organic polymer substrate. That is, as shown in FIG. 3, a hardcoat layer 33h and a transparent electroconductive layer 31 are sequentially stacked on at least one surface of a transparent organic polymer substrate 33 to provide a transparent electroconductive laminate 30a.

Figure 4:
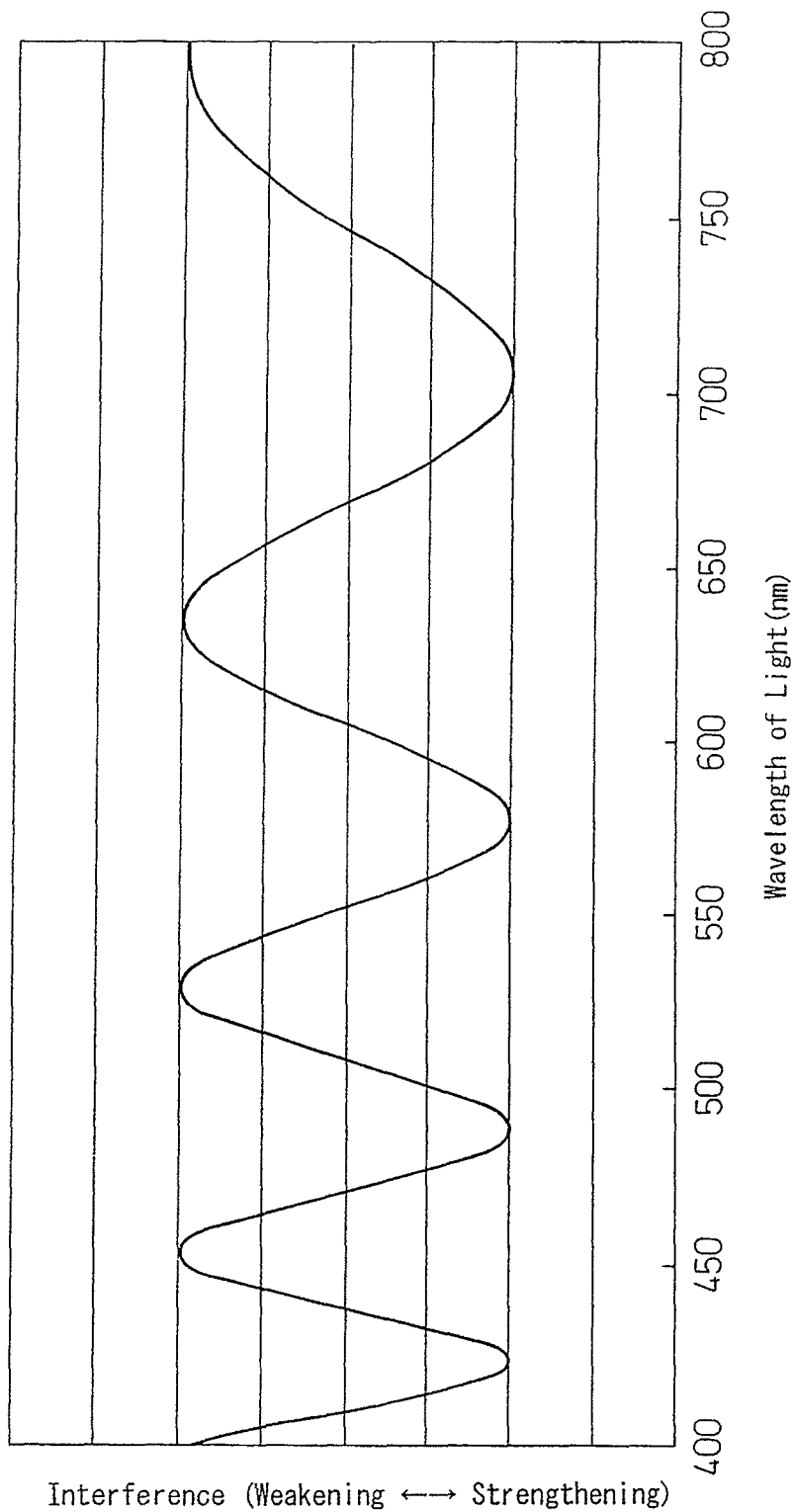
FIG. 4 A view for explaining interference in the conventional transparent electroconductive laminate of FIG. 3.

However, as described in Patent Document 1, the hardcoat layer 33h is known to produce an interference color due to interference between reflection 33R on the surface of the transparent organic polymer substrate 33 and reflection 31R on the surface of the transparent electroconductive layer 31. This interference effect is, for example, as shown in FIG. 4.

Figure 5:
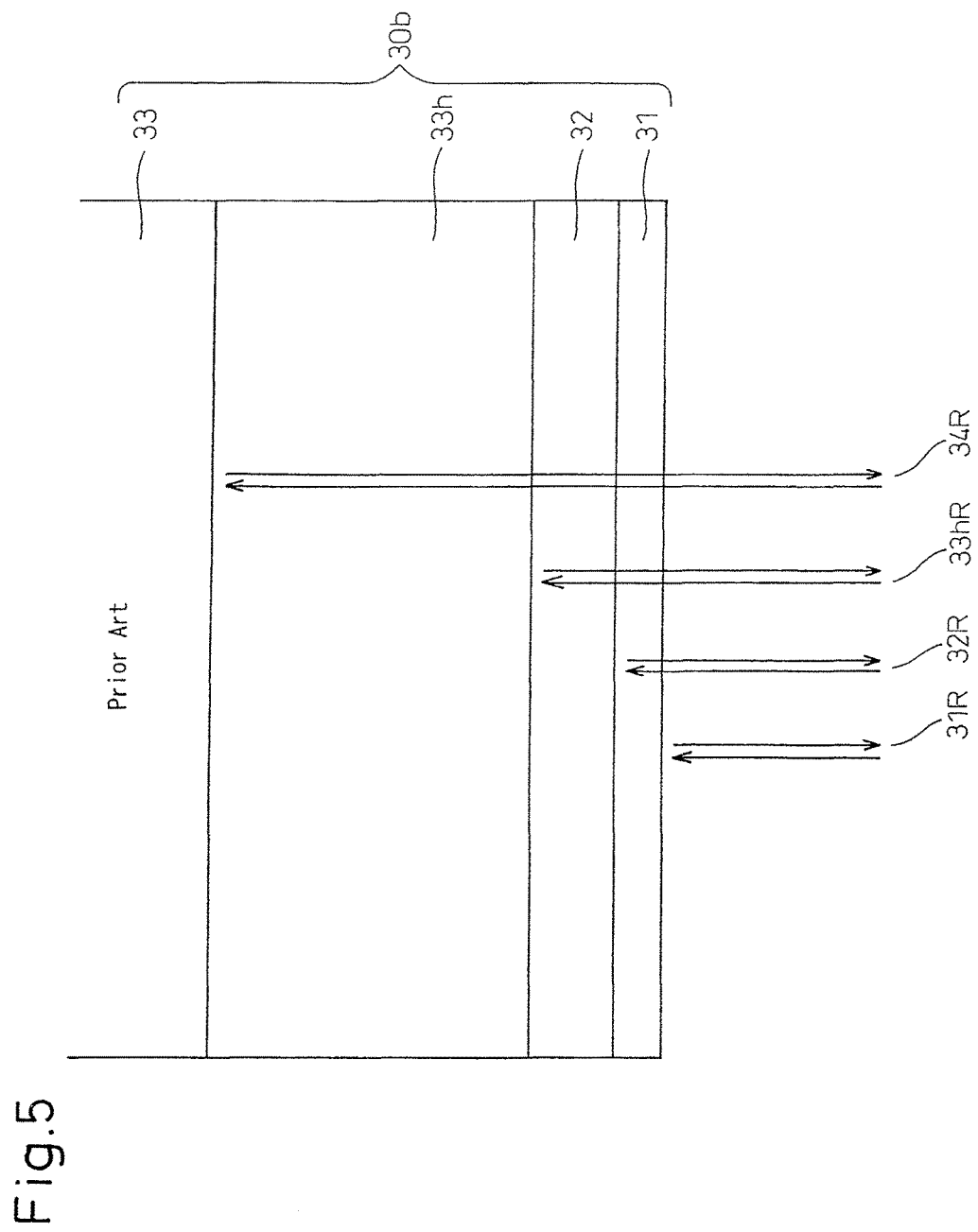
FIG. 5 A view for explaining a conventional transparent electroconductive laminate.

Also, conventionally, as described above, for preventing reflection and coloration of transmitted light by the transparent electroconductive layer, an optical interference layer is inserted between the transparent electroconductive layer and the transparent organic polymer substrate. Accordingly, in an embodiment using a hardcoat layer, in the case wherein an optical interference layer is used for preventing reflection and coloration of transmitted light by the transparent electroconductive layer, it is considered to stack, as shown in FIG. 5, a hardcoat layer 33h, an optical interference layer 32 and a transparent electroconductive layer 31 in this order on at least one surface of a transparent organic polymer substrate 33, and thereby provide a transparent electroconductive laminate 30b.

Figure 6:
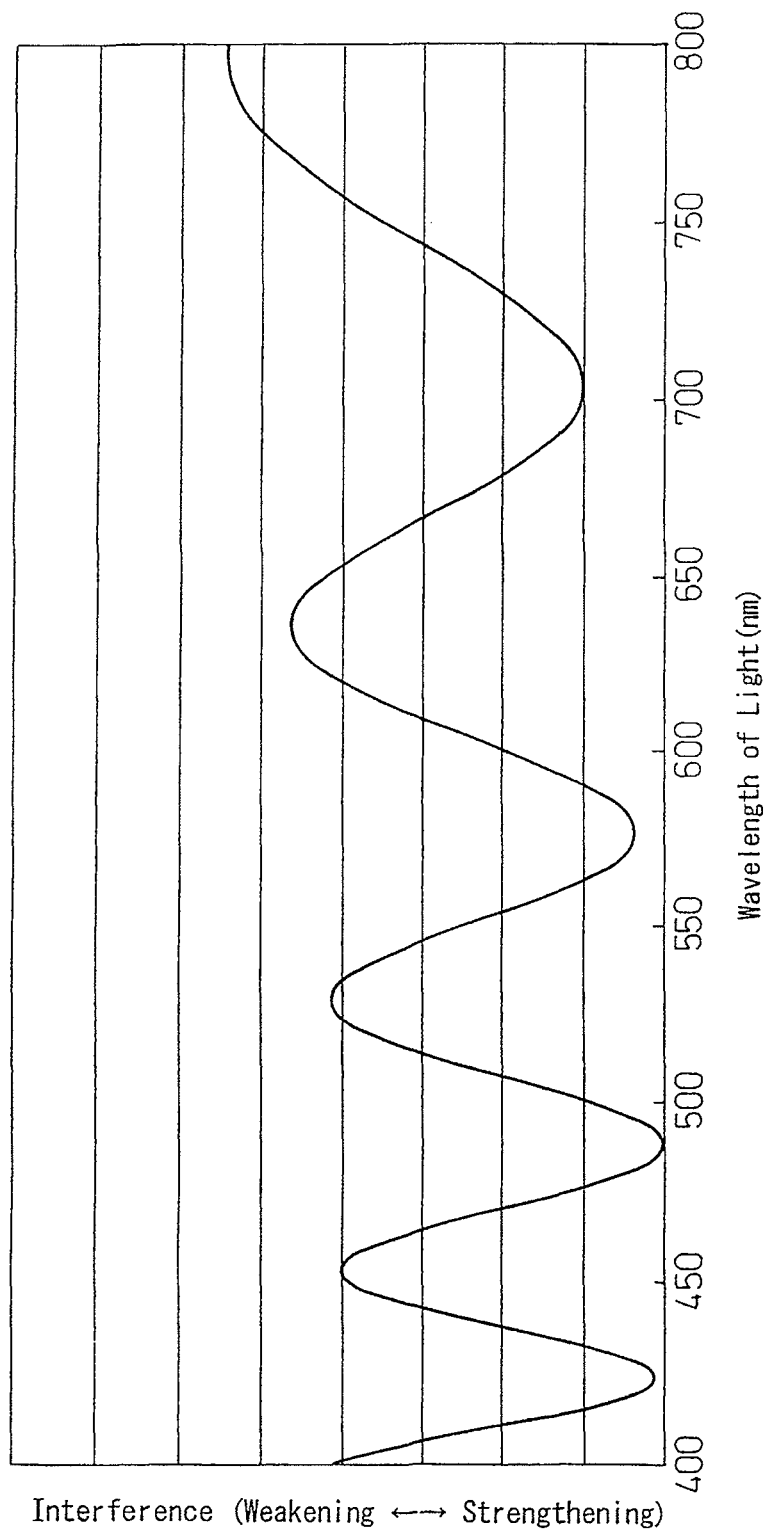
FIG. 6 A view for explaining interference in the conventional transparent electroconductive laminate of FIG. 5.

In this embodiment, for example, as shown in FIG. 6, reflection can be prevented by the optical interference layer, and thereby the transmittance as the whole laminate can be increased. However, with respect to the prevention of the coloration of transmitted light by the transparent electroconductive layer, that is, the adjustment of the color tone of transmitted light, the transmittance can be hardly controlled for every wavelength due to interference by the hardcoat layer. This may lead to a failure in sufficiently preventing the coloration of transmitted light by the transparent electroconductive layer. Incidentally, in the embodiment shown in FIG. 6, in order to prevent coloration of transmitted light by the transparent electroconductive layer, and to obtain a preferred color tone, the optical interference layer is designed to increase the transmittance of light having a wavelength of about 470 nm.

Figure 1:
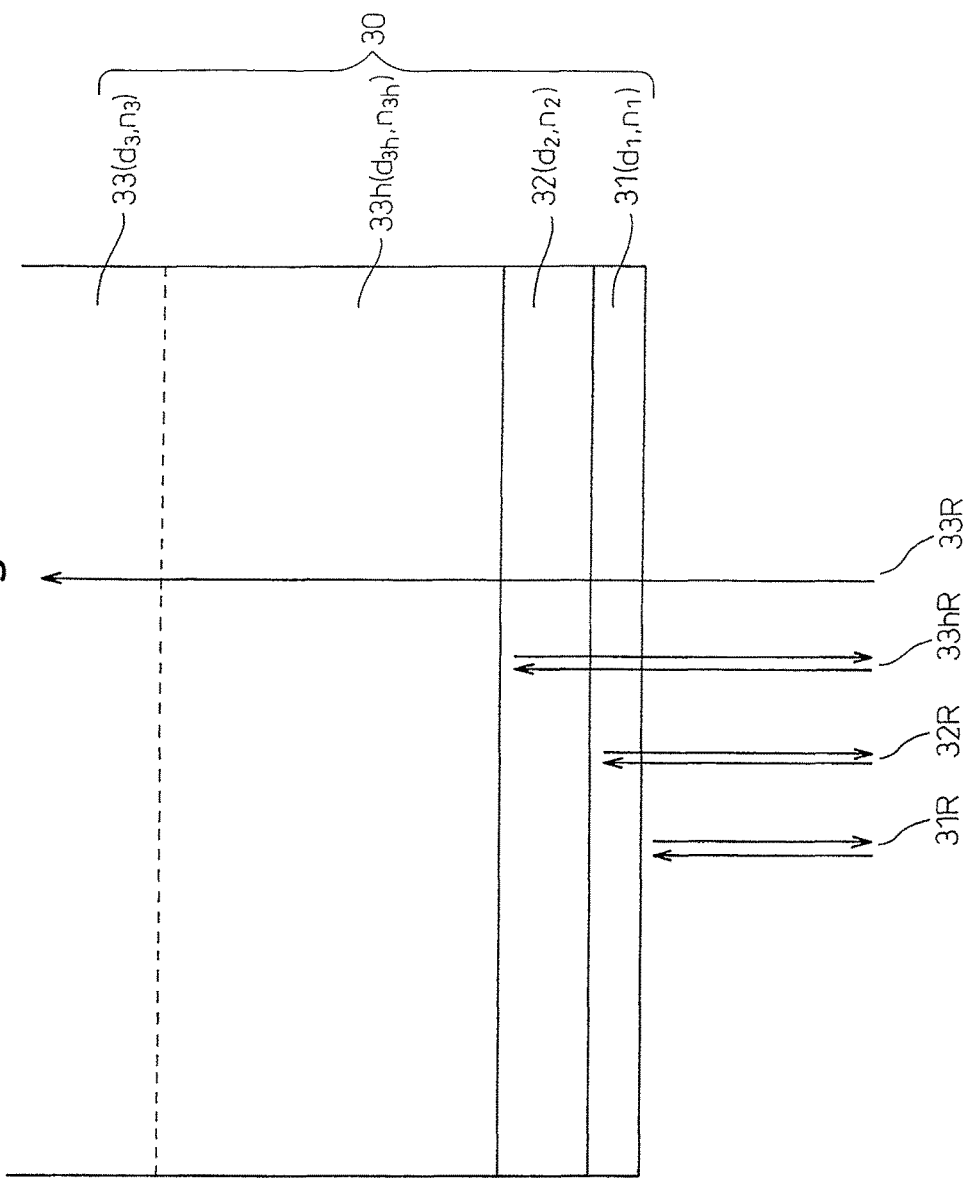
FIG. 1 A view for explaining the transparent electroconductive laminate of the first present invention.
Figure 2:
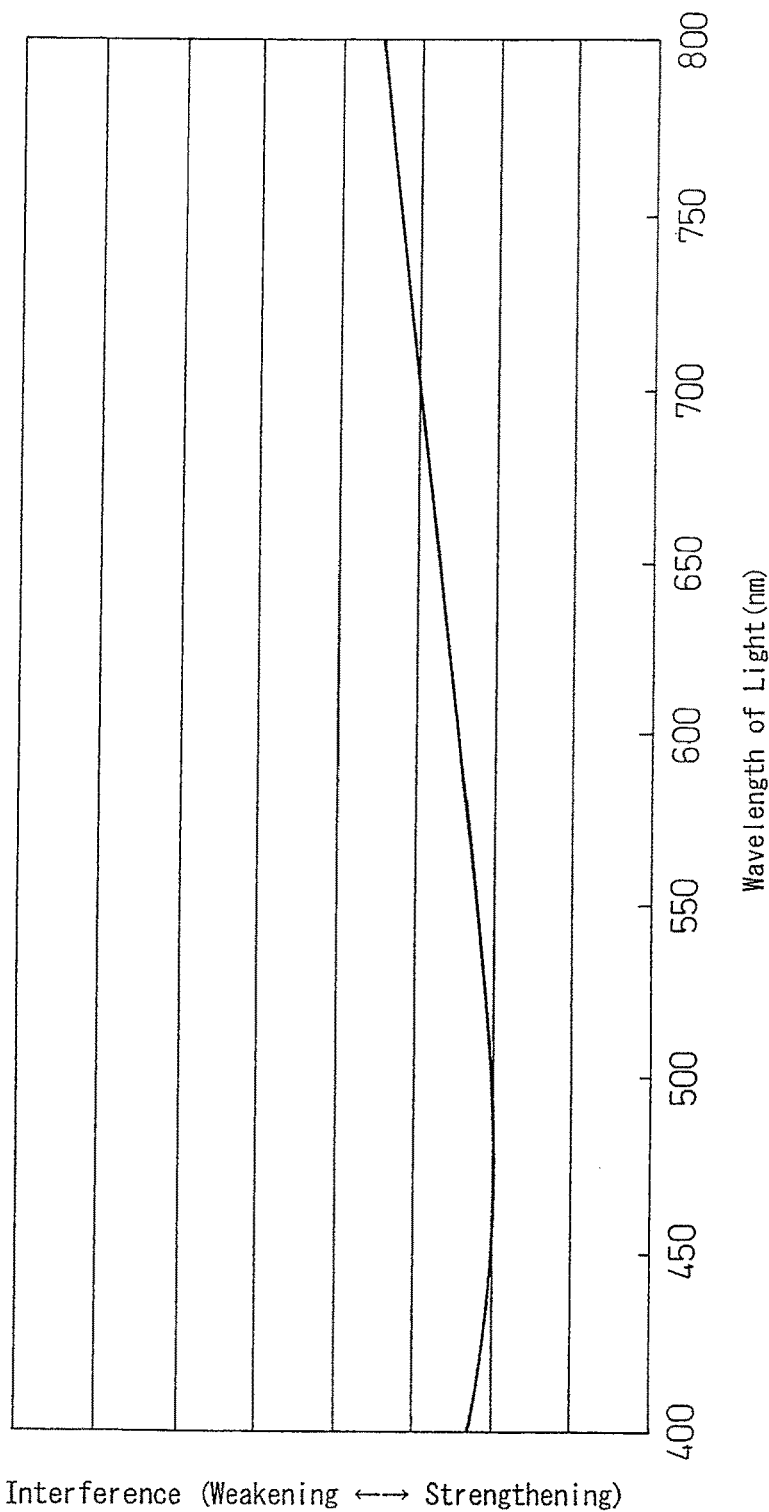
FIG. 2 A view for explaining interference in the transparent electroconductive laminate of the first present invention of FIG. 1.

On the other hand, in the transparent electroconductive laminate of the first present invention, as shown in FIG. 1, a hardcoat layer 33h, an optical interference layer 32 and a transparent electroconductive layer 31 are stacked in this order on at least one surface of a transparent organic polymer substrate 33. According to the laminate, due to a sufficiently small difference between the refractive index of the hardcoat layer 33h and the refractive index of the transparent organic polymer substrate 33, reflection at the interface between the hardcoat layer and the transparent organic polymer substrate is prevented. According to this transparent electroconductive laminate of the present invention, by the optical interference layer, the color tone of transmitted light can be controlled, and the transmittance can be increased. FIG. 2 shows the interference effect of the transparent electroconductive laminate of the first present invention.

<Hardcoat Layer>

The transparent electroconductive laminate of the first present invention has a hardcoat layer, particularly a cured resin-based hardcoat layer, on at least one surface of a transparent organic polymer substrate. The thickness of the hardcoat layer is from 1 to 10 μm, and may be from 1 to 5 μm, or from 1 to 3 μm.

The refractive index $n_{3h}$ of the hardcoat layer satisfies the following condition with respect to the refractive index $n_3$ of the transparent organic polymer substrate.

$$|n_3 - n_{3h}| \leq 0.02, \text{ particularly } 0.01.$$

The refractive index satisfies the condition above at a wavelength of 550 nm. The condition is preferably satisfied in a wavelength range of from 500 to 600 nm, more preferably from 400 to 700 nm.

As described above, when the hardcoat layer satisfies the above-described condition, reflection at the interface between the hardcoat layer and the transparent organic polymer substrate can be prevented, and thereby, by the optical interference layer, the color tone of transmitted light can be controlled, and the transmittance can be increased.

The hardcoat layer can be formed of any material, particularly a thermosetting resin or an active energy ray-curable resin, as far as the above-described conditions are satisfied. Especially, an ultraviolet ray-curable resin, which uses an ultraviolet ray as the active energy ray, is preferred, because of its excellent productivity and profitability.

Examples of the ultraviolet ray-curable resin for the hardcoat layer include diacrylates such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate and bisphenol A dimethacrylate; triacrylates such as trimethylolpropane triacrylate, trimethylolpropane trimethacrylate, pentaerythritol monohydroxy triacrylate and trimethylolpropane triethoxy triacrylate; tetraacrylates such as pentaerythritol tetraacrylate and ditrimethylolpropane tetraacrylate; and pentaacrylates such as dipentaerythritol (monohydroxy) pentaacrylate. As the ultraviolet ray-curable resin for the hardcoat layer, a pentafunctional or higher polyfunctional acrylate can be also used. One of these polyfunctional acrylates may be used alone, or two or more thereof may be mixed and used at the same time. Furthermore, these acrylates may be used along with one, two or more of third components such as photoinitiator, photosensitizer, leveling agent, and fine or ultrafine particles of a metal oxide, an acrylic component or the like.

In particular, the cured resin component contained in the hardcoat layer may be obtained by using a compound described in Patent Document 1.

That is, the cured resin component contained in the hardcoat layer may be formed by curing a coating composition containing a monomer having a fluorene framework in the molecular structure under irradiation with an active energy and/or heating. The monomer having a fluorene framework may be a compound represented by the following formula (b), and the hardcoat layer may be cured by the irradiation with an active energy ray.

[Chem. 1]

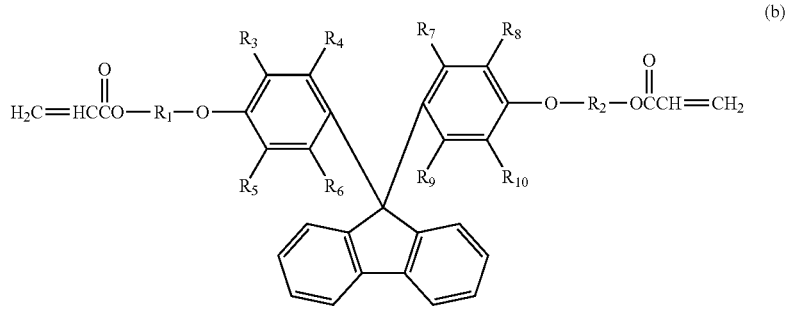

(b)

(wherein each of $R_1$ and $R_2$ is independently a divalent hydrocarbon group having a carbon number of 2 to 6, and each of $R_3$ to $R_{10}$ is independently at least one group selected from the group consisting of a hydrogen atom, a halogen atom and a monovalent hydrocarbon group having a carbon number of 1 to 6).

<Optical Interference Layer>

The optical interference layer used in the transparent electroconductive laminate of the first present invention is selected to obtain optical interference by the reflection at the interface with the underlying layer, particularly the hardcoat layer, such that, with the transparent electroconductive laminate, the desired total light transmittance and chromaticness index b* value of the L*a*b* color system can be obtained. The thickness of the optical interference layer is from 5 to 500 nm, particularly from 5 to 300 nm, more particularly from 5 to 200 nm, still more particularly from 5 to 100 nm. Particularly, this optical interference layer is a resin-based optical interference layer composed of a resin.

In order to obtain optical interference by the reflection at the interface with the underlying layer, particularly the hardcoat layer, the optical interference layer can be selected such that the refractive index difference between the optical interference layer and the underlying layer becomes preferably 0.05 or more, more preferably 0.10 or more, still more preferably 0.15 or more. In particular, the optical interference layer is stacked directly on the hardcoat layer.

<Optical Interference Layer—Light Path Length>

As described above, the reflection at the interface between the optical interference layer and the hardcoat layer can be used for obtaining an interference effect for canceling reflection and coloration by the transparent electroconductive layer.

When the refractive index $n_0$ of air, the refractive index $n_1$ of the transparent electroconductive layer, the refractive index $n_2$ of the optical interference layer, and the refractive index $n_{3h}$ of the hardcoat layer satisfy the relationship of $n_1 > n_{3h} > n_2 > n_0$, the phase is shifted by half wavelength by the reflection on the surface of the transparent electroconductive layer, and by the reflection on the surface of the hardcoat layer. Accordingly, with respect to light coming from the transparent electroconductive layer side, the light path difference between the light reflected on the surface of the transparent electroconductive layer and the light reflected on the surface of the hardcoat layer is preferably about $n+\frac{1}{2}$ times (n is 0 or a positive integer) the wavelength of light intended to be cancelled by interference.

In the other words, for example, in the case of obtaining an interference effect for canceling the reflection on the surface of the transparent electroconductive layer for the light having a wavelength of 470 nm, the light path length of the light reflected on the surface of the hardcoat layer may be in a positive range of from 470 nm×(n+½)−70 nm to 470 nm×(n+½)+70 nm, i.e., for example, from 165 to 345 nm, or from 635 to 775 nm; particularly in a positive range of from 470 nm×(n+½)−50 nm to 470 nm×(n+½)+50 nm, i.e., for example, from 185 to 285 nm, or from 655 to 755 nm; more particularly in a positive range of from 470 nm×(n+½)−20 nm to 470 nm×(n+½)+20 nm, i.e., for example, from 215 to 255 nm, or from 685 to 725 nm.

Also, for example, in the case of obtaining an interference effect for canceling the reflection on the surface of the transparent electroconductive layer for the light having a wavelength of 550 nm, the light path difference of the light reflected on the surface of the hardcoat layer may be in a positive range of from 550 nm×(n+½)−80 nm to 550 nm×(n+½)+80 nm, particularly in a positive range from 550 nm×(n+½)−50 nm to 550 nm×(n+½)+50 nm, more particularly in a positive range from 550 nm×(n+½)−20 nm to 550 nm×(n+½)+20 nm.

Furthermore, when the refractive index $n_0$ of air, the refractive index $n_1$ of the transparent electroconductive layer, the refractive index $n_2$ of the optical interference layer and the refractive index $n_{3h}$ of the hardcoat layer satisfy the relationship of $n_1 > n_2 > n_{3h} > n_0$, the phase is shifted by half wavelength by the reflection on the surface of the transparent electroconductive layer, and the phase is not shifted by the reflection on the surface of the hardcoat layer. Accordingly, with respect to light coming from the transparent electroconductive layer side, the light path difference between the light reflected on the surface of the transparent electroconductive layer and the light reflected on the surface of the hardcoat layer is preferably about n times (n is 0 or a positive integer) the wavelength of light intended to be cancelled by interference.

In the other words, for example, in the case of obtaining an interference effect for canceling the reflection on the surface of the transparent electroconductive layer for light having a wavelength of 470 nm, the light path difference of the light reflected on the surface of the optical interference layer may be in a positive range of from 470 nm×n−70 nm to 470 nm×n+70 nm, that is, for example, from 0 to 70 nm, or from 400 to 540 nm; particularly in a positive range of from 470 nm×n−50 nm to 470 nm×n+50 nm, i.e., for example, from 0 to 50 nm, or from 420 to 520 nm; more particularly in a positive range of from 470 nm×n−20 nm to 470 nm×n+20 nm, i.e., for example, from 0 to 20 nm, or from 450 to 490 nm.

Also, for example, in the case of obtaining an interference effect for canceling the reflection on the surface of the transparent electroconductive layer for the light having a wavelength of 550 nm, the light path difference of the light reflected on the surface of the optical interference layer may be in a positive range of from 550 nm×n−80 nm to 550 nm×n+80 nm, particularly in a positive range from 550 nm×n−50 nm to 550 nm×n+50 nm, more particularly in a positive range from 550 nm×n−20 nm to 550 nm×n+20 nm.

According to the above-described interference effect, the color tone of the transparent electroconductive laminate can be adjusted. For example, as in the calculation example above, by canceling the light reflection at a wavelength of about 470 nm (blue light) by the interference effect, the chromaticness index b* value of the L*a*b* color system can be adjusted to fall in a range of −1.0 to 1.5, particularly from −0.5 to 1.5, more particularly from 0 to 1.5. Also, by canceling the light reflection at a wavelength of about 550 nm, that is the center wavelength of visible light, the transmittance of the transparent electroconductive laminate can be improved.

The b* value as used in the present invention is the chromaticness index b* value of the L*a*b* color system defined in JIS Z8729, and indicates a value measured by transmission mode in accordance with JIS Z8722. In the measurement of the b* value, standard light D65 specified in the Japanese Industrial Standard Z8720 is employed as the light source, and the measurement is performed under the 2-degree visual field conditions.

For reference, the reflectance on the surface of each layer of the transparent electroconductive laminate and the light path length in the reflection on such a surface can be calculated as shown below with reference to FIG. 5. In FIG. 5, the conventional transparent electroconductive laminate 30b is fabricated by stacking a hardcoat layer 33h (thickness: $d_{3h}$, refractive index: $n_{3h}$), an optical interference layer 32 (thickness: $d_2$, refractive index: $n_2$), and a transparent electroconductive layer 31 (thickness: $d_1$, refractive index: $n_1$) in this order on at least one surface of a transparent organic polymer substrate 33 (thickness: $d_3$, refractive index: $n_3$).

The reflectance $R_1$ of reflection 31R on the surface of the transparent electroconductive layer 31, the reflectance $R_2$ of reflection 32R on the surface of the optical interference layer 32, the reflectance $R_{3h}$ of reflection 33hR on the surface of the hardcoat layer 33h, and the reflectance $R_3$ of reflection 33R on the surface of the optical transparent organic polymer substrate 33 can be generally calculated according to the following formulae ($n_0$: refractive index of air).

$$R_1=(n_0-n_1)^2/(n_0+n_1)^2 \qquad \text{(Formula 1)}$$

$$R_2=(n_1-n_2)^2/(n_1+n_2)^2 \qquad \text{(Formula 2)}$$

$$R_{3h}=(n_2-n_{3h})^2/(n_2+n_{3h})^2 \qquad \text{(Formula 3h)}$$

$$R_3=(n_{3h}-n_3)^2/(n_{3h}+n_3)^2 \qquad \text{(Formula 3)}$$

The light path difference $D_{33hR-31R}$ between the reflection 31R on the surface of the transparent electroconductive layer 31 and the reflection 33hR on the surface of the hardcoat layer 33h, and the light path difference $D_{33R-31R}$ between the reflection 31R on the surface of the transparent electroconductive layer 31 and the reflection 33R on the surface of the transparent organic polymer substrate 33 can be calculated according to the following formulae, respectively.

$$D_{33hR-31R}=(d_1 \times n_1 + d_2 \times n_2) \times 2 \qquad \text{(formula 4)}$$

$$D_{33R-31R}=(d_1 \times n_1 + d_2 \times n_2 + d_{3h} \times n_{3h}) \times 2 \qquad \text{(formula 5)}$$

<Usage>

The transparent electroconductive laminate of the first present invention can be used as a transparent electrode substrate in a transparent touch panel. Particularly, the transparent electroconductive laminate of the present invention can be used as movable and/or fixed electrode substrates in a resistance film-type transparent touch panel, which is fabricated by disposing two transparent electrode substrates each having a transparent electroconductive layer on at least one surface thereof with respective transparent electroconductive layers arranged to face each other.

Figure 7:
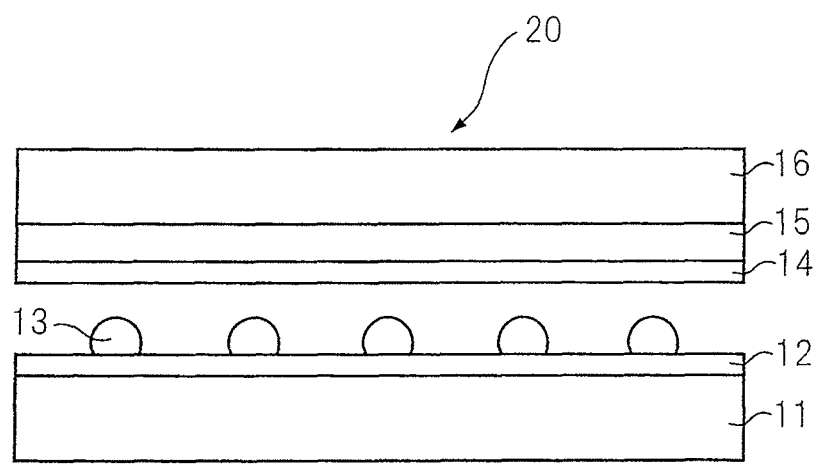
FIG. 7 A view for explaining an example of the transparent touch panel having the transparent electroconductive laminate of the first present invention.

One embodiment of the transparent electroconductive laminate of the first present invention is a transparent electroconductive laminate (14, 15, 16) in which, as shown in FIG. 7, an optical interference layer (15) and a transparent electroconductive layer (14) are stacked in this order on at least one surface of a transparent organic polymer substrate (16). In one embodiment of the transparent electroconductive laminate of the present invention shown in FIG. 1, the transparent electroconductive laminate (14, 15, 16) of the present invention and another substrate (11) such as glass plate having a transparent electroconductive layer (12) are disposed by arranging respective transparent electroconductive layers (12, 14) to face each other, and spacers (13) are disposed therebetween, whereby a resistance film-type transparent touch panel (20) can be formed.

In particular, the transparent electroconductive laminate of the first present invention is also suitably used as a transparent electrode substrate for a capacitance-type touch panel. In this case, the transparent electroconductive layer of the transparent electroconductive laminate is disposed only on a part of the optical interference layer to form a patterned transparent electroconductive layer. As described above, in this usage, the conventional transparent electroconductive layer has a problem that the portion having the transparent electroconductive layer and the portion not having it differ in the transmittance of display light, and thereby the pattern of the transparent electroconductive layer is visually recognized and thus the display light cannot be viewed very well ("skeleton visibility problem").

In this regard, the transparent electroconductive laminate of the first present invention can suppress the skeleton visibility problem by a small difference between the refractive index of the transparent organic polymer substrate and the refractive index of the hardcoat layer, the presence of the optical interference layer, etc. In particular, according to the laminate, the skeleton visibility problem can be overcome when, with respect to the reflection spectrum measured by projecting light having a wavelength of 450 to 700 nm from the transparent electroconductive layer side of the transparent electroconductive laminate, the difference spectrum between the reflection spectrum of the transparent electroconductive laminate and the reflection spectrum obtained when the transparent electroconductive layer is removed from the transparent electroconductive laminate satisfies the following conditions (A-g1) and (A-g2):

(A-g1) the maximum absolute value of the difference spectrum is 3.0% or less, particularly 2.0% or less, and (A-g2) the integrated value of the difference spectrum is from −200 nm·% to 200 nm·%, particularly from −170 nm·% to 170 nm·%, more particularly from −150 nm·% to 150 nm·%.

This is described, for example, by referring to FIGS. 8 to 11.

Figure 10:
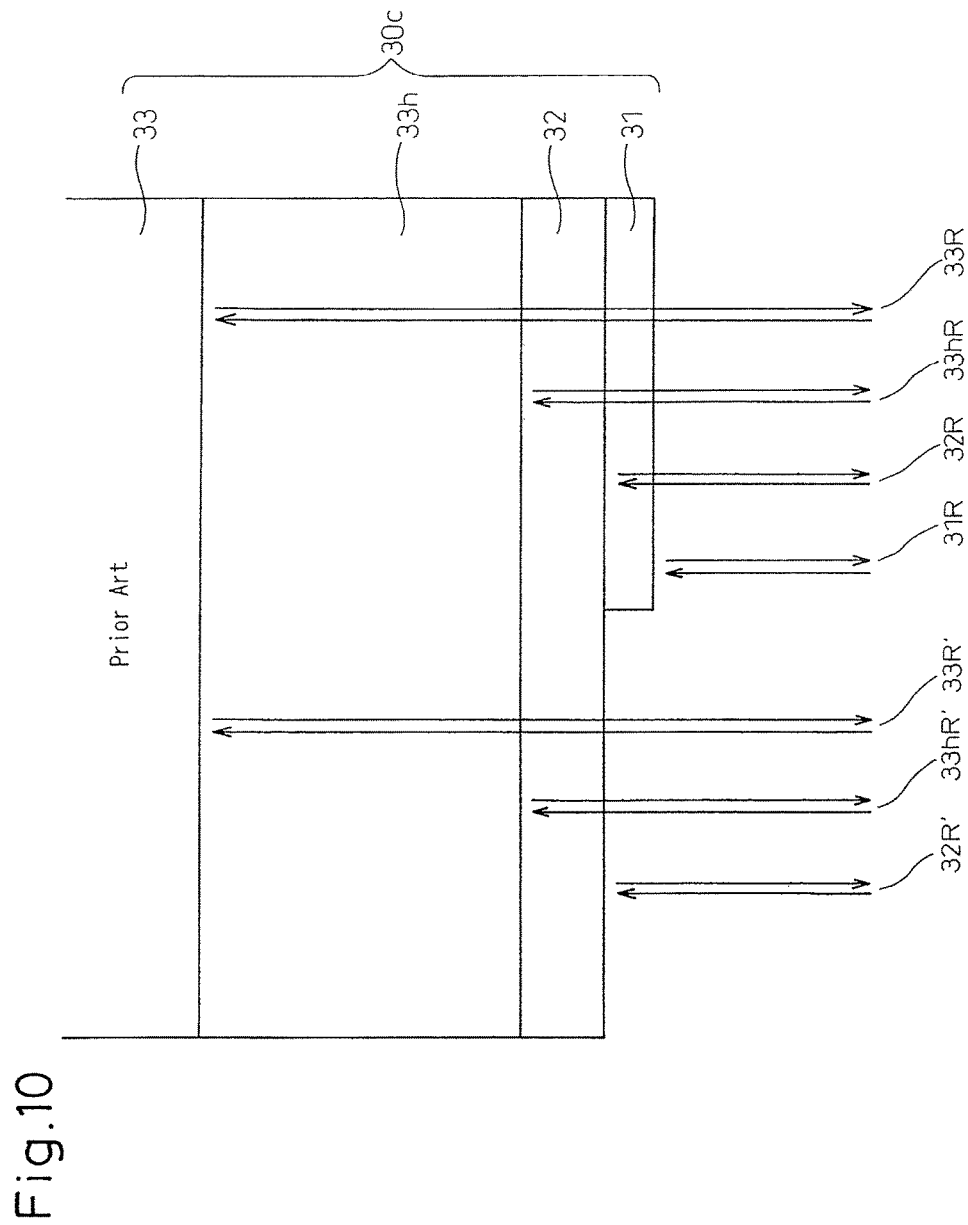
FIG. 10 A view for explaining a conventional transparent electroconductive laminate.

Specifically, in the case of solving the skeleton visibility problem by an optical interference layer in the conventional configuration, the electroconductive laminate may have a configuration shown in FIG. 10. In this electroconductive laminate 30c, a hardcoat layer 33h and an optical interference layer 32 are stacked in this order on at least one surface of a transparent organic polymer substrate 33, and a transparent electroconductive layer 31 is disposed only on a part of the optical interference layer 32 to form a patterned transparent electroconductive layer.

In this case, both of reflection 33R' on the surface of the transparent organic polymer substrate 33 and reflection 33hR' on the surface of the hardcoat layer 33h in a portion not having the transparent electroconductive layer 31 have shorter light path lengths, due to the absence of the transparent electroconductive layer 31, than the corresponding reflection 33R and reflection 33hR in the portion having the transparent electroconductive layer 31.

Figure 11:
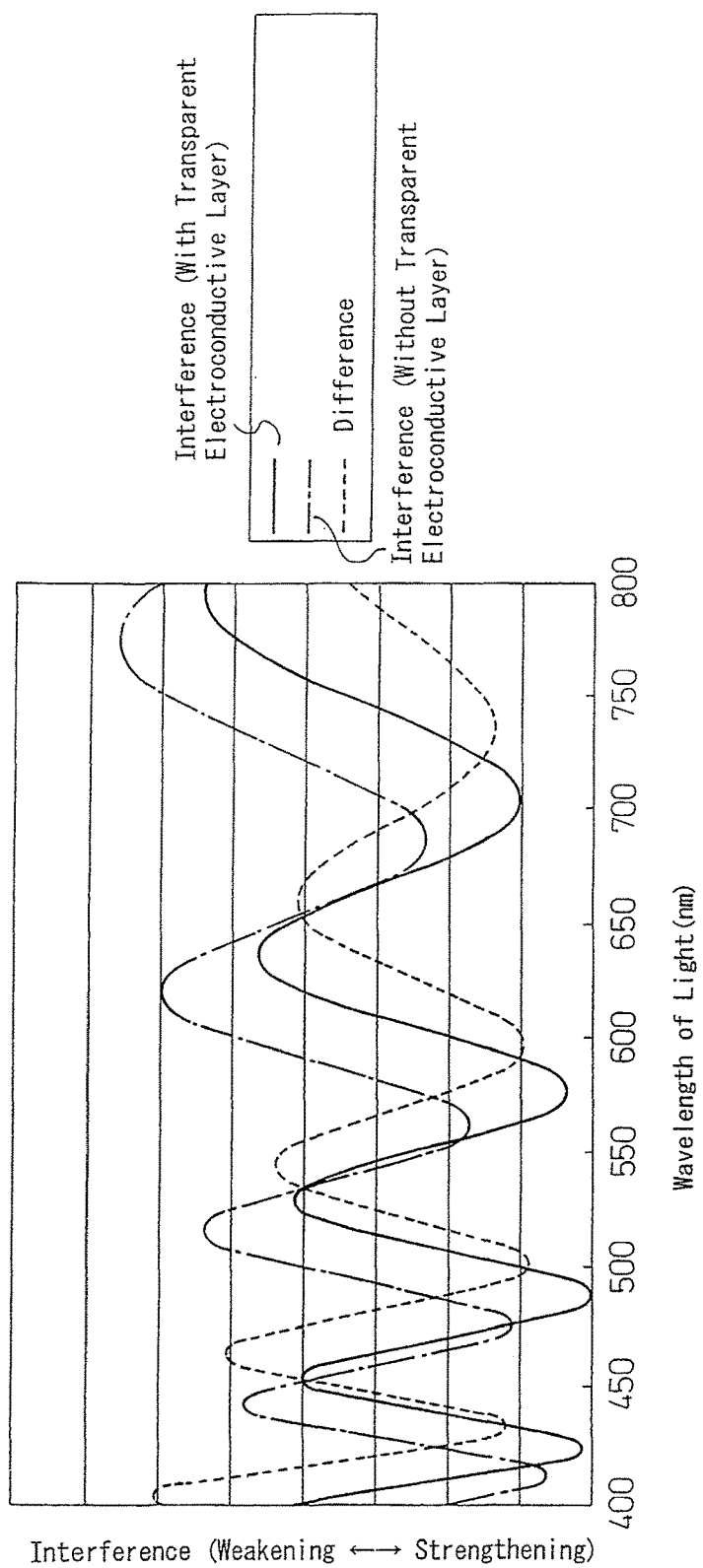
FIG. 11 A view for explaining interference in the conventional transparent electroconductive laminate of FIG. 10.

FIG. 11 shows the interference effects in the portion not having the transparent electroconductive layer 31 and the portion having the transparent electroconductive layer 31, regarding the configuration shown in FIG. 10. FIG. 11 also shows the difference in the interference effect between these cases. As apparent from FIG. 11, in the configuration shown in FIG. 10, the difference in the interference effects is changed according to the wavelength, and therefore the portion not having the transparent electroconductive layer 31 and the portion having the transparent electroconductive layer 31 are observed as a difference in color or brightness. This causes the skeleton visibility problem.

Figure 8:
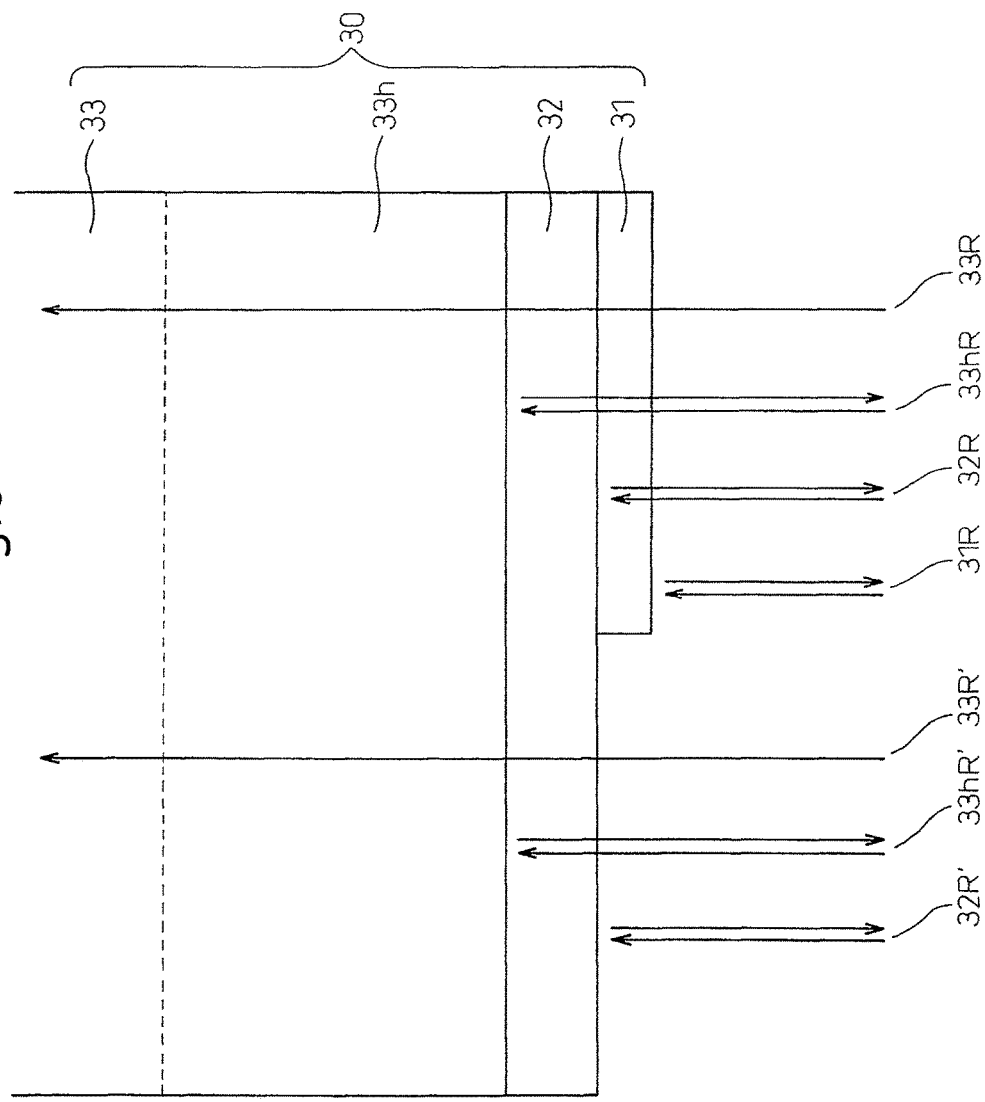
FIG. 8 A view for explaining the transparent electroconductive laminate of the first present invention.

On the other hand, as shown in FIG. 8, according to the electroconductive laminate having the configuration of the present invention, a hardcoat layer 33h and an optical interference layer 32 are stacked in this order on at least one surface of a transparent organic polymer substrate 33, and a transparent electroconductive layer 31 is disposed only on a part of the optical interference layer to form a patterned transparent electroconductive layer. According to the electroconductive laminate having the configuration of the present invention, the difference between the refractive index of the transparent organic polymer substrate 33 and the refractive index of the hardcoat layer 33h is small, and therefore substantially no reflection occurs at the interface between the transparent organic polymer substrate 33 and the hardcoat layer 33h.

In this case, both reflection 33R' on the surface of the transparent organic polymer substrate 33 and reflection 33hR' on the surface of the hardcoat layer 33h in a portion not having the transparent electroconductive layer 31 have shorter light path lengths, due to the absence of the transparent electroconductive layer 31, than the corresponding reflection 33R and reflection 33hR in the portion having the transparent electroconductive layer 31.

Figure 9:
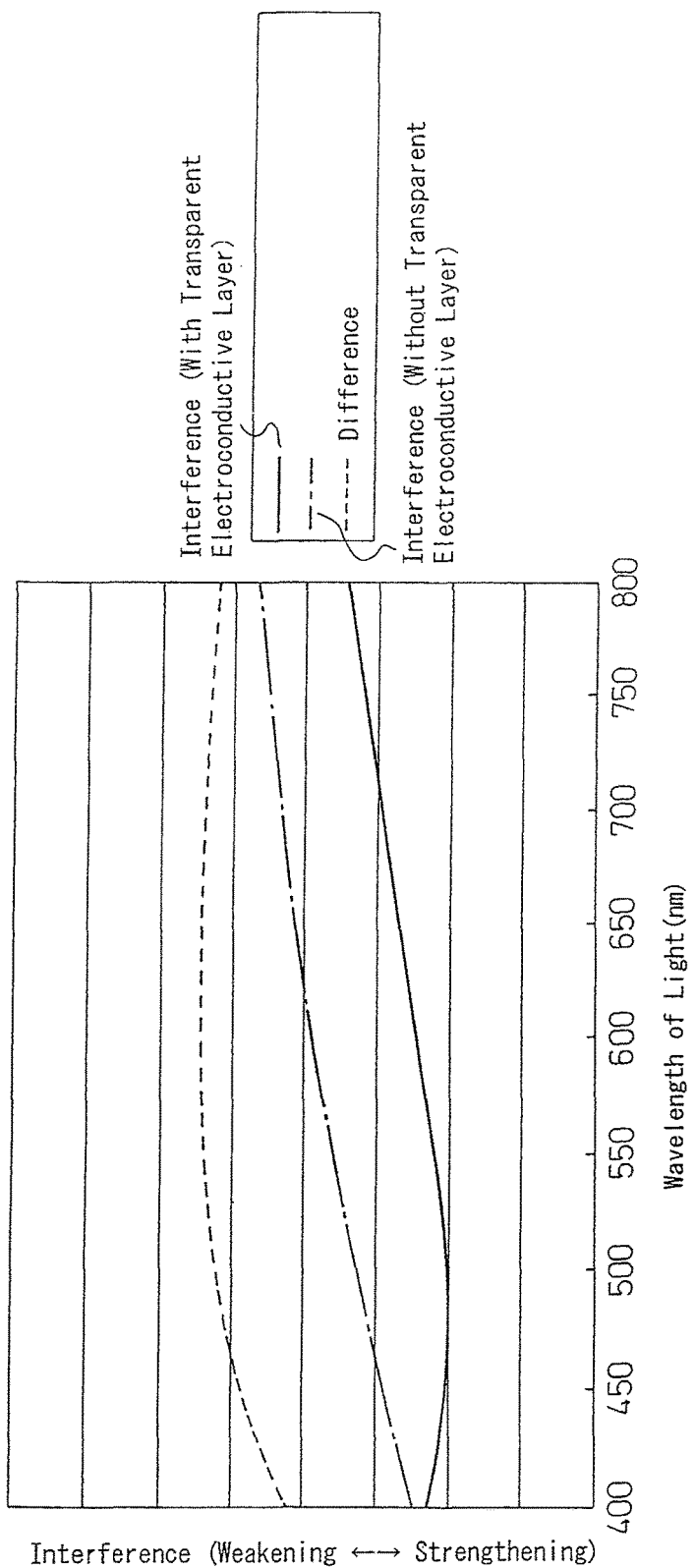
FIG. 9 A view for explaining interference in the transparent electroconductive laminate of the first present invention of FIG. 8.

FIG. 9 shows the interference effects in the portion having the transparent electroconductive layer 31 and the portion having the transparent electroconductive layer 31, regarding the configuration shown in FIG. 8. FIG. 9 also shows the difference in the interference effect between these cases. As apparent from FIG. 9, according to the configuration shown in FIG. 8, the difference in the interference effect is gently changed depending on the wavelength, and therefore, by decreasing the absolute value of the difference in the interference effects and the integrated value of the interference effect in the visible light region, the skeleton visibility problem can be suppressed.

The transparent electroconductive laminate of the first present invention can be also suitably used as a transparent electrode substrate for a so-called inner-type touch panel such as an inner-type resistance film-type or capacitance-type touch panel. Incidentally, according to the inner-type touch panel, a polarizing plate is stacked directly or through another substrate on the observation side of a transparent touch panel, and thereby the reflectance within the touch panel is reduced by controlling the phase difference of the transparent electrode substrate.

<Stacking Order>

In the transparent electroconductive laminate of the first present invention, the order of stacking a transparent electroconductive layer, an optional metal compound layer, an optical interference layer, a hardcoat layer and an optional additional hardcoat layer is not particularly limited as far as a hardcoat layer, an optical interference layer and a transparent electroconductive layer are stacked in this order on at least one surface of a transparent organic polymer substrate, and thereby the function expected to be brought out according to the usage is exterted. For example, in the case of using the transparent electroconductive laminate of the present invention as a touch panel substrate, assuming that the transparent electroconductive layer is A, the metal compound layer is B, the optical interference layer is C, the hardcoat layer is Dh, the transparent organic polymer substrate is D and the additional hardcoat layer is E, the layers may be stacked in the order of A/C/Dh/D, A/C/Dh/D/E, A/C/Dh/D/C, A/C/Dh/D/C, A/C/Dh/D/E, A/C/Dh/D/E/C, A/B/C/Dh/D, A/B/C/Dh/D/E, A/B/C/Dh/D/C, A/B/C/Dh/D/C, A/B/C/Dh/D/E, or A/B/C/Dh/D/E/C.

Second Present Invention

Figure 12:
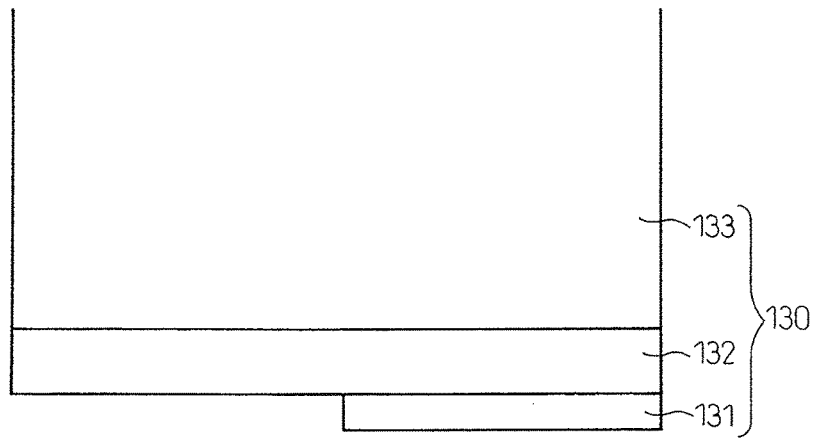
FIG. 12 A view showing an example of the transparent electroconductive laminate of the second present invention.

The transparent electroconductive laminate of the second present invention is a transparent electroconductive laminate wherein a cured resin layer and a transparent electroconductive layer are stacked in this order on at least one surface of a transparent organic polymer substrate. One embodiment of this transparent electroconductive laminate of the present invention is a transparent electroconductive laminate 130 wherein, as shown in FIG. 12, a cured resin layer 132 and a transparent electroconductive layer 131 are stacked in this order on at least one surface of a transparent organic polymer substrate 133.

In the transparent electroconductive laminate of the second present invention, with respect to the reflection spectrum measured by projecting light having a wavelength of 450 to 700 nm from the transparent electroconductive layer side of the transparent electroconductive laminate, the difference spectrum between the reflection spectrum of the transparent electroconductive laminate and the reflection spectrum obtained when the transparent electroconductive layer is removed from the transparent electroconductive laminate satisfies following conditions (B-a1) and (B-a2):

(B-a1) the maximum absolute value of the difference spectrum is 3.0% or less, particularly 2.0% or less, and (B-a2) the integrated value of the difference spectrum is from −200 nm·% to 200 nm·%, particularly from −170 nm·% to 170 nm·%, more particularly from −150 nm·% to 150 nm·%.

According to the transparent electroconductive laminate of the second present invention, the difference spectrum between the reflection spectrum of the transparent electroconductive laminate and the reflection spectrum obtained when the transparent electroconductive layer is removed from the transparent electroconductive laminate satisfies the conditions (B-a1) and (B-a2), whereby skeleton visibility can be overcome.

This difference spectrum can be achieved when following conditions (B-b1) to (B-b3) are further satisfied, assuming that the refractive index of the transparent organic polymer substrate is $n_3$, the thickness and refractive index of the cured resin layer are $d_2$ (nm) and $n_2$, respectively, and the thickness and refractive index of the transparent electroconductive layer are $d_1$ (nm) and $n_1$, respectively:

$$n_1 > n_2 > n_3, \quad \text{(B-b1)}$$

$$0.44 < n_2/(n_1+n_3) < 0.49, \text{ particularly } 0.45 < n_2/(n_1+n_3) < 0.48, \quad \text{(B-b2)}$$

and $$245 < n_2 d_2/(n_1 d_1)^{-0.12} < 275, \text{ particularly } 255 < n_2 d_2/(n_1 d_1)^{-0.12} < 265. \quad \text{(B-b3)}$$

<Additional Cured Resin Layer>

The transparent electroconductive laminate of the present invention may further have a single or a plurality of additional cured resin layers according to usage. The additional cured resin layer can be disposed at any position of the transparent electroconductive laminate of the present invention. In the other words, the additional cured resin layer can be disposed between any layers or on any layer out of the transparent organic polymer substrate, the cured resin layer and the transparent electroconductive layer constituting the transparent electroconductive laminate of the present invention. Accordingly, the additional cured resin layer may be a so-called hardcoat layer constituting the surface of the transparent organic polymer substrate, particularly a clear hardcoat layer not containing fine particles or the like.

The additional cured resin layer can be formed of a thermosetting resin, an active energy ray-curable resin or the like. Above all, an ultraviolet-curable resin in which an ultraviolet ray is used as the active energy ray is preferred because of its excellent productivity and profitability.

Examples of the ultraviolet-curable resin for the additional cured resin layer include diacrylates such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol)diacrylate, tetraethylene glycol dimethacrylate, 1,3-butylene glycol diacrylate, triethylene glycol diacrylate, triisopropylene glycol diacrylate, polyethylene glycol diacrylate and bisphenol A dimethacrylate; triacrylates such as trimethylolpropane triacrylate, trimethylolpropane trimethacrylate, pentaerythritol monohydroxy triacrylate and trimethylolpropane triethoxy triacrylate; tetraacrylates such as pentaerythritol tetraacrylate and ditrimethylolpropane tetraacrylate; and pentaacrylates such as dipentaerythritol (monohydroxy)pentaacrylate. As the ultraviolet-curable resin for the additional cured resin layer, a pentafunctional or higher polyfunctional acrylate can be also used. One of these polyfunctional acrylates may be used alone, or two or more thereof may be mixed and used at the same time. Furthermore, these acrylates may be used after adding thereto one kind or two or more third components such as photoinitiator, photosensitizer, leveling agent, and fine or ultrafine particles composed of a metal oxide, an acrylic component or the like.

In order to impart an anti-Newton ring function to the transparent electroconductive laminate of the present invention, an unevenness may be formed in the additional cured resin layer. As the method for forming an unevenness, various methods previously proposed may be used. Examples of the method include a method of adding a filler having a similar a particle size to the film thickness into the additional cured resin layer (JP-A-10-323931), a method of forming an unevenness by utilizing nanoparticles (JP-A-2004-351744), and a method of forming an unevenness by utilizing phase separation by a plurality of curable components (JP-A-2009-123685). Of these, when the method of adding a filler is employed, in use as a resistance film-type touch panel, the filler may fall off from the transparent electroconductive laminate during use to eventually damage the transparent electrode, and thereby reduce the life of the touch panel. Therefore, the method of forming unevenness by utilizing aggregation of nanoparticles, or the method of forming unevenness by utilizing phase separation by a plurality of curable components is preferred.

<Use>

The transparent electroconductive laminate of the second present invention is suitably used in particular as a transparent electrode substrate for a capacitance-type touch panel. Accordingly, particularly in a capacitance-type transparent touch panel fabricated by disposing one or more transparent electrode substrates each having a transparent electroconductive layer on at least one surface thereof, the transparent electroconductive laminate of the present invention can be used as at least one transparent electrode substrate. In this case, the transparent electroconductive layer of the transparent electroconductive laminate may be disposed only on a part of the cured resin layer to form a patterned transparent electroconductive layer.

The transparent electroconductive laminate of the second present invention is also suitably used in particular as a transparent electrode substrate for a resistance film-type touch panel. Accordingly, particularly in a resistance film-type transparent touch panel which is fabricated by disposing two transparent electrode substrates each having a transparent electroconductive layer on at least one surface thereof with arranging respective transparent electroconductive layers to face each other, the transparent electroconductive laminate of the second present invention can be used as at least one transparent electrode substrate. In this case, the transparent electroconductive layer of the transparent electroconductive laminate may be disposed only on a part of the cured resin layer to form a patterned transparent electroconductive layer.

The transparent electroconductive laminate of the second present invention can be also suitably used as a transparent electrode substrate for a so-called inner touch panel wherein a polarizing plate is stacked directly or through another base material on the observation side of a transparent touch panel and thereby the reflectance within the touch panel is reduced by controlling the phase difference of the transparent electrode substrate, for example, as a transparent electrode substrate for an inner thpe resistance film-type touch panel or an inner type capacitance-type touch panel.

<Stacking Order>

In the transparent electroconductive laminate of the second present invention, the order of stacking a transparent electroconductive layer, an optional metal compound layer, a cured resin layer and an optional additional cured resin layer is not particularly limited as long as a cured resin layer and a transparent electroconductive layer are stacked in this order on at least one surface of a transparent organic polymer substrate, and thereby the function expected to be brought out depending on the usage is fulfilled. For example, in the case of using the transparent electroconductive laminate of the present invention as a touch panel substrate, the layers may be stacked in the following order, assuming that the transparent electroconductive layer is A, the metal compound layer is B, the cured resin layer is C, the transparent organic polymer substrate is D, and the additional cured resin layer is E:

A/C/D, A/C/D/E, A/C/D/C, A/C/E/D/C, A/C/E/D/E, A/C/E/D/E/C, A/B/C/D, A/B/C/D/E, A/B/C/D/C, A/B/C/E/D/C, A/B/C/E/D/E, or A/B/C/E/D/E/C.

<<Transparent Organic Polymer Substrate>>

The transparent organic polymer substrate used in the transparent electroconductive laminates of the first and second present inventions may be any transparent organic polymer substrate, particularly a transparent organic polymer substrate excellent in the heat resistance, transparency and the like, which is employed in the optical field.

The transparent organic polymer substrate used in the transparent electroconductive laminates of the first and second present inventions includes, for example, a substrate composed of a transparent polymer such as a polyester-based polymer, e.g., polyethylene terephthalate and polyethylene naphthalate; a polycarbonate-based polymer; a cellulose-based polymer, e.g., diacetyl cellulose and triacetyl cellulose; and an acrylic polymer, e.g., polymethyl methacrylate. The transparent organic polymer substrate used in the transparent electroconductive laminate of the present invention also includes a substrate composed of a transparent polymer such as a styrene-based polymer, e.g., polystyrene and acrylonitrile.styrene copolymer; an olefin-based polymer, e.g., polyethylene, polypropylene, polyolefin having a cyclic or norbornene structure, and ethylene.propylene copolymer; a vinyl chloride-based polymer; and an amide-based polymer typified by nylon and aromatic polyamide. Other examples of the transparent organic polymer substrate used in the transparent electroconductive laminate of the present invention include a substrate composed of a transparent polymer such as imide-based polymer, sulfone-based polymer, polyethersulfone-based polymer, polyether ether ketone-based polymer, polyphenylene sulfide-based polymer, vinyl alcohol-based polymer, vinylidene chloride-based polymer, vinyl butyral-based polymer, allylate-based polymer, polyoxymethylene-based polymer, epoxy-based polymer and a blend of these polymers.

Regarding the transparent electroconductive laminates of the first and second present inventions, the above transparent organic polymer substrates having optically low birefringence, the controlled phase difference as a product of birefringence and film thickness of approximately ¼ or ½ of the wavelength of visible light (referred to as "λ/4 film" or "λ/2 film"), or not-controlled birefringence may be appropriately selected depending on usage. In performing appropriate selection depending on usage as described above, the transparent electroconductive laminate of the present invention may be used as a display member developing its function through polarization such as linear polarization, elliptical polarization and circular polarization, such as a so-called inner type touch panel having a function as a polarizing plate or a retardation film for use in a liquid crystal display or a function as a polarizing plate, a retardation film or the like for preventing reflection of an organic EL display.

The film thickness of the transparent polymer substrate may be appropriately determined, but generally, in view of strength, workability such as handleability and the like, the film thickness is approximately from 10 to 500 μm, preferably from 20 to 300 μm, more preferably from 30 to 200 μm.

<<Optical Interference Layer/Cured Resin Layer>>

<Optical Interference Layer/Cured Resin Layer—Material and Production Method>

The optical interference layer, particularly a resin-based optical interference layer, of the first present invention, and the cured resin layer of the second present invention can be preferably formed by a wet process, and all known methods such as doctor knife, bar coater, gravure roll coater, curtain coater, knife coater, spin coater, spray method and immersion method can be used for this purpose. As for the specific resin-based optical interference layer/cured resin layer, Patent Document 2 may be referred to.

That is, the resin-based optical interference layer/cured resin layer can be formed by various roll coating methods such as microgravure coating method, Meyer bar coating method and direct gravure coating method; a wet coating method such as knife coating method, curtain coating method, spin coating method and spray coating method; or a combination thereof.

As for the resin-based optical interference layer/cured resin layer, from the standpoint of obtaining high productivity, use of a resin-based optical interference layer/cured resin layer formed by a wet coating method is preferred. Among resin-based optical interference layers/cured resin layers formed by wet coating, use of a resin-based optical interference layer/cured resin layer composed of a metal alkoxide, particularly an alkoxide of titanium, zirconium or silicon, is most preferred, because, for example, of the excellent mechanical strength or stability of the layer and the adherence to transparent electroconductive layer, substrate or the like. The resin-based optical interference layer/cured resin layer composed of an alkoxide of titanium or zirconium is a layer working as a high refractive index layer having a refractive index of about 1.6 or more, possibly about 1.7 or more. The resin-based optical interference layer/cured resin layer composed of an alkoxide of silicon is a layer working as a low refractive index layer having a refractive index of about 1.5 or less.

Examples of the titanium alkoxide include titanium tetraisopropoxide and tetra-n-propyl orthotitanate. Examples of the silicon alkoxide include tetramethoxysilane, tetraethoxysilane, methyltrimethoxysilane, and methyltriethoxysilane.

Incidentally, the resin-based optical interference layer/cured resin layer not only contains the cured resin component, but also may further contain ultrafine particles having an average primary particle diameter of 100 nm or less in any mixable amount so as to adjust the refractive index. The material of the ultrafine particles includes the materials described below regarding the resin-based optical interference layer/cured resin layer having fine protrusions on the surface.

<Optical Interference Layer/Cured Resin Layer Having Fine Protrusions on Surface>

In one embodiment of the transparent electroconductive laminate of the first present invention, (A-p) the optical interference contains a resin component and first ultrafine particles having an average primary particle diameter of 1 to 100 nm, (A-q) the resin component and the first ultrafine particles contain the same metal and/or metalloid element, and (A-r) in the optical interference layer, the content of the first ultrafine particles containing the same metal and/or metalloid element as the resin component is from 0.01 to 3 parts by mass per 100 parts by mass of the resin component.

In one embodiment of the transparent electroconductive laminate of the second present invention, (B-c) the cured resin layer contains a resin component and first ultrafine particles having a average primary particle diameter of 1 to 100 nm, (B-d) the resin component and the first ultrafine particles contain the same metal and/or metalloid element, (B-e) in the cured resin layer, the content of the first ultrafine particles is from 0.01 to 3 parts by mass per 100 parts by mass of the resin component, and (B-f) the thickness of the cured resin layer is from 0.01 to 0.5 μm.

In these embodiments, fine protrusions are formed on the surface of the transparent electroconductive layer, and thereby a combination of high transparency, small haze and sufficient lubricity is provided. The specific mechanism thereof is not known, but is considered as follows. By virtue of the fact that the resin component and the first ultrafine particles of the resin-based optical interference layer/cured resin layer contain the same metal and/or metalloid element with each other, some interaction occurs between the resin component and the first ultrafine particles during curing of the resin component to form fine protrusions on the surface of the resin-made optical interference layer/cured resin layer. These protrusions are reflected to the surface of the transparent electroconductive layer on the resin-based interference layer/cured resin layer, whereby fine protrusions on the surface of the transparent electroconductive layer are formed.

If the transparent electroconductive layer is smooth, films adhere to each other, and thereby have bad handleability or windability. Also, in a resistance film-type touch panel when sticking due to adhesion of films occurs writing durability is deteriorated. However, the transparent electroconductive laminate of the present invention has good handleability or windability as well as high writing durability, because fine protrusions are formed on the surface thereof.

Also, in the case of using a lubricating layer formed of a resin containing fine particles having a submicron particle diameter, as described above, the fine particles decrease in writing durability of the touch panel. On the other hand, the transparent electroconductive laminate of the present invention contains first ultrafine particles having a very small particle diameter, and protrusions are formed by an interaction between the first ultrafine particles and the resin component, and therefore the writing durability is not deteriorated.

The "metal and/or metalloid element" contained in both the resin component and the first ultrafine particles is/are not particularly limited, but is/are preferably one or more elements selected from the group consisting of Al, Bi, Ca, Hf, In, Mg, Sb, Si, Sn, Ti, Y, Zn and Zr, more preferably one or more elements selected from the group consisting of Al, Si and Ti, still more preferably Si and/or Ti.

<Optical Interference Layer/Cured Resin Layer Having Fine Protrusions on Surface—Cured Resin Component>

A curable resin component can be used without any particular limitation as long as it allows for dispersion of ultrafine particles, has sufficient strength as a film after formation of the resin-based optical interference layer/cured resin layer, is transparent, and contains the same metal and/or metalloid element as the ultrafine particles. Accordingly, as the curable resin component, for example, a polymerizable organic metal compound, particularly a metal-containing acrylate or a metal alkoxide, can be used.

The curable resin component includes, for example, a ionizing radiation-curable resin and a thermosetting resin.

Examples of the monomer giving an ionizing radiation-curable resin include monofunctional and polyfunctional acrylates such as polyol acrylate, polyester acrylate, urethane acrylate giving a hard layer other than those described above, epoxy acrylate, modified styrene acrylate, melamine acrylate, and silicon-containing acrylate.

Examples of the monomer giving an Si-containing ionizing radiation-curable resin include methylacryloxypropyltrimethoxysilane, tris(trimethylsiloxy)silylpropyl methacrylate, allyltrimethylsilane, diallyldiphenylsilane, methylphenylvinylsilane, methyltriallylsilane, phenyltriallylsilane, tetraallylsilane, tetravinylsilane, triallylsilane, triethylvinylsilane, vinyltrimethylsilane, 1,3-dimethyl-1,1,3,3-tetravinyldisiloxane, divinyltetramethyldisiloxane, vinyltris(trimethylsiloxy)silane, vinylmethylbis(trimethylsilyloxy)silane, N-(trimethylsilyl) allylamine, a polydimethylsiloxane having a double bond at both terminals, and a silicone-containing acrylate.

In the case of performing polymerization of the resin layer by ionizing radiation, a photopolymerization initiator is generally added in an appropriate amount, and, if desired, a photosensitizer may be added in an appropriate amount. Examples of the photopolymerization initiator include acetophenone, benzophenone, benzoin, benzoyl benzoate and thioxanthones, and examples of the photosensitizer include triethylamine and tri-n-butylphosphine.

Examples of the thermosetting resin include an organosilane-based thermosetting resin such as alkoxysilane-based compound; an alkoxytitanium-based thermosetting resin; a melamine-based thermosetting resin using, as the monomer, an etherified methylolmelamine; an isocyanate-based thermosetting resin; a phenolic thermosetting resin; and an epoxy thermosetting resin. One of these thermosetting resins may be used alone, or a plurality of them may be used in combination. Also, a thermoplastic resin may be mixed with the thermosetting resin, if desired.

Examples of the organosilane-based thermosetting resin which is preferably used include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminotriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, tetramethoxysilane, tetraethoxysilane, methyltrimethoxysilane, methyltriethoxysilane, dimethyldiethoxysilane, phenyltriethoxysilane, hexamethyldisilazane, hexyltrimethoxysilane, and decyltrimethoxysilane. Among these, methyltrimethoxysilane, methyltriethoxysilane, dimethyldiethoxysilane and the like are preferably used, because these exert excellent performance in view of stabilizing the adherence to substrate.

Examples of the alkoxytitanium-based thermosetting resin which is preferably used include tetraisopropyl titanate, tetranormalbutyl titanate, butyl titanate dimer, tetra(2-ethylhexyl)titanate, tetramethyl titanate, titanium acetylacetonate, titanium tetraacetylacetonate, titanium ethylacetoacetate, titanium octanediolate, titanium lactate, titanium triethanolaminate and polyhydroxytitanium stearate. Among these, tetraisopropyl titanate, tetranormalbutyl titanate, titanium lactate and the like are preferably used, because these exert stable performance in view of the stability as a paint, and the stabilized adherence to substrate.

In the case of performing the crosslinking of the resin layer by heat, a reaction promoter and/or a curing agent may be added in an appropriate amount. Examples of the reaction promoter include triethyldiamine, dibutyltin dilaurate, benzylmethylamine and pyridine. Examples of the curing agent include methylhexahydrophthalic anhydride, 4,4'-diaminodiphenylmethane, 4,4'-diamino-3,3'-diethyldiphenylmethane and diaminodiphenylsulfone.

In the case wherein the monomer forming the resin-based optical interference layer/cured resin layer contains the same metal and/or metalloid element as the ultrafine particles, the monomer may be used alone or in combination with another monomer, for example, in combination with a monomer not containing the same metal and/or metalloid element as the ultrafine particles.

Incidentally, the resin-based optical interference layer/cured resin layer may contain other components such as leveling agent and photosensitizer.

<Optical Interference Layer/Cured Resin Layer Having Fine Protrusions on Surface—Ultrafine Particles/First Ultrafine Particles>

The first ultrafine particles having an average primary particle diameter of 1 to 100 nm contained in the resin-based optical interference layer/cured resin layer is not substantially limited as long as it contains the same metal and/or metalloid element as the resin component, but a metal oxide or a metal fluoride is preferably used. As the metal oxide or metal fluoride, at least one member selected from the group consisting of $Al_2O_3$, $Bi_2O_3$, $CaF_2$, $In_2O_3$, $In_2O_3.SnO_2$, $HfO_2$, $La_2O_3$, $MgF_2$, $Sb_2O_5$, $Sb_2O_5.SnO_2$, $SiO_2$, $SnO_2$, $TiO_2$, $Y_2O_3$, ZnO and $ZrO_2$ may be preferably used, and $Al_2O_3$, $SiO_2$ or $TiO_2$ may be more preferably used.

Accordingly, for example, in the case wherein the resin component of the resin-based optical interference layer/cured resin layer is a resin component obtained from an alkoxysilane, first ultrafine particles of $SiO_2$ may be used. Also, in the case wherein the resin component of the resin-based optical interference layer/cured resin layer is a resin component obtained from an alkoxytitanium, first ultrafine particles of $TiO_2$ may be used.

The particle diameter of the first ultrafine particles contained in the resin-based optical interference layer/cured resin layer is from 1 to 100 nm, preferably from 1 to 70 nm, more preferably from 1 to 50 nm, still more preferably from 5 to 40 nm. If the particle diameter of the first ultrafine particles is too large, light scattering occurs which is not preferred. If the particle diameter of the first ultrafine particles is too small, the specific surface area of the particles is increased and thereby the particle surface becomes active, as a result, the particles tend to have an extremely strong propensity to aggregate with each other, and this disadvantageously makes the preparation.storage of solution difficult.

The first ultrafine particles contained in the resin-based optical interference layer/cured resin layer may be surface-modified with a coupling agent or the like as long as the characteristics specified in the present invention are satisfied. As for the production method of the first ultrafine particles, a liquid phase process, a vapor phase process and the like can be used, but the production method is also not particularly limited.

When dispersing the first ultrafine particles in the cured resin, the blending ratio of the first ultrafine particles needs to be from 0.01 to 3 parts by mass, and is preferably from 0.01 to 2.5 parts by mass, more preferably from 0.05 to 2 parts by mass, still more preferably from 0.1 to 1 part by mass, per 100 parts by mass of the resin component after curing. If the ratio of the first ultrafine particles is too small, a resin layer having protrusions on its surface, which is required for usage of the present invention, cannot be easily formed, whereas if the ratio is excessively large, the protrusions of the surface become large and this disadvantageously causes light scattering on the surface and in turn increases the haze.

In the present invention, the protrusions on the surface of the resin-based optical interference layer/cured resin layer also depend on the thixotropy of the first ultrafine particles used. Therefore, for the purpose of developing or controlling the thixotropy, an appropriate solvent or dispersant may be selected and used when forming the optical interference layer. Examples of the solvent which can be used include various types such as alcohol, aromatic, ketone, lactate, cellosolve and glycol. Examples of the dispersant which can be used include various types such as fatty acid amine, sulfonic acid amide, ε-caprolactone, hydrostearic acid, polycarboxylic acid and polyester amine. As for these solvents or dispersants, one kind may be used alone, or two or more kinds may be used in combination.

<Cured Resin Layer—Second Ultrafine Particles>

In the transparent electroconductive laminate of the second present invention, the second ultrafine particles having an average primary particle diameter of 1 to 100 nm and contained in the cured resin layer may have a refractive index larger than that of the resin component contained in the cured resin layer. Particularly, the second ultrafine particles may be particles that increase the refractive index of the cured resin layer compared with the cured resin layer which does not further contain the second ultrafine particles. With respect to specific material, particle diameter, surface modification, production method and the like of the second ultrafine particles, descriptions of the first ultrafine particles can be referred to.

For example, in one embodiment wherein the cured resin layer contains an organic silicon compound as the resin component and contains silica ($SiO_2$) as the first ultrafine particles, the refractive index of the cured resin layer is about 1.50. In this case, ultrafine particles having a large refractive index, such as titanium oxide (refractive index: 2.4), may be selected as the second ultrafine particles.

When dispersing the second ultrafine particles in the cured resin, the blending ratio may be optionally determined in the mixable range. Accordingly, the blending ratio of the second ultrafine particles may be 1 part by mass or more, 10 parts by mass or more, or 30 parts by mass or more, and 500 parts by mass or less, 400 parts by mass of less, 300 parts by mass or less, 200 parts by mass or less, or 150 parts by mass or less, per 100 parts by mass of the resin component after curing. If the ratio of the second ultrafine particles is too small, the change in refractive index of the cured resin layer becomes small, whereas if the ratio is excessively large, a film may be difficult to form or the haze thereof may be increased.

For example, when dispersing the second ultrafine particles in the cured resin, the blending ratio can be selected such that, by containing the second ultrafine particles in the cured resin layer, the refractive index of the cured resin layer is increased by 0.01 or more, 0.02 or more, 0.03 or more, 0.04 or more, 0.05 or more, 0.06 or more, 0.07 or more, 0.08 or more, or 0.10 or more, compared with the cured resin layer which does not contain the second ultrafine particles.

By this increase, the refractive index of the cured resin layer can be 1.55 or more, 1.60 or more, or 1.65 or more, and 1.85 or less, 1.80 or less, or 1.75 or less.

<Optical Interference Layer/Cured Resin Layer Having Fine Protrusions on Surface—Cured Resin Component—Film Thickness>

In the case of using a resin-based optical interference layer/cured resin layer having fine protrusions on the surface, if the film thickness of the resin-based optical interference layer/cured resin layer is too small, effective protrusions may not be formed on the layer surface, which is not preferred.

<Transparent Electroconductive Layer>

In the transparent electroconductive laminates of the first and second present inventions, the transparent electroconductive layer is not particularly limited, and includes, for example, a crystalline metal layer or a crystalline metal compound layer. The component constituting the transparent electroconductive layer includes, for example, a metal oxide such as aluminum oxide, titanium oxide, magnesium oxide, zinc oxide, indium oxide and tin oxide. Above all, a crystalline layer formed of indium oxide as a main component is preferred, and a layer composed of crystalline ITO (Indium Tin Oxide) is more preferably used.

In the case wherein the transparent electroconductive layer is crystalline, the upper limit of the crystal grain size need not be specifically set, but is preferably 3,000 nm or less. If the crystal grain size exceeds 3,000 nm, writing durability is impaired, which is not preferred. The crystal grain size as used herein is defined as a maximum diagonal or diameter out of diagonals or diameters in respective polygonal or oval regions observed through a transmission electron microscope (TEM).

In the case wherein the transparent electroconductive layer is not a crystalline film, sliding durability (or writing durability) or environmental reliability required for a touch panel may be deteriorated.

The transparent electroconductive layer can be formed by a known technique, and, for example, a Physical Vapor Deposition (hereinafter, referred to as "PVD") method such as DC magnetron sputtering method, RF magnetron sputtering method, ion plating method, vacuum deposition method and pulsed laser deposition method may be used. In view of industrial productivity of forming a metal compound layer with a uniform thickness for a large area, a DC magnetron sputtering method is preferred. Incidentally, other than the above-described physical vapor deposition (PVD) method, a chemical formation method such as Chemical Vapor Deposition (hereinafter, referred to as "CVD") method and sol-gel method may be used, but in view of thickness control, a sputtering method is preferred after all.

In view of transparency and electrical conductivity, the film thickness of the transparent electroconductive layer is preferably from 5 to 200 nm, more preferably from 5 to 150 nm, still more preferably from 5 to 80 nm, yet still more preferably from 10 to 50 nm. If the film thickness of the transparent electroconductive layer is less than 5 nm, the aging stability of the resistance value tends to be poor, whereas if it exceeds 200 nm, the surface resistance value lowers, which is not preferred as a touch panel.

In the case of using the transparent electroconductive laminate of the present invention for a touch panel, from the standpoint of, for example, reducing the power consumption of the touch panel and extenting a circuit processing, it is preferred to use a transparent electroconductive layer showing a surface resistance value of 100 to 2,000 Ω/sq, more preferably from 140 to 1,000 Ω/sq, when the film thickness of the transparent electroconductive layer is from 10 to 30 nm.

<Metal Compound Layer>

The transparent electroconductive laminates of the first and second present inventions may further have a metal compound layer having a film thickness of 0.5 nm to less than 5.0 nm, between the optical interference layer/cured resin layer and the transparent electroconductive layer.

The transparent organic polymer substrate, the optical interference layer/cured resin layer, the metal compound layer having a controlled film thickness, and the transparent electroconductive layer are stacked in this order, whereby the adherence between respective layers is greatly improved. Furthermore, when the metal of the ultrafine particles such as metal oxide ultrafine particles and/or metal fluoride ultrafine particles in the optical interference layer is the same as the metal of the metal compound layer, the adherence between the optical interference layer/cured resin layer and the transparent electroconductive layer is more improved.

In a transparent touch panel using the transparent electroconductive laminate having such a metal compound layer, compared with that having no metal compound layer, the writing durability required for the transparent touch panel is enhanced. If the film thickness of the metal compound layer is too large, the metal compound layer starts showing mechanical properties as a continuous body and in turn, the edge-pressing durability required for the transparent touch panel cannot be enhanced. On the other hand, if the film thickness of the metal compound layer is too small, control of the film thickness is difficult, and, in addition, adequate adherence between the optical interference layer/cured resin layer having fine protrusions on the surface and the transparent electroconductive layer cannot be developed, and thereby the writing durability required for the transparent touch panel is not sufficiently improved.

The component constituting the metal compound layer includes, for example, a metal oxide such as silicon oxide, aluminum oxide, titanium oxide, magnesium oxide, zinc oxide, indium oxide and tin oxide. In particular, the resin component and the ultrafine particles contained in the optical interference layer preferably contain the same element.

The metal compound layer can be formed by a known technique, and, for example, a physical vapor deposition (PVD) method such as DC magnetron sputtering method, RF magnetron sputtering method, ion plating method, vacuum deposition method and pulsed laser deposition method may be used. In view of industrial productivity of forming a metal compound layer having a uniform thickness for a large area, a DC magnetron sputtering method is preferred. Incidentally, other than the above-described physical vapor deposition (PVD) method, a chemical formation method such as chemical vapor deposition (CVD) method and sol-gel method may be used, but in view of thickness control, a sputtering method is most preferred.

The target used for sputtering is preferably a metal target, and a reactive sputtering method is widely employed. This is because, the oxide of an element used as the metal compound layer is mostly an insulator, and therefore a DC magnetron sputtering method cannot be applied in many cases when the target is a metal compound target. Also, in recent years, a power source capable of causing two cathodes to simultaneously discharge and thereby suppressing formation of an insulator on the target has been developed, and thereby a pseudo RF magnetron sputtering method becomes applicable.

<Number of Protrusions on Surface>

In the transparent electroconductive laminate of the present invention using an optical interference layer/cured resin layer having fine protrusions on the surface thereof, by the fine protrusions, a combination of high transparency, small haze and sufficient lubricity is provided. Particularly, in the transparent electroconductive laminate of the second present invention, by satisfying the conditions (B-c) to (B-f), fine protrusions are formed on the surface of the cured resin layer, and thereby a combination of high transparency, small haze and sufficient lubricity is provided.

In this case, specifically, the transparent electroconductive layer preferably has 10 to 300, more preferably 20 to 200, still more preferably from 30 to 150 protrusions having a height of 30 to 200 nm per 50 µm square.

Protrusions having a protrusion height of less than 30 nm are not taken into consideration, because of their small effect on lubricity of the laminate. On the other hand, protrusions having a protrusion height of more than 200 nm may impart lubricity to the laminate, but tends to cause light scattering and thereby increase the haze.

If the number of protrusions having height of 30 to 200 nm on the transparent electroconductive layer is too small, the transparent electroconductive laminate may not have sufficient lubricity, whereas if the number of protrusions is too large, significant light scattering may occur on the laminate surface, and, in turn, the haze may be increased.

The a resistance film-type touch panel is an electrical component fabricated by holding two film or sheets having respective transparent electroconductive layers on the opposing sides with a constant distance therebetween. According to the touch panel, while fixing one electrode, another electrode is pressed with a pen or a finger from the viewing side to sag the electrode, and cause contact and electrical conduction, and thereby a sensor circuit is allowed to detect the position and effect a predetermined input. At this time, an interference color called as a Newton ring sometimes appears around the pointing part pressed with the pen, finger or the like, and thereby impairs the visibility of a display. In order to suppress the Newton ring, the interference is prevented by forming an uneven profile on the surface with the later-described additional cured resin layer to diffuse light reflection between electrodes (anti-Newton ring).

In the case of giving an uneven profile to the additional cured resin layer in order to impart an anti-Newton ring function, the number of protrusions having a height of 30 to 200 nm on the transparent electroconductive layer sometimes exceeds 500.

With respect to the present invention, the number of protrusions on the surface of the transparent electroconductive layer was measured by means of an atomic force microscope (AFM), SPA400, manufactured by SII Nano-Technology Inc. in a dynamic focus mode using a scanner with a measurement range of 150 µm, an Si cantilever coated with Al on the back surface (SI-DF40, manufactured by SII NanoTechnology Inc.) as a cantilever, and the scanning range of 50×50 µm. In the measurement, the number of data was 512 in X direction and 512 in Y direction. The obtained profile image data were converted into a three-dimensional profile, the height of each protrusion portion was estimated from the obtained surface data, and the number of protrusions of 30 to 200 nm was counted. Measurement was performed 5 times for each sample, and the average number of protrusions was calculated.

<<Arithmetic Average Roughness (Ra)>>

In the case of a transparent electroconductive laminate requiring low haze, such as a capacitance-type transparent touch panel and a resistance film-type transparent touch panel with low haze, the arithmetic average roughness (Ra) of the surface unevenness of the transparent electroconductive layer is preferably 20 nm or less, more preferably 10 nm or less, still more preferably 8 nm or less. Too large arithmetic average roughness (Ra) is not preferred, because, for example, haze is increased, and when applied to a high-definition liquid crystal display, the definition is impaired.

Incidentally, in the case of giving an uneven profile to the additional cured resin layer in order to impart an anti-Newton ring function, Ra of the surface unevenness is preferably from 20 nm to less than 500 nm, more preferably from 25 to 400 nm, still more preferably from 30 to 350 nm. If the arithmetic average roughness (Ra) is too small, a Newton ring is generated when a glass or film substrate is strongly contacted with the uneven surface of the present invention. On the other hand, if the arithmetic average roughness (Ra) exceeds 500 nm, this is not preferred, particularly as a substrate for a display, because, for example, the haze is increased, and, when applied to a high-definition liquid crystal display, color separation of a pixel is produced to cause sparkling.

Incidentally, with respect to the present invention, the arithmetic average roughness (centerline average roughness) (Ra) is the roughness defined in accordance with JIS B0601-1994. More specifically, when a portion of a reference length L is extracted from a roughness curve in a centerline direction thereof, the centerline of the extracted portion is taken as axis X, the axial magnification direction is taken as axis Y, and the roughness curve is represented by y=f(x), the arithmetic average roughness (Ra) is represented by the following formula:

$$R_a = \frac{1}{l} \int_0^l |f(x)| dx \qquad [\text{Math. 1}]$$

<Total Light Transmittance>

In view of visibility, the total light transmittance of the transparent electroconductive laminate of the present invention is 85% or more, preferably 88% or more, more preferably 89% or more, still more preferably 90% or more.

With respect to the present invention, the total light transmittance is measured in accordance with JIS K7361-1. Specifically, the total light transmittance $\tau_t$ (%) is a value represented by the following formula:

$$\tau_t = \tau_2/\tau_1 \times 100$$

(wherein
$\tau_1$: incident light, and
$\tau_2$: total light transmitted through the sample).

<<Haze>>

In the case of a transparent electroconductive laminate required to have low haze, such as those used for a capacitance-type transparent touch panel and a resistance film-type transparent touch panel with low haze, from the viewpoint of visibility, the haze of the transparent electroconductive laminate of the present invention is preferably 2% or less, more preferably 1.5% or less, still more preferably 1% or less, yet still more preferably 0.5% or less.

On the other hand, in the case of a transparent electroconductive laminate imparted with an anti-Newton ring function, from the viewpoint of the balance between visibility and anti-Newton ring characteristics, the haze of the transparent electroconductive laminate of the present invention may be, in terms of tolerable haze, 2% or more, or 2.5% or more, and is preferably 15% or less, more preferably 12% or less, still more preferably 10% or less.

With respect to the present invention, the haze is the haze defined in accordance with JIS K7136. Specifically, the haze is a value defined as the ratio of the diffuse transmittance $\tau_d$ to the total light transmittance $\tau_t$, and, more specifically, can be determined according to the following formula:

$$\text{Haze } (\%) = [(\tau_4/\tau_2) - \tau_3(\tau_2/\tau_1)] \times 100$$

wherein $\tau_1$: luminous flux of incident light, $\tau_2$: total luminous flux transmitted through the test specimen, $\tau_3$: luminous flux diffused in the apparatus, and $\tau_4$: luminous flux diffused in the apparatus and the test specimen.

EXAMPLES

The present invention is described in greater detail below by referring to Reference Examples, but the present invention is not limited to these Reference Examples. In Reference Examples, unless otherwise indicated, the "parts" and "%" are on the mass basis. Also, various measurements in Reference Examples were performed as follows.

<Ra (Arithmetic Average Roughness)>

Ra was measured by using a stylus profilometer, DEKTAK 3, manufactured by Sloan. The measurement was performed in accordance with JIS B0601-1994.

<Number of Protrusions on Surface (AFM)>

Measurement was performed by means of an atomic force microscope, SPA400, manufactured by SII NanoTechnology Inc. in a dynamic focus mode using a scanner with a measurement range of 150 μm, an Si cantilever coated with Al on the back surface (SI-DF40, manufactured by SII NanoTechnology Inc.) as a cantilever, and the scanning range of 50×50 μm. In the measurement, the number of data was 512 in X direction and 512 in Y direction. The obtained profile image data were converted into a three-dimensional profile, the height of each protrusion portion was estimated from the obtained surface data, and the number of protrusions of 30 to 200 nm was counted. Measurement was performed 5 times for each sample, and the average number of protrusions was calculated.

<Thickness and Refractive Index>

With respect to the thicknesses and refractive indexes of the optical interference layer/cured resin, the transparent electroconductive layer, and the hardcoat layer, each layer was stacked as a single layer under the same coating conditions on an appropriate thermoplastic film substrate having a different refractive index from the layer, and then the thickness and refractive index were calculated by optical simulation using values of the wavelength at which the maximum peak or minimum peak of reflectance appears based on the light interference effect on a light reflection spectrum of the stacked surface, and the peak reflectance thereof. Incidentally, with respect to the present invention, unless otherwise indicated, the refractive index is the refractive index for light having a wavelength of 550 nm.

<Reflection Spectrum>

Each spectrum was measured by the integrating sphere measurement mode of the spectrophotometer, U3500, manufactured by Hitachi Ltd. The measurement was performed by setting the incident angle of measurement light on the sample to 5°, and applying a commercially available black spray on the back surface to form a light-shielding layer and achieve almost no reflection on the back surface of the sample or no light entering from the back surface side. The difference spectrum was obtained by subtracting the reflection spectrum of the laminate having the transparent electroconductive layer from the reflection spectrum of the laminate before having the transparent electroconductive layer. Incidentally, the reflection spectrum of the transparent electroconductive laminate having no the transparent electroconductive layer was measured by treating the prepared transparent electroconductive laminate with an etching solution for removal of the transparent electroconductive layer.

<Haze>

The haze was measured in accordance with JIS K7136 by using a haze meter (MDH2000) manufactured by Nippon Denshoku Industries Co., Ltd.

<Total Light Transmittance>

The total light transmittance was measured in accordance with JIS K7361-1 by using a haze meter (MDH2000) manufactured by Nippon Denshoku Industries Co., Ltd.

<b* Value>

The chromaticness index b* value of the L*a*b* color system defined by JIS Z8729 was measured in a transmission mode in accordance with JIS Z8722. The measurement was performed under the 2-degree visual field conditions by employing, as the light source, standard light $D_{65}$ specified in the Japanese Industrial Standard (JIS) Z8720.

<Lubricity>

The lubricity of the optical interference layer was evaluated by a sensory test based on whether the film was good (A) or bad (B).

<Scratch Resistance>

The transparent electroconductive layer of the prepared transparent electroconductive laminate was lightly rubbed with steel wool, and whether the surface was scratched (B) or not (A) was evaluated.

<Skeleton Visibility Problem>

The prepared transparent electroconductive laminate was cut into a 5-cm square, 8 polyimide tapes of 3 mm in width were adhered to the transparent electroconductive layer in parallel at 3-mm intervals. Subsequently, the laminate having polyimide tapes attached thereto was dipped in an ITO etching solution ("ITO-06N", trade name, produced by Kanto Chemical Co., Inc.) for 1 minute, and ITO in the portion not covered with the polyimide tape was removed to obtain a laminate having therein a patterned 3 mm-wide ITO films at 3-mm intervals. This film was observed with eyes, and evaluated on whether the ITO pattern was scarcely observed (A), slightly observed (B), or observed (C).

<Writing Durability Test>

A writing durability test was performed by linearly moving a polyacetal-made pen with a tip of 0.8 R back and force 500,000 times under a load of 450 g on the movable electrode side of the produced transparent touch panel. The pen was replaced with a new pen every 100,000 times. After moving the pen back and forth 500,000 times on the touch panel, the sample was judged as passed (AA) when the change in linearity between before and after the writing durability test was less than 0.5%, judged as passed (A) when less than 1.0%, judged as passed (B) when less than 1.5%, and judged as failed (C) when 1.5% or more.

<Linearity>

A direct current of 5 V was applied between parallel electrodes on a movable electrode substrate or a fixed electrode substrate. The voltage was measured at 5-mm intervals in the direction perpendicular to the parallel electrodes. Assuming that the voltage at the measurement start position A is EA, the voltage at the measurement end position B is EB, the actual voltage value at the distance X from A is EX, and the theoretical value is ET, the linearity L is represented as follows:

$$ET=(EB-EA)\times X/(B-A)+EA$$

$$L(\%)=(|ET-EX|)/(EB-EA)\times 100$$

Example A1

A polycarbonate film (C110-100, produced by Teijin Chemicals, Ltd.; in the Table, "PC") was used for the transparent organic polymer substrate. Coating Solution H1 described below was coated by a wire bar on one surface of the film, dried at 60° C. for 30 seconds, and then irradiated with an ultraviolet ray at an integrated light quantity of 700 mJ/cm$^2$ from a high-pressure mercury lamp with an intensity of 160 W to form a hardcoat layer (Layer H1) having a film thickness of about 3 μm.
(Coating Solution H1)

A solution is obtained by diluting 59 parts by mass of bisphenoxyethanolfluorene diacrylate (produced by Osaka Gas Chemicals Co., Ltd.) and 41 parts by mass of urethane acrylate ("NK Oligo U-15HA", trade name, produced by Shin-Nakamura Chemical Co., Ltd.) with 1-methoxy-2-propanol as a diluting solvent, further adding 3 parts by mass of Irgacure 184 (produced by Ciba-Geigy) as a photoinitiator, and stirring the mixture until the system became uniform.

On the formed hardcoat layer, Coating Solution R1 described below was coated by a wire bar, and heat-treated at 130° C. for 5 minutes to form a cured resin layer having a film thickness of about 50 nm.
(Coating Solution R1)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 4,200 parts by mass (840 parts by mass in terms of solid content, that is, 100 parts by mass of ultrafine particles per 100 parts by mass of resin monomers charged, and 145 parts by mass of ultrafine particles per 100 parts by mass of cured resin component after curing) of a 20 mass % isopropyl alcohol liquid dispersion of MgF$_2$ ultrafine particles (in the Table, "MgF$_2$") (produced by C. I. Kasei Co., Ltd., average primary particle diameter of ultrafine particles: 50 nm) was added. The mixture was further stirred for 10 minutes to prepare Coating Solution R1. Incidentally, with respect to the present invention, the parts by mass of the resin component after curing is based on the assumption that the condensation reaction of monomers proceeded 100%.

On the surface of the cured resin layer formed, an amorphous transparent electroconductive layer (ITO layer) was formed by a sputtering method using an indium oxide-tin oxide target having a composition of indium oxide and tin oxide in a mass ratio of 95:5 and a filling density of 98%. The ITO layer has a thickness of about 20 nm, and the surface resistance value of about 370 Ω/sq.

Subsequently, a heat treatment at 130° C. for 90 minutes was performed to crystallize the transparent electroconductive layer (ITO layer), and thereby a transparent electroconductive laminate was produced. The transparent electroconductive layer after the ITO layer was crystallized has a thickness of about 20 nm, the refractive index of 2.10, and the surface resistance value of about 450 Ω/sq. The crystal grain size of the transparent electroconductive layer observed by TEM was from 50 to 200 nm.

The characteristics of the produced transparent electroconductive laminate are shown in Table A1.

Example A2

A polyester film ("Teijin Tetron Film", OFW-188, produced by Teijin DuPont Films Japan Limited) was used as the transparent organic polymer substrate. Coating Solution H2 was coated by a wire bar on one surface of the film, dried at 60° C. for 30 seconds, and then irradiated with an ultraviolet ray at an integrated light quantity of 700 mJ/cm$^2$ from a high-pressure mercury lamp with an intensity of 160 W to form a hardcoat layer (Layer H2) having a film thickness of about 3 μm.
(Coating Solution H2)

A solution is obtained by diluting 85 parts by mass of bisphenoxyethanolfluorene diacrylate (produced by Osaka Gas Chemicals Co., Ltd.) and 15 parts by mass of urethane acrylate ("NK Oligo U-15HA", trade name, produced by Shin-Nakamura Chemical Co., Ltd.) with toluene as a diluting solvent, further adding 3 parts by mass of Irgacure 184 (produced by Ciba-Geigy) as a photoinitiator, and stirring the mixture until the system became uniform.

On Layer H2 formed, a cured resin layer having a film thickness of about 50 nm was formed in the same manner as in Example A1.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A1.

Example A3

A polycarbonate film (C110-100, produced by Teijin Chemicals, Ltd.; in the Table, "PC") was used as the transparent organic polymer substrate. Coating Solution H1 was coated on one surface of the film in the same manner as in Example A1 to form a hardcoat layer having a film thickness of about 3 μm.

On the formed hardcoat layer, Coating Solution R2 described below was coated by a wire bar and heat-treated at 130° C. for 5 minutes to form a cured resin layer having a film thickness of about 100 nm.
(Coating Solution R2)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 3,024 parts by mass (453 parts by mass in terms of solid content, i.e., 54 parts by mass of ultrafine particles per 100 parts by mass of resin monomers charged, and 78 parts by mass of ultrafine particles per 100 parts by mass of cured resin component after curing) of a 15 mass % isopropyl alcohol liquid dispersion of titanium oxide ultrafine particles (in the Table, "$TiO_2$") (produced by C. I. Kasei Co., Ltd., average primary particle diameter of ultrafine particles: 30 nm) was added. The mixture was further stirred for 10 minutes to prepare Coating Solution R2.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A1.

Figure 13:
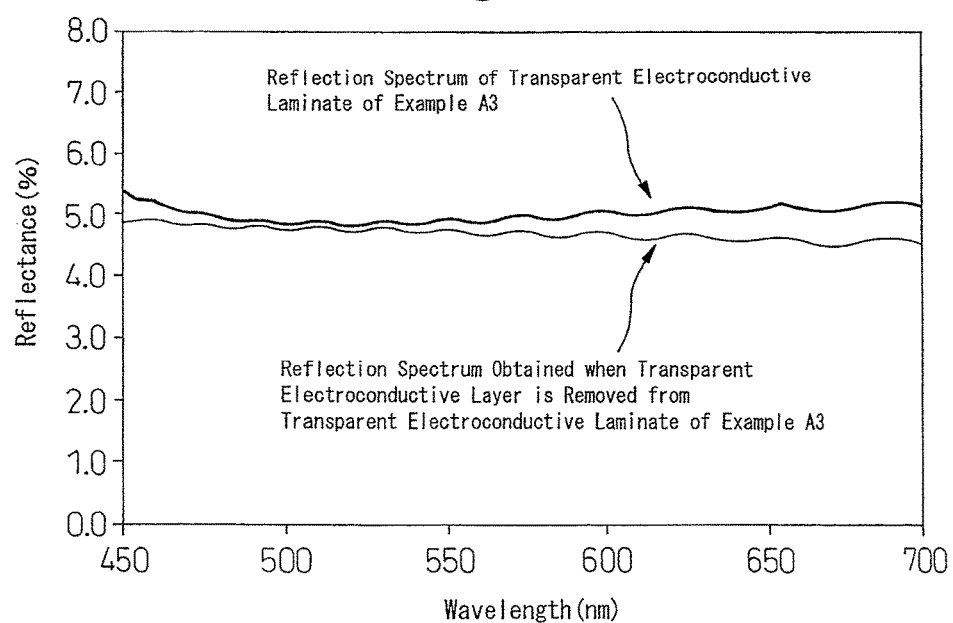
FIG. 13 A reflection spectrum of the transparent electroconductive laminate of Example A3, and a reflection spectrum obtained when the transparent electroconductive layer is removed from the transparent electroconductive laminate.
Figure 15:
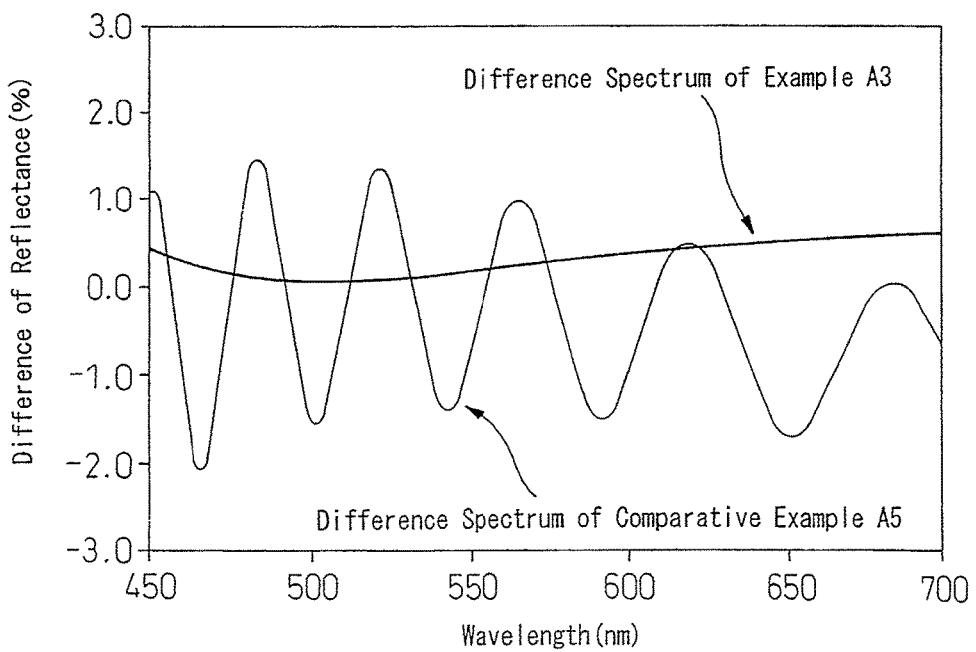
FIG. 15 A difference spectrum between respective reflection spectra shown in FIGS. 13 and 14.

FIG. 13 shows a reflection spectrum of the produced transparent electroconductive laminate, and a reflection spectrum obtained when the transparent electroconductive layer is removed from the transparent electroconductive laminate. Also, FIG. 15 shows a difference spectrum between two reflection spectra shown in FIG. 13.

Example A4

A polycarbonate film (C110-100, produced by Teijin Chemicals, Ltd.; in the Table, "PC") was used as the transparent organic polymer substrate. Coating Solution H1 was coated by a wire bar on one surface of the film, dried at 60° C. for 30 seconds and then irradiated with an ultraviolet ray at an integrated light quantity of 700 mJ/cm² from a high-pressure mercury lamp with an intensity of 160 W to form a hardcoat layer having a film thickness of about 3 μm.

On the formed hardcoat layer, Coating Solution R3 described below was coated by a wire bar and heat-treated at 130° C. for 5 minutes to form a cured resin layer having a film thickness of about 50 nm.
(Coating Solution R3)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.), were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 4,200 parts by mass (840 parts by mass in terms of solid content, i.e., 100 parts by mass of ultrafine particles per 100 parts by mass of resin monomers charged, and 145 parts by mass of ultrafine particles per 100 parts by mass of cured resin component after curing) of a 20 mass % isopropyl alcohol liquid dispersion of $MgF_2$ ultrafine particles (in the Table, "$MgF_2$") (produced by C. I. Kasei Co., Ltd., average primary particle diameter of ultrafine particles: 50 nm) was added, and the mixture was further stirred for 10 minutes. To the resulting solution, an isopropyl alcohol solution containing 4 parts by mass (0.5 parts by mass of ultrafine particles per 100 parts by mass of resin monomers charged, and 0.7 parts by mass of ultrafine particles per 100 parts by mass of cured resin after curing) of surface-unmodified silica ultrafine particles having an average primary particle diameter of 20 nm (in the Table, "$SiO_2$-1") was further added, and the mixture was stirred for 10 minutes to prepare Coating Solution R3.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A1.

Example A5

A polycarbonate film (C110-100, produced by Teijin Chemicals, Ltd.; in the Table, "PC") was used for the transparent organic polymer substrate. Coating Solution H1 was coated by a wire bar on one surface of the film, dried at 60° C. for 30 seconds, and then irradiated with an ultraviolet ray at an integrated light quantity of 700 mJ/cm² from a high-pressure mercury lamp with an intensity of 160 W to form a hardcoat layer having a film thickness of about 3 μm.

On the formed hardcoat layer, Coating Solution R4 described below was coated by a wire bar, and heat-treated at 130° C. for 5 minutes to form a cured resin layer having a film thickness of about 100 nm.
(Coating Solution R4)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 3,024 parts by mass (453 parts by mass in terms of solid content, that is, 54 parts by mass of ultrafine particles per 100 parts by mass of resin monomers charged, and 78 parts by mass of ultrafine particles per 100 parts by mass of cured resin component after curing) of a 15 mass % isopropyl alcohol liquid dispersion of titanium oxide ultrafine particles (in the Table, "$TiO_2$") (produced by C. I. Kasei Co., Ltd., average primary particle diameter of ultrafine particles: 30 nm) was added, and the mixture was further stirred for 10 minutes. To the resulting solution, an isopropyl alcohol solution containing 4 parts by mass (0.5 parts by mass of ultrafine particles per 100 parts by mass of resin monomers charged, and 0.7 parts by mass of ultrafine particles per 100 parts by mass of cured resin after curing) of surface-unmodified silica ultrafine particles having an average primary particle diameter of 20 nm (in the Table, "$SiO_2$-1") was further added, and the mixture was stirred for 10 minutes to prepare Coating Solution R4.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A1.

Comparative Example A1

A polycarbonate film (C110-100, produced by Teijin Chemicals, Ltd.) was used as the transparent organic polymer substrate, and an ITO layer was formed and crystallized directly on one surface of the film in the same manner as in Example A1. The obtained ITO film had the same surface resistance value and crystal grain size as those of the ITO film of Reference Example A1. The characteristics of the produced transparent electroconductive laminate are shown in Table A2.

Comparative Example A2

A polycarbonate film (C110-100, produced by Teijin Chemicals, Ltd.) was used as the transparent organic polymer substrate, and a hardcoat layer having a film thickness of 3 μm was formed on one surface of the film by using an ultraviolet-curable polyfunctional acrylate resin coating material.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A2.

Comparative Example A3

A polycarbonate film (C110-100, produced by Teijin Chemicals, Ltd.) was used as the transparent organic polymer substrate, and a hardcoat layer having a film thickness of 3 μm was formed on one surface of the film by using an ultraviolet-curable polyfunctional acrylate resin coating material. On the hardcoat layer, an optical interference layer having a film thickness of about 50 nm was formed by using Coating Solution R1 in the same manner as in Example A1.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A2.

Comparative Example A4

A polycarbonate film (C110-100, produced by Teijin Chemicals, Ltd.) was used as the transparent organic polymer substrate, and without providing a hardcoat layer on one surface of the film, an optical interference layer having a film thickness of about 50 nm was formed in the same manner as in Example A1.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A2.

Comparative Example A5

A polycarbonate film (C110-100, produced by Teijin Chemicals, Ltd.) was used as the transparent organic polymer substrate, and a hardcoat layer having a film thickness of 3 μm was formed on one surface of the film by using an ultraviolet-curable polyfunctional acrylate resin coating material. On the hardcoat layer, an optical interference layer having a film thickness of about 50 nm was formed by using Coating Solution R2 in the same manner as in Example A3.

Subsequently, an ITO layer was formed and crystallized in the same manner as in Example A1. The obtained ITO film had the same surface resistance value and crystal grain size as those of the ITO film of Example A1. The characteristics of the produced transparent electroconductive laminate are shown in Table A2.

Figure 14:
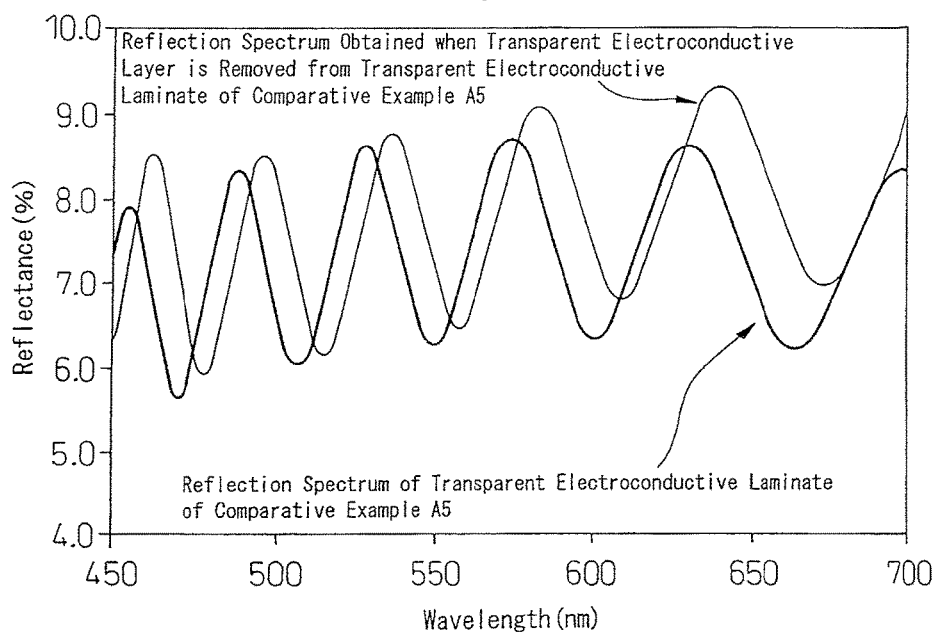
FIG. 14 A reflection spectrum of the transparent electroconductive laminate of Comparative Example A5, and a reflection spectrum obtained the transparent electroconductive layer is removed from the transparent electroconductive laminate.

FIG. 14 shows a reflection spectrum of the produced transparent electroconductive laminate and a reflection spectrum obtained when the transparent electroconductive layer is removed from the transparent electroconductive laminate. Also, FIG. 15 shows a difference spectrum between two reflection spectra shown in FIG. 14, together with the difference spectrum of Example A3.

TABLE A1

|  |  | Example A1 | Example A2 | Example A3 | Example A4 | Example A5 |
|---|---|---|---|---|---|---|
| Substrate | Kind | PC | PET | PC | PC | PC |
|  | Refractive index | 1.585 | 1.61 | 1.585 | 1.585 | 1.585 |
|  | Thickness (μm) | 100 | 100 | 100 | 100 | 100 |
| Hardcoat Layer | Kind | acryl | acryl | acryl | acryl | acryl |
|  | Refractive index | 1.590 | 1.604 | 1.590 | 1.590 | 1.590 |
|  | Thickness (μm) | 3 | 3 | 3 | 3 | 3 |
| Optical Interference Layer | Kind (resin/particles) | silicon-based/$MgF_2$ | silicon-based/$MgF_2$ | silicon-based/$TiO_2$ | silicon-based/$MgF_2$/$SiO_2$ | silicon-based/$TiO_2$/$SiO_2$ |
|  | Ratio (resin/particles) (parts by weight)) | 100/145 | 100/145 | 100/78 | 100/145/0.7 | 100/78/0.7 |
|  | Refractive index | 1.430 | 1.430 | 1.695 | 1.430 | 1.695 |
|  | Thickness (nm) | 50 | 50 | 100 | 50 (with protrusions) | 100 (with protrusions) |
| Transparent Electroconductive Layer | Kind | ITO | ITO | ITO | ITO | ITO |
|  | Refractive index | 2.1 | 2.1 | 2.1 | 2.1 | 2.1 |
|  | Thickness (nm) | 20 | 20 | 20 | 20 | 20 |
| Maximum absolute value (%) at wavelength of 450 to 700 |  | 7.83 | 9.26 | 0.96 | 8.02 | 0.63 |

TABLE A1-continued

|  |  | Example A1 | Example A2 | Example A3 | Example A4 | Example A5 |
|---|---|---|---|---|---|---|
| Integrated value (nm · %) of difference spectrum at wavelength of 450 to 700 | | 1030 | 1262 | 82.6 | 1024 | 76.5 |
| Roughness Ra (nm) | | 2.9 | 3.5 | 3.2 | 6.5 | 6.8 |
| Number of protrusions (pieces/50 μm square) | | 8 | 15 | 10 | 70 | 98 |
| Evaluation results | Total light transmittance (%) | 90.9 | 90.7 | 88.6 | 90.8 | 88.5 |
| | Haze (%) | 0.2 | 0.7 | 0.2 | 0.3 | 0.4 |
| | b* value (—) | 0.7 | 1.2 | 0.5 | 0.8 | 0.5 |
| | Scratch resistance | A | A | A | A | A |
| | Skeleton visibility problem (A/B/C) | C | C | A | C | A |
| | Lubricity | C | C | C | A | A |
| | Writing durability | C | C | C | AA | AA |

TABLE A2

|  |  | Comparative Example A1 | Comparative Example A2 | Comparative Example A3 | Comparative Example A4 | Comparative Example A5 |
|---|---|---|---|---|---|---|
| Substrate | Kind | PC | PC | PC | PC | PC |
| | Refractive index | 1.585 | 1.585 | 1.585 | 1.585 | 1.585 |
| | Thickness (μm) | 100 | 100 | 100 | 100 | 100 |
| Hardcoat Layer | Kind | — | acryl | acryl | — | acryl |
| | Refractive index | — | 1.512 | 1.512 | — | 1.512 |
| | Thickness (μm) | — | 3 | 3 | — | 3 |
| Optical Interference Layer | Kind (resin/particles) | — | — | silicon-based/MgF$_2$ | silicon-based/MgF$_2$ | silicon-based/TiO$_2$ |
| | Ratio (resin/particles (parts by weight)) | — | — | 100/145 | 100/145 | 100/78 |
| | Refractive index | — | — | 1.430 | 1.430 | 1.695 |
| | Thickness (nm) | — | — | 50 | 50 | 50 |
| Transparent Electro-conductive Layer | Kind | ITO | ITO | ITO | ITO | ITO |
| | Refractive index | 2.1 | 2.1 | 2.1 | 2.1 | 2.1 |
| | Thickness (nm) | 20 | 20 | 20 | 20 | 20 |
| Maximum absolute value (%) at wavelength of 450 to 700 | | 4.13 | 4.75 | 8.78 | 7.82 | 1.92 |
| Integrated value (nm · %) of difference spectrum at wavelength of 450 to 700 | | 571 | 635 | 1025 | 990 | 102.5 |
| Roughness Ra (nm) | | 2.8 | 3.2 | 3.5 | 3.6 | 3.4 |
| Number of protrusions (pieces/50 μm square) | | 5 | 9 | 12 | 10 | 12 |
| Evaluation results | Total light transmittance (%) | 88.0 | 89.5 | 90.0 | 90.9 | 89.1 |
| | Haze (%) | 0.2 | 0.2 | 0.2 | 0.2 | 0.2 |
| | b* value (—) | 2.3 | 2.2 | 2.1 | 0.8 | 0.7 |
| | Scratch resistance | C | A | A | C | A |
| | Skeleton visibility problem (A/B/C) | C | C | C | C | B |
| | Lubricity | C | C | C | C | C |
| | Writing durability | C | C | C | C | C |

As apparent from Table A1, the touch panel using the transparent electroconductive laminate of Examples had a combination of good scratch resistance and a preferred color tone (b* value) due to the hardcoat layer having a small refractive index difference from the substrate. Above all, in Examples A3 and 5 having a preferred difference spectrum with respect to the wavelength of 450 to 700 nm, the performance in terms of skeleton visibility problem was good. Furthermore, in Examples A4 and 5 wherein the optical interference has an uneven surface, the writing durability was excellent.

In contrast, as apparent from Table A2, the touch panels using the transparent electroconductive laminate of Comparative Example A1 having neither a hardcoat layer nor an optical interference layer, the transparent electroconductive laminate of Comparative Example A2 having a hardcoat layer but not having an optical interference layer, or the transparent electroconductive laminate of Comparative Example A3 having both a hardcoat layer and an optical interference layer but having a large refractive index difference between the hardcoat layer and the substrate were poor in terms of color tone (b* value), though the scratch resistance was excellent. Also, the touch panel using the transparent electroconductive laminate of Comparative Example A4 not having a hardcoat layer but having an optical interference layer was good in terms of color tone (b* value) but was poor in the scratch resistance. Furthermore, the touch panel using the transparent electroconductive laminate of Comparative Example A5 having both a hardcoat layer and an optical layer, wherein, as shown in Patent Document 8, the refractive index of the optical interference layer is an intermediate value between the refractive index of the transparent electroconductive layer and the refractive index of the hardcoat layer but the refractive index difference between the hardcoat layer and the substrate is large, was good in terms of color tone (b* value) and scratch resistance, but was not in a preferred level as to the skeleton visibility problem.

Example B1

A polycarbonate film (C110-100, produced by Teijin Chemicals, Ltd.; in the Table, "PC") was used as the transparent organic polymer substrate, and Coating Solution P1 described below was coated by a wire bar on one surface of the film and heat-treated at 130° C. for 5 minutes to form a cured resin layer having a film thickness of about 100 nm.
(Coating Solution P1)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.) and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 3,024 parts by mass (453 parts by mass in terms of solid content, that is, 54 parts by mass of ultrafine particles per 100 parts by mass of resin monomers charged, and 78 parts by mass of ultrafine particles per 100 parts by mass of cured resin after curing) of a 15 mass % isopropyl alcohol liquid dispersion of titanium oxide ultrafine particles (in the Table, "TiO$_2$") (produced by C. I. Kasei Co., Ltd., average primary particle diameter of ultrafine particles: 30 nm) was added, and the mixture was further stirred for 10 minutes to prepare Coating Solution P1. Incidentally, with respect to the present invention, the parts by mass of the resin component after curing is based on the assumption that the condensation reaction of monomers proceeded 100%.

On the surface of the cured resin layer formed, an amorphous transparent electroconductive layer (ITO layer) was formed by a sputtering method using an indium oxide-tin oxide target having a composition of indium oxide and tin oxide in a mass ratio of 95:5 and having a filling density of 98%. The ITO layer has a thickness of about 20 nm, and the surface resistance value of about 370 Ω/sq.

Subsequently, a heat treatment at 130° C. for 90 minutes was performed to crystallize the transparent electroconductive layer (ITO layer), and thereby a transparent electroconductive laminate was produced. The transparent electroconductive layer after the ITO layer was crystallized has a thickness of about 20 nm, the refractive index of 2.10, and the surface resistance value of about 450 Ω/sq. The crystal grain size of the transparent electroconductive layer observed by TEM was from 50 to 200 nm.

Figure 16:
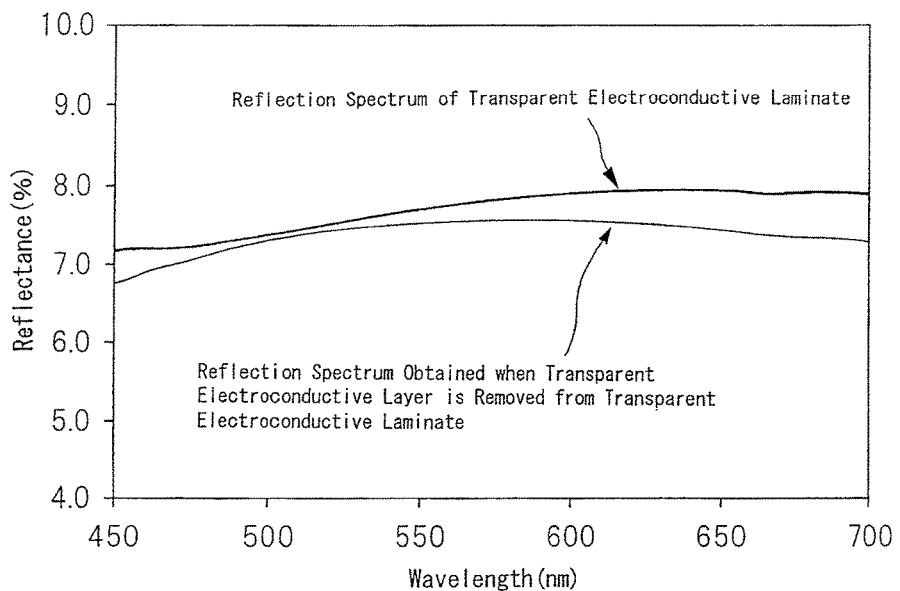
FIG. 16 A reflection spectrum of the transparent electroconductive laminate of Example B1, and a reflection spectrum obtained when the transparent electroconductive layer is removed from the transparent electroconductive laminate.
Figure 18:
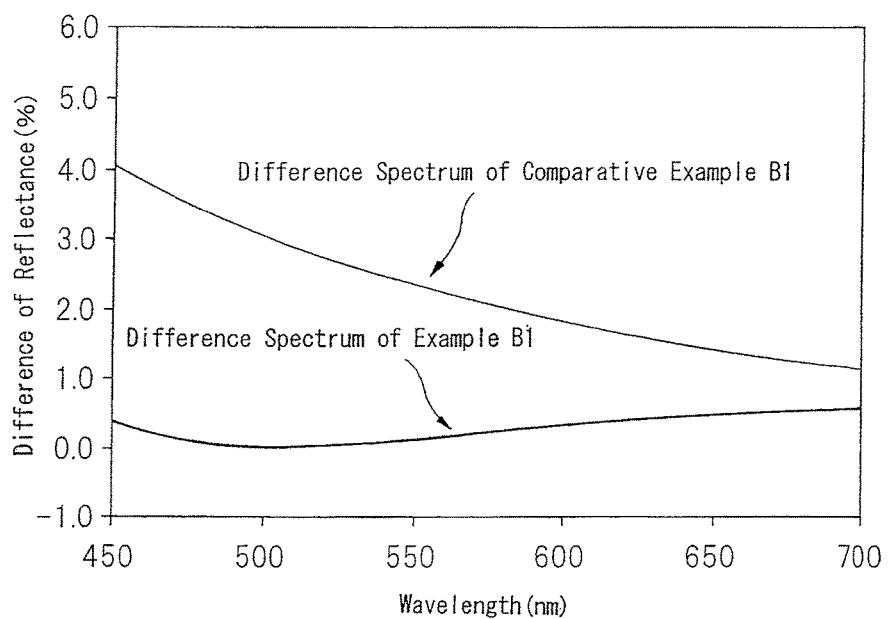
FIG. 18 A difference spectrum between respective reflection spectra shown in FIGS. 16 and 17.

The characteristics of the produced transparent electroconductive laminate are shown in Table B1. FIG. 16 shows a reflection spectrum of the produced transparent electroconductive laminate, and a reflection spectrum obtained when the transparent electroconductive layer is removed from the transparent electroconductive laminate. Also, FIG. 18 shows a difference spectrum between two reflection spectra shown in FIG. 5.

Example B2

A polycarbonate film (C110-100, produced by Teijin Chemicals, Ltd.; in the Table, "PC") was used as the transparent organic polymer substrate, and Coating Solution P2 described below was coated by a wire bar on one surface of the film and heat-treated at 130° C. for 5 minutes to form a cured resin layer having a film thickness of about 100 nm.
(Coating Solution P2)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 3,024 parts by mass (453 parts by mass in terms of solid content, that is, 54 parts by mass of ultrafine particles per 100 parts by mass of resin monomers charged, and 78 parts by mass of ultrafine particles per 100 parts by mass of cured resin after curing) of a 15 mass % isopropyl alcohol liquid dispersion of titanium oxide ultrafine particles (in the Table, "TiO$_2$") (produced by C. I. Kasei Co., Ltd., average primary particle diameter of ultrafine particles: 30 nm) was added, and the mixture was further stirred for 10 minutes. To the resulting solution, an isopropyl alcohol solution containing 4 parts by mass (0.5 parts by mass per 100 parts by mass of resin monomers charged, and 0.7 parts by mass of ultrafine particles per 100 parts by mass of cured resin component after curing) of surface-unmodified silica ultrafine particles having an average primary particle diameter of 20 nm (in the Table, "SiO$_2$-1") was further added, and the mixture was stirred for 10 minutes to prepare Coating Solution P2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Examples B3 to 5

Coating Solution P2 was prepared in the same manner as in Example B2 except that the amounts of the silica ultrafine particles added were changed in the preparation of Coating Solution P2, and a cured resin layer having a film thickness of about 100 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B6

Coating Solution P2 was prepared in the same manner as in Example B2 except that the amount of the titanium oxide ultrafine particle liquid dispersion added was changed in the preparation of Coating Solution P2, and a cured resin layer was formed in the same manner as in Example B2, except for changing the film thickness.

Subsequently, an ITO layer was formed in the same manner as in Example B1 except for chaining the film thickness. The ITO film has a thickness of about 15 nm, and the surface resistance value of about 450 Ω/sq.

Thereafter, a heat treatment at 130° C. for 90 minutes was performed to crystallize the transparent electroconductive layer (ITO layer), and thereby a transparent electroconductive laminate was produced. The surface resistance value of the transparent electroconductive layer after the ITO layer was crystallized was about 540 Ω/sq. The crystal grain size of the transparent electroconductive layer observed by TEM was from 50 to 200 nm.

Example B7

Coating Solution P2 was prepared in the same manner as in Example B2 except that the amount of the titanium oxide ultrafine particle liquid dispersion added was changed in the preparation of Coating Solution P2. A cured resin layer was formed in the same manner as in Example B2, except for changing the film thickness.

Subsequently, an ITO layer was formed in the same manner as in Example B1, except for chaining the film thickness. The ITO film has a thickness of about 50 nm, and the surface resistance value of about 150 Ω/sq.

Thereafter, a heat treatment at 130° C. for 90 minutes was performed to crystallize the transparent electroconductive layer (ITO layer), and thereby a transparent electroconductive laminate was produced. The surface resistance value of the transparent electroconductive layer after the ITO layer was crystallized was about 180 Ω/sq. The crystal grain size of the transparent electroconductive layer observed by TEM was from 50 to 200 nm.

Examples B8 and 9

A cured resin layer was formed in the same manner as in Example B2 except for changing the film thickness.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B10

Coating Solution P2 was prepared in the same manner as in Example B2 except that silica ultrafine particles having an average primary particle diameter of 50 nm (in the Table, "$SiO_2$-2") were used in the preparation of Coating Solution P1, and a cured resin layer having a film thickness of about 100 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B11

A polycarbonate film (C110-100, produced by Teijin Chemicals, Ltd.; in the Table, "PC") was used as the transparent organic polymer substrate, and Coating Solution P3 described below was coated by a wire bar on one surface of the film and heat-treated at 130° C. for 5 minutes to form a cured resin layer having a film thickness of about 100 nm. (Coating Solution P3)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, 7,860 parts by mass (1,179 parts by mass in terms of solid content, that is, 141 parts by mass of ultrafine particles per 100 parts by mass of resin monomers charged, and 203 parts by mass of ultrafine particles per 100 parts by mass of cured resin after curing) of a 15 mass % isopropyl alcohol liquid dispersion of cerium oxide ultrafine particles (in the Table, "$CeO_2$") (produced by C. I. Kasei Co., Ltd., average primary particle diameter of ultrafine particles: 30 nm) was added, and the mixture was further stirred for 10 minutes. To the resulting solution, an isopropyl alcohol solution containing 4 parts by mass (0.5 parts by mass per 100 parts by mass of resin monomers charged, and 0.7 parts by mass of ultrafine particle component per 100 parts by mass of cured resin component after curing) of surface-unmodified silica ultrafine particles having an average primary particle diameter of 20 nm (in the Table, "$SiO_2$-1") was further added, and the mixture was stirred for 10 minutes to prepare Coating Solution P3.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B12

Coating Solution P1 was prepared in the same manner as in Example B1, except that the amount of the titanium oxide ultrafine particle liquid dispersion added was changed in the preparation of Coating Solution P1. A cured resin layer having a film thickness of about 76 nm was formed in the same manner as in Example B1, except for changing the film thickness.

On the surface of the cured resin layer formed, an amorphous transparent electroconductive layer (IZO layer) was formed by a sputtering method using an indium oxide-zinc oxide target having a composition of indium oxide and zinc oxide in a mass ratio of 90:10. The thickness of the IZO layer was about 130 nm, the refractive index was 2.02, and the surface resistance value was about 30 Ω/sq.

The characteristics of the produced transparent electroconductive laminate are shown in Table B1.

Example B13

A polycarbonate film (C110-100, produced by Teijin Chemicals, Ltd.) was used as the transparent organic polymer substrate, and a clear hardcoat layer 1 having a film thickness of 4 μm was formed on one surface of the film by using an ultraviolet-curable polyfunctional acrylate resin coating material. Coating Solution P2 was prepared in the same manner as in Example B2, except that the amount of the silica ultrafine particles added was changed in the preparation of Coating Solution P2. On the clear hardcoat layer 1, a cured resin layer having a film thickness of about 104 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B14

A polyester film ("Teijin Tetron Film", OFW-188, produced by Teijin DuPont Films Japan Limited) was used as the transparent organic polymer substrate, and a clear hardcoat layer 1 having a film thickness of 4 μm was formed on one surface of the film by using an ultraviolet-curable polyfunctional acrylate resin coating material. Coating Solution P2 was prepared in the same manner as in Example B2 except that the amount of the silica ultrafine particles added was changed in the preparation of Coating Solution P2. On the clear hardcoat layer, a cured resin layer having a film thickness of about 104 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B15

A polycarbonate film (C110-100, produced by Teijin Chemicals, Ltd.; in the Table, "PC") was used as the transparent organic polymer substrate, and Coating Solution P4 described below was coated by a wire bar on one surface of the film, dried at 60° C. for 30 seconds and then irradiated with an ultraviolet ray at an integrated light quantity of 700 mJ/cm$^2$ from a high-pressure mercury lamp with an intensity of 160 W to form a cured resin layer having a film thickness of about 100 nm.
(Coating Solution P4)

To 200 parts by mass (resin component: 50%) of ultraviolet-curable urethane acrylate ("NK Oligo U-15HA", trade name, produced by Shin-Nakamura Chemical Co., Ltd.), 480 parts by mass (72 parts by mass in terms of solid content, i.e., 72 parts by mass of ultrafine particles per 100 parts by mass of cured resin after curing) of a 15 mass % isopropyl alcohol liquid dispersion of titanium oxide ultrafine particles (in the Table, "TiO$_2$") (produced by C. I. Kasei Co., Ltd., average primary particle diameter of ultrafine particles: 30 nm) was added. The obtained mixture was diluted with isopropyl alcohol, and stirred until the system became uniform to prepare Coating Solution P4.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

Example B16

A polyester film ("Teijin Tetron Film", OFW-188, produced by Teijin DuPont Films Japan Limited) was used as the transparent organic polymer substrate.
<Formation of Additional Resin Layer>

An additional resin layer having an anti-Newton ring function was prepared by referring to Example B1 of JP-A-2009-123685. That is, an additional resin layer was prepared as follows.
(Additional Resin Layer (Q1))

Coating Solution Q1 described below was coated by a bar coating method on one surface of the substrate, dried at 70° C. for 1 minute, and then cured by irradiation with an ultraviolet ray to form Additional Cured Resin Layer Q1 having a thickness of 3.5 μm.
(Coating Solution Q1)

Coating Solution Q1 was produced by dissolving 4 parts by weight of an unsaturated double bond-containing acrylic copolymer (SP value: 10.0, Tg: 92° C.), 100 parts by weight of pentaerythritol triacrylate cap value: 12.7), and 7 parts by weight of photopolymerization initiator Irgacure 184 (produced by Ciba Specialty Chemicals) in an isobutyl alcohol solvent to provide a solid content of 40 wt %. The unsaturated double bond-containing acrylic copolymer (SP value: 10.0, Tg: 92° C.) was prepared as follows.

A mixture consisting of 171.6 g of isoboronyl methacrylate, 2.6 g of methyl methacrylate, and 9.2 g of methylacrylic acid was mixed, and this mixed solution was added dropwise, simultaneously with 80.0 g of a propylene glycol monomethyl ether solution containing 1.8 g of tertiary butylperoxy-2-ethylhexanoate, to 330.0 g of propylene glycol monomethyl ether heated to 110° C. under a nitrogen atmosphere in a 1,000 ml-volume reaction vessel equipped with a stirring blade, a nitrogen inlet tube, a condenser and a dropping funnel at a constant speed over 3 hours. Thereafter, the reaction was allowed to proceed at 110° C. for 30 minutes. Subsequently, 17.0 g of a propylene glycol monomethyl ether solution containing 0.2 g of tertiary butylperoxy-2-ethylhexanoate was added dropwise to the mixture, 5.0 g of a propylene glycol monomethyl ether solution containing 1.4 g of tetrabutylammonium bromide and 0.1 g of hydroquinone was added thereto, a solution containing 22.4 g of 4-hydroxybutyl acrylate glycidyl ether and 5.0 g of propylene glycol monomethyl ether was added dropwise over 2 hours with air bubbling, and the reaction was further allowed to proceed over 5 hours to obtain an unsaturated double bond-containing acrylic copolymer having a number average molecular weight of 5,500 and a weight average molecular weight of 18,000. This resin had an SP value of 10.0, Tg of 92° C., and a surface tension of 31 dyn/cm.
(Additional Resin Layer (Q2))

Coating Solution Q2 described below was coated by a bar coating method on the surface opposite the surface having Additional Cured Resin Layer Q1. The coating was dried at 70° C. for 1 minute, and then cured by irradiation with an ultraviolet ray to form Cured Resin Layer Q2 having a thickness of 3.5 μm.
(Coating Solution Q2)

Coating Solution Q2 was produced by dissolving 4 parts by weight of the unsaturated double bond-containing acrylic copolymer prepared above (SP value: 10.0, Tg: 92° C.), 90 parts by weight of pentaerythritol triacrylate (SP value: 12.7), 10 parts by weight of trimethylolpropane triethylene glycol triacrylate (SP value: 11.6), and 7 parts by weight of photopolymerization initiator Irgacure 184 (produced by Ciba Specialty Chemicals) in an isobutyl alcohol solvent to have a solid content of 40 wt %.

<Formation of Cured Resin Layer>

Coating Solution P1 was prepared in the same manner as in Example B1, except that the amount of the titanium oxide ultrafine particle liquid dispersion added was changed in the preparation of Coating Solution P1. Also, on Additional Cured Resin Layer Q1, a cured resin layer having a film thickness of about 90 nm was formed in the same manner as in Example B1, except for changing the film thickness.

<Formation of Transparent Electroconductive Layer>

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B1.

The characteristics of the produced transparent electroconductive laminate are shown in Table B1.

<Formation of Touch Panel>

After coating $SiO_2$ on both surfaces of a 1.1 mm-thick glass plate by dip coating, a 18 nm-thick ITO layer was formed by a sputtering method. Subsequently, dot spacers having a height of 7 μm and a diameter of 70 μm were located on the ITO layer at an interval of 1.5 mm to produce a fixed electrode substrate.

Figure 19:
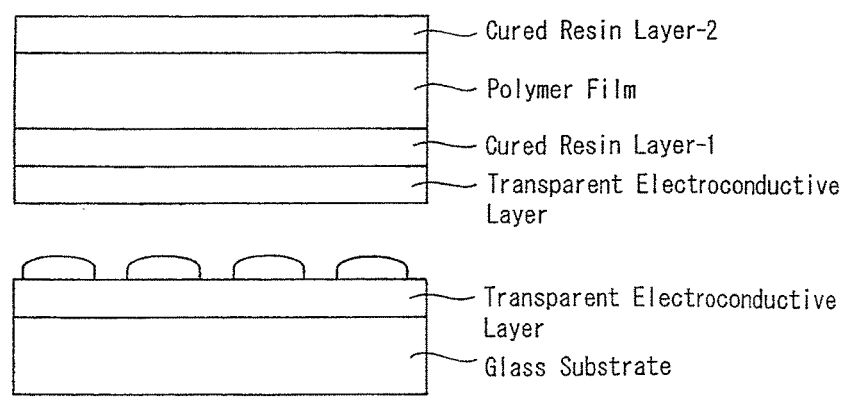
FIG. 19 A view showing the configuration of the touch panel obtained in Example B16.

A touch panel having the layer structure shown in FIG. 19 was fabricated using a fixed electrode substrate and a movable electrode substrate. The touch panel using the transparent electroconductive laminate of this example, has a good anti-Newton ring property, and a Newton ring was not observed. The anti-Newton ring property was evaluated by visually observing the presence or absence of a Newton ring under a three wave fluorescent lamp from the oblique direction at 60° with respect to the touch panel surface (0° in the vertical direction) in the region where the movable electrode substrate and the fixed electrode substrate were contacted.

Comparative Example B1

A polycarbonate film (C110-100, produced by Teijin Chemicals, Ltd.) was used as the transparent organic polymer substrate, and an ITO layer was formed and crystallized directly on one surface of the film in the same manner as in Example B1. The obtained ITO film had the same surface resistance value and crystal grain size as those of the ITO film of Example B1.

Figure 17:
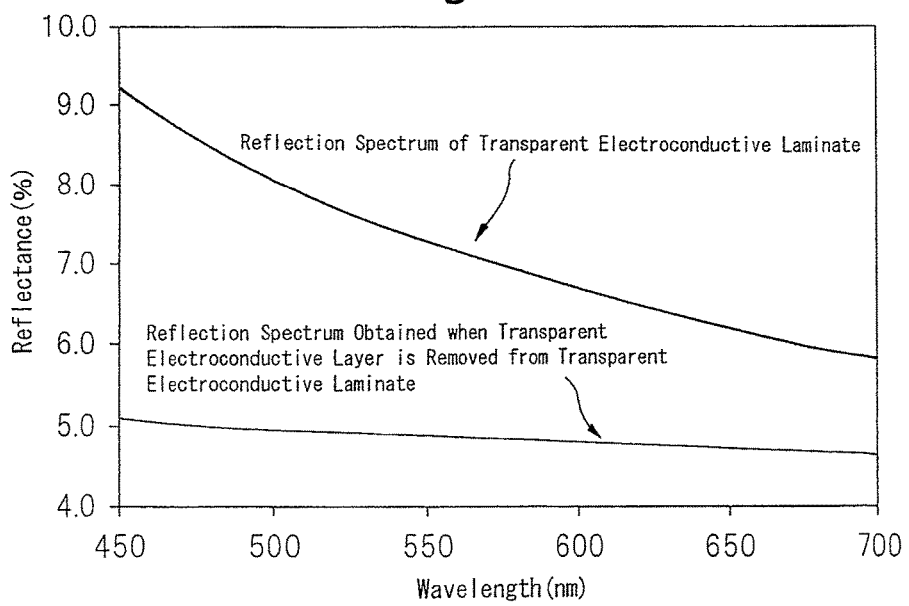
FIG. 17 A reflection spectrum of the transparent electroconductive laminate of Comparative Example B1, and a reflection spectrum obtained when the transparent electroconductive layer is removed from the transparent electroconductive laminate.

The characteristics of the produced transparent electroconductive laminate are shown in Table B2. FIG. 17 shows a reflection spectrum of the produced transparent electroconductive laminate and a reflection spectrum obtained when the transparent electroconductive layer is removed from the transparent electroconductive laminate. Also, FIG. 18 shows a difference spectrum between two reflection spectra shown in FIG. 17, together with the difference spectrum of Example B1.

Comparative Example B2

Coating Solution P1 was prepared in the same manner as in Example B1, except that the titanium oxide ultrafine particles were not added in the preparation of Coating Solution P1. A cured resin layer having a film thickness of about 100 nm was formed in the same manner as in Example B1.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B2.

Comparative Example B3

Coating Solution P2 was prepared in the same manner as in Example B2, except that the titanium oxide ultrafine particles were not added in the preparation of Coating Solution P2. A cured resin layer having a film thickness of about 100 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B2.

Comparative Examples B4 and 5

Coating Solution P2 was prepared in the same manner as in Example B2, except that the amount of the titanium oxide ultrafine particles added were changed in the preparation of Coating Solution P2. A cured resin layer having a film thickness of about 100 nm was formed in the same manner as in Example B2.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B2.

Comparative Examples B6 and 7

A cured resin layer was formed in the same manner as in Example B2, except for changing the film thickness.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B2.

Comparative Example B8

An additional cured resin layer was formed in the same manner as in Example B16 except that the cured resin layer of Coating Solution P1 was not formed.

Subsequently, an ITO layer was formed and crystallized in the same manner as in Example B1. The obtained ITO film had the same surface resistance value and crystal grain size as those of the ITO film of Example B1. The characteristics of the produced transparent electroconductive laminate are shown in Table B2.

TABLE B1

| Item | | | Example B1 | Example B2 | Example B3 | Example B4 | Example B5 | Example B6 |
|---|---|---|---|---|---|---|---|---|
| Substrate | Kind | | PC | PC | PC | PC | PC | PC |
| | Refractive index (n3) (@550 nm) | | 1.585 | 1.585 | 1.585 | 1.585 | 1.585 | 1.585 |
| Cured resin layer | Resin | Kind | silicon-based | silicon-based | silicon-based | silicon-based | silicon-based | silicon-based |
| | | Ratio (parts by mass) | 100 | 100 | 100 | 100 | 100 | 100 |
| | Ultrafine particles A | Kind | $TiO_2$ | $TiO_2$ | $TiO_2$ | $TiO_2$ | $TiO_2$ | $TiO_2$ |
| | | Average primary particle diameter (nm) | 30 | 30 | 30 | 30 | 30 | 30 |
| | | Ratio (parts by mass) | 78 | 78 | 78 | 78 | 78 | 68 |
| | Ultrafine particles B | Kind | — | $SiO_2$-1 | $SiO_2$-1 | $SiO_2$-1 | $SiO_2$-1 | $SiO_2$-1 |
| | | Average primary particle diameter (nm) | — | 20 | 20 | 20 | 20 | 20 |
| | | Ratio (parts by mass) | — | 0.7 | 0.07 | 0.02 | 2.5 | 0.7 |
| | Refractive index (n2) (@550 nm) | | 1.695 | 1.695 | 1.695 | 1.695 | 1.692 | 1.672 |
| | Thickness (d2) (nm) | | 100 | 100 | 100 | 100 | 100 | 105 |
| Transparent electro-conductive layer | Kind | | ITO | ITO | ITO | ITO | ITO | ITO |
| | Refractive index (n1) (@550 nm) | | 2.10 | 2.10 | 2.10 | 2.10 | 2.10 | 2.10 |
| | Thickness (d1) (nm) | | 20 | 20 | 20 | 20 | 20 | 15 |
| Relationship of n1 > n2 > n3 | | | Yes | Yes | Yes | Yes | Yes | Yes |
| n2/(n1 + n3) | | | 0.46 | 0.46 | 0.46 | 0.46 | 0.4592 | 0.4537 |
| n2d2/{(n1d1)^ − 0.12} | | | 265.4 | 265.4 | 265.4 | 265.4 | 265 | 265.6 |
| Maximum absolute value at wavelength of 400 to 700 (%) | | | 0.60 | 0.63 | 0.62 | 0.65 | 0.64 | 0.83 |
| Integrated value of difference spectrum at wavelength of 400 to 700 (nm · %) | | | 75.6 | 76.2 | 75.4 | 80.4 | 78.5 | 120.6 |
| Evaluation | Thickness Ra (nm) | | 3.0 | 7.0 | 4.1 | 4.5 | 16.1 | 6.5 |
| | Number of protrusions (pieces/50 μm square) | | 8 | 75 | 20 | 28 | 262 | 62 |
| | Haze (%) | | 0.2 | 0.3 | 0.3 | 0.3 | 0.6 | 0.3 |
| | Total light transmittance (%) | | 88.5 | 88.3 | 88.4 | 88.3 | 88.3 | 89.5 |
| | b*value (—) | | 0.5 | 0.5 | 0.5 | 0.5 | 0.5 | −0.3 |
| | Skeleton visibility problem (A/B/C) | | A | A | A | A | A | A |
| | Lubricity (A/B) | | C | A | A | A | A | A |
| | Writing durability test (AA/A/B/C) | | C (100,000 times or less) | AA | AA | A | A | AA |

| Item | | | Example B7 | Example B8 | Example B9 | Example B10 | Example B11 | Example B12 |
|---|---|---|---|---|---|---|---|---|
| Substrate | Kind | | PC | PC | PC | PC | PC | PC |
| | Refractive index (n3) (@550 nm) | | 1.585 | 1.585 | 1.585 | 1.585 | 1.585 | 1.585 |
| Cured resin layer | Resin | Kind | silicon-based | silicon-based | silicon-based | silicon-based | silicon-based | silicon-based |
| | | Ratio (parts by mass) | 100 | 100 | 100 | 100 | 100 | 100 |
| | Ultrafine particles A | Kind | $TiO_2$ | $TiO_2$ | $TiO_2$ | $TiO_2$ | $CeO_2$ | $TiO_2$ |
| | | Average primary particle diameter (nm) | 30 | 30 | 30 | 30 | 30 | 30 |
| | | Ratio (parts by mass) | 91 | 78 | 78 | 78 | 203 | 70 |
| | Ultrafine particles B | Kind | $SiO_2$-1 | $SiO_2$-1 | $SiO_2$-1 | $SiO_2$-1 | $SiO_2$-1 | — |
| | | Average primary particle diameter (nm) | 20 | 20 | 20 | 50 | 20 | — |
| | | Ratio (parts by mass) | 0.7 | 0.7 | 0.7 | 0.7 | 0.7 | — |
| | Refractive index (n2) (@550 nm) | | 1.756 | 1.692 | 1.692 | 1.692 | 1.695 | 1.726 |
| | Thickness (d2) (nm) | | 85 | 94 | 103 | 100 | 100 | 76 |
| Transparent electro-conductive layer | Kind | | ITO | ITO | ITO | ITO | ITO | IZO |
| | Refractive index (n1) (@550 nm) | | 2.10 | 2.10 | 2.10 | 2.10 | 2.10 | 2.02 |
| | Thickness (d1) (nm) | | 50 | 20 | 20 | 20 | 20 | 130 |
| Relationship of n1 > n2 > n3 | | | Yes | Yes | Yes | Yes | Yes | Yes |
| n2/(n1 + n3) | | | 0.4765 | 0.4592 | 0.4592 | 0.4592 | 0.46 | 0.479 |
| n2d2/{(n1d1)^ − 0.12} | | | 260.9 | 249.1 | 272.9 | 265 | 265.4 | 255.9 |
| Maximum absolute value at wavelength of 400 to 700 (%) | | | 0.93 | 0.98 | 1.35 | 0.65 | 0.70 | 1.65 |
| Integrated value of difference spectrum at wavelength of 400 to 700 (nm · %) | | | 101.2 | 115.2 | 65.4 | 76.4 | 82.5 | 135.0 |
| Evaluation | Thickness Ra (nm) | | 6.8 | 6.5 | 6.4 | 5.9 | 6.8 | 3.0 |
| | Number of protrusions (pieces/50 μm square) | | 75 | 60 | 62 | 68 | 67 | 8 |

TABLE B1-continued

|  |  |  |  |  |  |  |
|---|---|---|---|---|---|---|
| Haze (%) | 0.4 | 0.3 | 0.3 | 0.3 | 0.3 | 0.2 |
| Total light transmittance (%) | 87.0 | 87.8 | 89.0 | 88.5 | 88.7 | 86.5 |
| b*value (—) | 1.6 | 0.3 | 0.9 | 0.6 | 0.4 | 0.5 |
| Skeleton visibility problem (A/B/C) | A | B | B | A | A | B |
| Lubricity (A/B) | A | A | A | A | A | C |
| Writing durability test (AA/A/B/C) | AA | AA | AA | B | AA | C (100,000 times or less) |

| Item | | | Example B13 | Example B14 | Example B15 | Example B16 |
|---|---|---|---|---|---|---|
| Substrate | Kind | | PC (with hardcoat layer) | PET (with hardcoat layer) | PC | PET |
|  | Refractive index (n3) (@550 nm) | | 1.512 | 1.512 | 1.585 | 1.530 |
| Cured resin layer | Resin | Kind | silicon-based | silicon-based | acrylic | acrylic |
|  |  | Ratio (parts by mass) | 100 | 100 | 100 | 100 |
|  | Ultrafine particles A | Kind | $TiO_2$ | $TiO_2$ | $TiO_2$ | $TiO_2$ |
|  |  | Average primary particle diameter (nm) | 30 | 30 | 30 | 30 |
|  |  | Ratio (parts by mass) | 39 | 39 | 72 | 82 |
|  | Ultrafine particles B | Kind | $SiO_2$-1 | $SiO_2$-1 | — | — |
|  |  | Average primary particle diameter (nm) | 20 | 20 | — | — |
|  |  | Ratio (parts by mass) | 0.7 | 0.7 | — | — |
|  | Refractive index (n2) (@550 nm) | | 1.628 | 1.628 | 1.694 | 1.700 |
|  | Thickness (d2) (nm) | | 104 | 104 | 100 | 90 |
| Transparent electro-conductive layer | Kind | | ITO | ITO | ITO | ITO |
|  | Refractive index (n1) (@550 nm) | | 2.10 | 2.10 | 2.10 | 2.10 |
|  | Thickness (d1) (nm) | | 20 | 20 | 20 | 20 |
| Relationship of n1 > n2 > n3 | | | Yes | Yes | Yes | Yes |
| n2/(n1 + n3) | | | 0.4507 | 0.4507 | 0.4597 | 0.4683 |
| n2d2/{(n1d1)^ − 0.12} | | | 265.1 | 265.1 | 265.3 | 239.6 |
| Maximum absolute value at wavelength of 400 to 700 (%) | | | 1.93 | 1.95 | 0.64 | 1.12 |
| Integrated value of difference spectrum at wavelength of 400 to 700 (nm · %) | | | 90.5 | 100.3 | 65.2 | 150.0 |
| Evaluation | Thickness Ra (nm) | | 6.4 | 7.3 | 3.1 | 110 |
|  | Number of protrusions (pieces/50 μm square) | | 55 | 77 | 5 | >500 |
|  | Haze (%) | | 0.3 | 0.8 | 0.1 | 8.5 |
|  | Total light transmittance (%) | | 89.1 | 88.9 | 88.5 | 85.5 |
|  | b*value (—) | | 0.7 | 1.1 | 0.6 | 2.5 |
|  | Skeleton visibility problem (A/B/C) | | B | B | A | A |
|  | Lubricity (A/B) | | A | A | C | A |
|  | Writing durability test (AA/A/B/C) | | AA | AA | C (100,000 times or less) | AA |

TABLE B2

| Item | | | Comparative Example B 1 | Comparative Example B 2 | Comparative Example B 3 | Comparative Example B 4 |
|---|---|---|---|---|---|---|
| Substrate | Kind | | PC | PC | PC | PC |
|  | Refractive index (n3) (@550 nm) | | 1.585 | 1.585 | 1.585 | 1.585 |
| Cured resin layer | Resin | Kind | — | silicon-based | silicon-based | silicon-based |
|  |  | Ratio (parts by mass) | — | 100 | 100 | 100 |
|  | Ultrafine particles A | Kind | — | — | — | $TiO_2$ |
|  |  | Average primary particle diameter (nm) | — | — | — | 30 |
|  |  | Ratio (parts by mass) | — | — | — | 15 |
|  | Ultrafine particles B | Kind | — | — | $SiO_2$-1 | $SiO_2$-1 |
|  |  | Average primary particle diameter (nm) | — | — | 20 | 20 |
|  |  | Ratio (parts by mass) | — | — | 0.7 | 0.7 |
|  | Refractive index (n2) (@550 nm) | | — | 1.502 | 1.502 | 1.550 |
|  | Thickness (d2) (nm) | | — | 100 | 100 | 100 |
| Transparent electro-conductive layer | Kind | | ITO | ITO | ITO | ITO |
|  | Refractive index (n1) (@550 nm) | | 2.10 | 2.10 | 2.10 | 2.10 |
|  | Thickness (d1) (nm) | | 20 | 20 | 20 | 20 |
| Relationship of n1 > n2 > n3 | | | No | No | No | No |
| n2/(n1 + n3) | | | — | 0.4076 | 0.4076 | 0.4206 |

TABLE B2-continued

| | | | | |
|---|---|---|---|---|
| $n_2d_2/\{(n_1d_1)^{\wedge} - 0.12\}$ | — | 235.2 | 235.2 | 242.7 |
| Maximum absolute value at wavelength of 400 to 700 (%) | 4.13 | 6.81 | 6.92 | 3.30 |
| Integrated value of difference spectrum at wavelength of 400 to 700 (nm · %) | 571 | 895 | 875 | 517 |
| Evaluation Thickness Ra (nm) | 2.8 | 3.2 | 6.4 | 3.5 |
| Number of protrusions (pieces/50 μm square) | 5 | 6 | 75 | 9 |
| Haze (%) | 0.1 | 0.1 | 0.3 | 0.1 |
| Total light transmittance (%) | 88.0 | 89.7 | 89.6 | 89.3 |
| b*value (—) | 2.3 | 1.7 | 1.7 | 1.8 |
| Skeleton visibility problem (A/B/C) | C | C | C | C |
| Lubricity (A/B) | C | C | A | A |
| Writing durability test (AA/A/B/C) | C (100,000 times or less) | C (100,000 times or less) | AA | AA |

| Item | | | Comparative Example B 5 | Comparative Example B 6 | Comparative Example B 7 | Comparative Example B 8 |
|---|---|---|---|---|---|---|
| Substrate | Kind | | PC | PC | PC | PET |
| | Refractive index (n3) (@550 nm) | | 1.585 | 1.585 | 1.585 | 1.530 |
| Cured resin layer | Resin | Kind | silicon-based | silicon-based | silicon-based | silicon-based |
| | | Ratio (parts by mass) | 100 | 100 | 100 | 100 |
| | Ultrafine particles A | Kind | $TiO_2$ | $TiO_2$ | $TiO_2$ | $TiO_2$ |
| | | Average primary particle diameter (nm) | 30 | 30 | 30 | 30 |
| | | Ratio (parts by mass) | 200 | 78 | 78 | 82 |
| | Ultrafine particles B | Kind | $SiO_2$-1 | $SiO_2$-1 | $SiO_2$-1 | — |
| | | Average primary particle diameter (nm) | 20 | 20 | 20 | — |
| | | Ratio (parts by mass) | 0.7 | 0.7 | 0.7 | — |
| | Refractive index (n2) (@550 nm) | | 1.845 | 1.695 | 1.695 | — |
| | Thickness (d2) (nm) | | 100 | 80 | 120 | — |
| Transparent electro-conductive layer | Kind | | ITO | ITO | ITO | ITO |
| | Refractive index (n1) (@550 nm) | | 2.10 | 2.10 | 2.10 | 2.10 |
| | Thickness (d1) (nm) | | 20 | 20 | 20 | 20 |
| Relationship of n1 > n2 > n3 | | | Yes | Yes | Yes | No |
| $n_2/(n_1 + n_3)$ | | | 0.5007 | 0.46 | 0.46 | — |
| $n_2d_2/\{(n_1d_1)^{\wedge} - 0.12\}$ | | | 288.9 | 212.3 | 318.5 | — |
| Maximum absolute value at wavelength of 400 to 700 (%) | | | 4.50 | 1.61 | 3.00 | 5.30 |
| Integrated value of difference spectrum at wavelength of 400 to 700 (nm · %) | | | −810 | 283.4 | 41.5 | 700.0 |
| Evaluation | Thickness Ra (nm) | | 15.6 | 17.8 | 8.8 | 125 |
| | Number of protrusions (pieces/50 μm square) | | 368 | >500 | 8 | >500 |
| | Haze (%) | | 2.8 | 4.6 | 1.1 | 9.8 |
| | Total light transmittance (%) | | 87.9 | 87.4 | 88.7 | 87.0 |
| | b*value (—) | | 3.2 | 2.4 | 1.8 | 2.3 |
| | Skeleton visibility problem (A/B/C) | | C | C | C | C |
| | Lubricity (A/B) | | A | A | A | A |
| | Writing durability test (AA/A/B/C) | | B | AA | AA | AA |

As apparent from Table B1, in all of the touch panels using the transparent electroconductive laminates of the examples, the performance in terms of skeleton visibility was good. Incidentally, in Examples B2 to B11, B13 and B14 using a cured resin layer having fine protrusions on the surface, the haze was low and at the same time, the writing (sliding) durability was excellent. In contrast, as apparent from Table B2, in all of touch panels using the transparent electroconductive laminates of the comparative examples, the performance in terms of skeleton visibility was bad.

Figure 20:
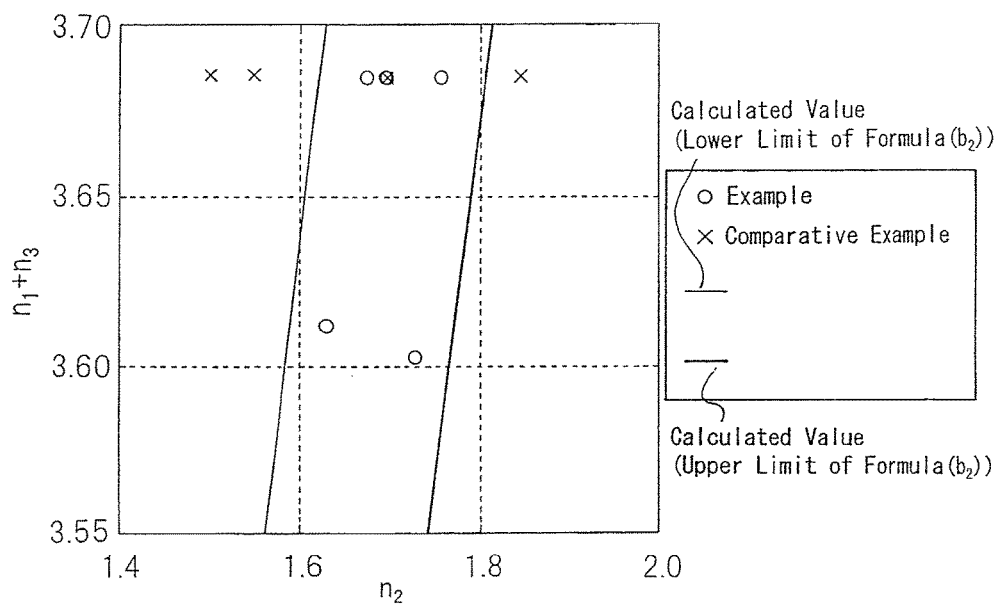
FIG. 20 A view showing, with respect to formula (B-b1), the relationship between the thickness and the refractive index of respective layers of the transparent electroconductive laminates of Example and Comparative Example.
Figure 21:
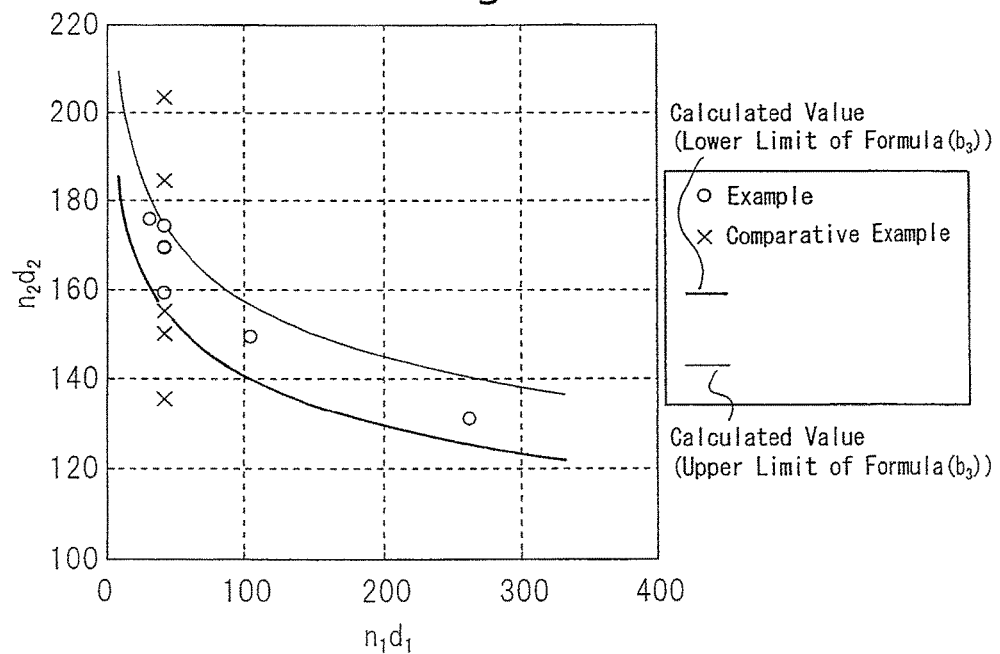
FIG. 21 A view showing, with respect to formula (B-b2), the relationship between the thickness and the refractive index of respective layers of the transparent electroconductive laminates of Example and Comparative Example.

FIGS. 20 and 21 are drawn by plotting the relationships with respect to the following formulae (B-b2) and (B-b3), respectively, and it is revealed that satisfying these formulae is important for obtaining a desired difference spectrum:

$$0.44 < n_2/(n_1 + n_3) < 0.49 \quad \text{(B-b2)}$$

$$245 < n_2 d_2/(n_1 d_1)^{-0.12} < 275 \quad \text{(B-b3)}$$

Reference Example 1

A polycarbonate film (C110-100, produced by Teijin Chemicals, Ltd.; in the Table, "PC") was used as the transparent organic polymer substrate, and Coating Solution X2 was coated by a wire bar on one surface of the film and heat-treated at 130° C. for 5 minutes to form an optical interference layer having a film thickness of about 50 nm.

(Coating Solution X2)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, an isopropyl alcohol solution containing 4 parts by mass (0.5 parts by mass of ultrafine particles per 100 parts by mass of resin monomers charged, and 0.7 parts by mass of ultrafine particles per 100 parts by mass of cured resin component after curing) of surface-unmodified silica ultrafine particles having an average primary particle diameter of 20 nm (in the Table, "$SiO_2$-1") was further added, and the mixture was stirred for 10 minutes to prepare Coating Solution X2.

On the surface of the optical interference layer formed, an amorphous transparent electroconductive layer (ITO layer) was formed by a sputtering method using an indium oxide-tin oxide target having a composition of indium oxide and tin oxide in a mass ratio of 95:5 and having a filling density of 98%. The ITO layer has a thickness of about 20 nm, and the surface resistance value of about 370 Ω/sq.

Subsequently, a heat treatment at 130° C. for 90 minutes was performed to crystallize the transparent electroconductive layer (ITO layer), and thereby a transparent electroconductive laminate was produced. The transparent electroconductive layer after the ITO layer was crystallized has a thickness of about 20 nm, the refractive index of 2.10, and the surface resistance value of about 450 Ω/sq. The crystal grain size of the transparent electroconductive layer observed by TEM was from 50 to 200 nm.

Figure 22:
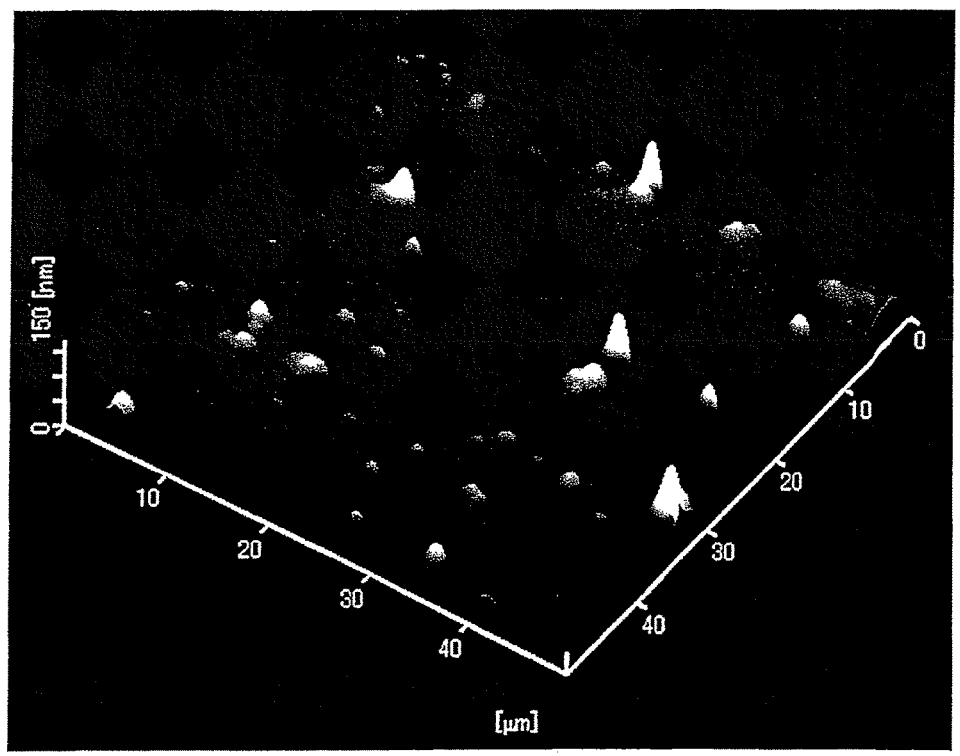
FIG. 22 A view showing the result of observation by AFM of the surface morphology of the transparent electroconductive laminates of Reference Example 1.

The characteristics of the produced transparent electroconductive laminate are shown in Table C1. FIG. 22 shows the result of observation by AFM of the surface morphology of the transparent electroconductive laminate of this example.

Reference Examples 2 to 4

Coating Solution X2 was prepared in the same manner as in Reference Example 1, except that the amount of the silica ultrafine particles added was changed in the preparation of Coating Solution X2. An optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Examples 5 and 6

Optical interference layers were formed by applying Coating Solution X2 on the polycarbonate film by the same method as in Reference Example 1, except for changing the film thickness to about 30 nm and 1,000 nm, respectively.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Example 7

Coating Solution X2 was prepared in the same manner as in Reference Example 1 except that silica ultrafine particles having an average primary particle diameter of 50 nm (in the Table, "$SiO_2$-2") were used in the preparation of Coating Solution X2. An optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Example 8

A polycarbonate film (C110-100, produced by Teijin Chemicals, Ltd.) was used as the transparent organic polymer substrate, and Coating Solution Y2 described below was coated by a wire bar on one surface of the film and heat-treated at 130° C. for 5 minutes to form an optical interference layer having a film thickness of about 50 nm. (Coating Solution Y1)

200 parts by mass of tetrabutoxy titanate ("B-4", trade name, produced by Nippon Soda Co., Ltd.) was diluted with a 1:4 mixed solvent of ligroin (first grade, produced by Wako Pure Chemical Industries, Ltd.) and butanol (guaranteed grade, produced by Wako Pure Chemical Industries, Ltd.). To the resulting solution, an isopropyl alcohol solution containing 0.33 parts by mass (0.17 parts by mass of ultrafine particles per 100 parts by mass of resin monomers charged, and 0.7 parts by mass of ultrafine particles per 100 parts by mass of cured resin component after curing) of surface-unmodified titanium oxide ultrafine particles having an average primary particle diameter of 20 nm (in the Table, "$TiO_2$") was further added, and the mixture was stirred for 10 minutes to prepare Coating Solution Y1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Example 9

A polycarbonate film (C110-100, produced by Teijin Chemicals, Ltd.) was used as the transparent organic polymer substrate, and a clear hardcoat layer having a film thickness of 4 μm was formed on one surface of the film by using an ultraviolet-curable polyfunctional acrylate resin coating material. On the clear hardcoat layer, an optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Example 10

A polyester film ("Teijin Tetron Film", OFW-188, produced by Teijin DuPont Films Japan Limited) was used as the transparent organic polymer substrate, and a clear hardcoat layer having a film thickness of 4 μm was formed on one surface of the film by using an ultraviolet-curable polyfunctional acrylate resin coating material. On the clear hardcoat layer, an optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C1.

Reference Comparative Example 1

A polycarbonate film (C110-100, produced by Teijin Chemicals, Ltd.) was used as the transparent organic polymer substrate, and an ITO layer was formed and crystallized directly on one surface of the film in the same manner as in Reference Example 1. The obtained ITO film had the same surface resistance value and crystal grain size as those of the ITO film of Reference Example 1. The characteristics of the produced transparent electroconductive laminate are shown in Table C2.

Reference Comparative Example 2

Coating Solution X2 was prepared in the same manner as in Reference Example 1 except that the ultrafine particles were not added in the preparation of Coating Solution X2. An optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C2.

Comparative Reference Examples 3 to 5

A polycarbonate film (C110-100, produced by Teijin Chemicals, Ltd.) was used as the transparent organic polymer substrate. An optical interference layer having a film thickness of about 50 nm was formed on one surface of the film by using an isopropyl alcohol solution containing, respectively, 0.7 parts by mass, 20 parts by mass and 40 parts by mass of silica ultrafine particles having an average primary particle diameter of 20 nm per 200 parts by mass of an ultraviolet-curable polyfunctional acrylate resin coating material (resin component: 50%).

Subsequently, an ITO layer was formed and crystallized in the same manner as in Reference Example 1. The obtained ITO film had the same surface resistance value and crystal grain size as those of the ITO film of Reference Example 1. The Characteristics of the Produced transparent electroconductive laminate are shown in Table C2.

Comparative Reference Example 6

A polycarbonate film (C110-100, produced by Teijin Chemicals, Ltd.) was used as the transparent organic polymer substrate, and Coating Solution Z described below was coated by a wire bar on one surface of the film and heat-treated at 130° C. for 5 minutes to form an optical interference layer having a film thickness of about 50 nm.

(Coating Solution Z2)

720 parts by mass of water, 1,080 parts by mass of 2-propanol, and 46 parts by mass of acetic acid were mixed, and then 480 parts by mass of 3-glycidoxypropyltrimethoxysilane ("KBM403", trade name, produced by the Shin-Etsu Chemical Co., Ltd.), 240 parts by mass of methyltrimethoxysilane ("KBM13", trade name, produced by the Shin-Etsu Chemical Co., Ltd.), and 120 parts by mass of N-2-(aminoethyl)-3-aminopropyltrimethoxysilane ("KBM603", trade name, produced by the Shin-Etsu Chemical Co., Ltd.) were sequentially mixed thereto to produce an alkoxysilane mixed solution. This alkoxysilane mixed solution was stirred for 3 hours to perform hydrolysis and partial condensation, and further diluted with a mixed solvent of isopropyl alcohol and 1-methoxy-2-propanol in a mass ratio of 1:1. To the resulting solution, an isopropyl alcohol solution containing 4 parts by mass (0.5 parts by mass of ultrafine particles per 100 parts by mass of resin monomers charged, and 0.7 parts by mass of ultrafine particles per 100 parts by mass of cured resin component after curing) of surface-unmodified titanium oxide ultrafine particles having an average primary particle diameter of 20 nm was further added, and the mixture was stirred for 10 minutes to prepare Coating Solution Z2.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C2.

Reference Comparative Examples 7 to 10

Coating Solution X2 was prepared in the same manner as in Reference Example 1 except that the amount of the silica ultrafine particles added was changed in the preparation of Coating Solution X2. An optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C2.

Reference Comparative Example 11

Coating Solution X2 was prepared in the same manner as in Reference Example 1 except that 4 parts by mass of silica fine particles having an average particle diameter of 0.5 μm (in the Table, "$SiO_2$-3") was added in the preparation of Coating Solution X2. An optical interference layer having a film thickness of about 50 nm was formed in the same manner as in Reference Example 1.

Subsequently, an ITO layer was formed and crystallized in the same manner as in Reference Example 1. The obtained ITO film had the same surface resistance value and crystal grain size as those of the ITO film of Reference Example 1. The characteristics of the produced transparent electroconductive laminate are shown in Table C2. The transparent electroconductive laminate of this example had a surface profile which has protrusions having a height of more than 300 nm were sparsely present.

TABLE C1

|  |  |  | Reference Example 1 | Reference Example 2 | Reference Example 3 | Reference Example 4 | Reference Example 5 |
|---|---|---|---|---|---|---|---|
| Substrate |  |  | PC | PC | PC | PC | PC |
| Cured resin layer | Resin | Kind | silicon-based | silicon-based | silicon-based | silicon-based | silicon-based |
|  |  | Ratio (parts by mass) | 100 | 100 | 100 | 100 | 100 |
|  | Ultrafine particles | Kind | $SiO_2$-1 | $SiO_2$-1 | $SiO_2$-1 | $SiO_2$-1 | $SiO_2$-1 |
|  |  | Average primary particle diameter (nm) | 20 | 20 | 20 | 20 | 20 |
|  |  | Ratio (parts by mass) | 0.7 | 0.07 | 0.02 | 2.5 | 0.7 |
|  | Thickness (nm) |  | 50 | 50 | 50 | 50 | 30 |
| Evaluation results | Roughness Ra (nm) |  | 6.8 | 4.5 | 4.5 | 15 | 6.5 |
|  | Number of protrusions (pieces/50 μm square) |  | 67 | 26 | 26 | 245 | 63 |
|  | Haze (%) |  | 0.3 | 0.3 | 0.3 | 0.6 | 0.3 |
|  | Total light transmittance (%) |  | 90.0 | 90.1 | 90.1 | 90.0 | 89.5 |
|  | Lubricity(A/C) |  | A | A | A | A | A |
|  | Writing durability test (A/C) |  | AA | AA | A | A | AA |

|  |  |  | Reference Example 6 | Reference Example 7 | Reference Example 8 | Reference Example 9 | Reference Example 10 |
|---|---|---|---|---|---|---|---|
| Substrate |  |  | PC | PC | PC | PC (with hardcoat layer) | PET (with hardcoat layer) |
| Cured resin layer | Resin | Kind | silicon-based | silicon-based | titanium-based | silicon-based | silicon-based |
|  |  | Ratio (parts by mass) | 100 | 100 | 100 | 100 | 100 |
|  | Ultrafine particles | Kind | $SiO_2$-1 | $SiO_2$-2 | $TiO_2$ | $SiO_2$-1 | $SiO_2$-1 |
|  |  | Average primary particle diameter (nm) | 20 | 50 | 20 | 20 | 20 |
|  |  | Ratio (parts by mass) | 0.7 | 0.7 | 0.7 | 0.7 | 0.7 |
|  | Thickness (nm) |  | 1000 | 50 | 50 | 50 | 50 |
| Evaluation results | Roughness Ra (nm) |  | 8.2 | 5.8 | 18 | 6.4 | 7.3 |
|  | Number of protrusions (pieces/50 μm square) |  | 85 | 70 | 25 | 72 | 78 |
|  | Haze (%) |  | 0.4 | 0.3 | 1.4 | 0.3 | 0.8 |
|  | Total light transmittance (%) |  | 89.0 | 90.1 | 88.2 | 89.1 | 88.7 |
|  | Lubricity(A/C) |  | A | A | A | A | A |
|  | Writing durability test (A/C) |  | A | B | AA | AA | AA |

TABLE C2

|  |  |  | Comparative Reference Example 1 | Comparative Reference Example 2 | Comparative Reference Example 3 | Comparative Reference Example 4 | Comparative Reference Example 5 |
|---|---|---|---|---|---|---|---|
| Substrate |  |  | PC | PC | PC | PC | PC |
| Cured resin layer | Resin | Kind | — | silicon-based | acrylic | acrylic | acrylic |
|  |  | Ratio (parts by mass) | — | 100 | 100 | 100 | 100 |
|  | Ultrafine particles | Kind | — | — | $SiO_2$-1 | $SiO_2$-1 | $SiO_2$-1 |
|  |  | Average primary particle diameter (nm) | — | — | 20 | 20 | 20 |
|  |  | Ratio (parts by mass) | — | — | 0.7 | 20 | 40 |
|  | Thickness (nm) |  | — | 50 | 50 | 50 | 50 |
| Evaluation results | Roughness Ra (nm) |  | 2.8 | 3.2 | 3.1 | 3.8 | 3.6 |
|  | Number of protrusions (pieces/50 μm square) |  | 5 | 6 | 5 | 6 | 4 |
|  | Haze (%) |  | 0.1 | 0.1 | 0.1 | 0.2 | 0.2 |
|  | Total light transmittance (%) |  | 88.0 | 89.7 | 89.3 | 89.1 | 89.1 |
|  | Lubricity(A/C) |  | C | C | C | C | C |
|  | Writing durability test (A/C) |  | C (100,000 times or less) | C (100,000 times or less) | C (100,000 times or less) | C (100,000 times or less) | C (100,000 times or less) |

|  |  |  | Comparative Reference Example 6 | Comparative Reference Example 7 | Comparative Reference Example 8 | Comparative Reference Example 9 | Comparative Reference Example 10 | Comparative Reference Example 11 |
|---|---|---|---|---|---|---|---|---|
| Substrate |  |  | PC | PC | PC | PC | PC | PC |
| Cured resin layer | Resin | Kind | silicon-based | silicon-based | silicon-based | silicon-based | silicon-based | silicon-based |
|  |  | Ratio (parts by mass) | 100 | 100 | 100 | 100 | 100 | 100 |
|  | Ultrafine | Kind | $TiO_2$ | $SiO_2$-1 | $SiO_2$-1 | $SiO_2$-1 | $SiO_2$-1 | $SiO_2$-3 |

TABLE C2-continued

| | | | | | | | | |
|---|---|---|---|---|---|---|---|---|
| | particles | Average primary particle diameter (nm) | 30 | 20 | 20 | 20 | 20 | 500 |
| | | Ratio (parts by mass) | 0.7 | 0.007 | 10 | 20 | 40 | 0.7 |
| | Thickness (nm) | | 50 | 50 | 50 | 50 | 50 | 50 |
| Evaluation results | Roughness Ra (nm) | | 3.4 | 3.5 | 15.6 | 16.8 | 17.8 | 8.8 |
| | Number of protrusions (pieces/50 μm square) | | 6 | 9 | 368 | >500 | >500 | 8 |
| | Haze (%) | | 0.1 | 0.1 | 2.8 | 3.8 | 4.6 | 1.1 |
| | Total light transmittance (%) | | 89.3 | 89.3 | 87.9 | 87.7 | 87.4 | 88.7 |
| | Lubricity(A/C) | | C | C | A | A | A | A |
| | Writing durability test (A/C) | | C (100,000 times or less) | C (300,000 times or less) | A | B | C (300,000 times or less) | C (200,000 times or less) |

As apparent from Table C1, the touch panels using the transparent electroconductive laminates of Reference Examples has a low haze and, at the same time, an excellent writing (sliding) durability. In contrast, as apparent from Table C2, the touch panels using the transparent electroconductive laminates of Reference Comparative Examples 1 to 7, have a poor lubricity and insufficient writing durability, but have a low haze. Also, as apparent from Table C2, the touch panels using the transparent electroconductive laminates of Reference Comparative Examples 8 to 10 have an excellent writing (sliding) durability, but have a high haze and poor optical characteristics. Furthermore, as apparent from Table C2, the touch panel using the transparent electroconductive laminate of Reference Comparative Example 11 has a relatively low haze, but has a poor writing durability.

DESCRIPTION OF NUMERICAL REFERENCES

11 Substrate (glass plate)
12, 14 Transparent electroconductive layer
13 Spacer
15 Optical interference layer
16 Transparent organic polymer substrate
20 Transparent touch panel
30, 130 Transparent electroconductive laminate of the present invention
30a, b Conventional transparent electroconductive laminate
31, 131 Transparent electroconductive layer
32, 132 Optical interference layer
33h Hardcoat layer
33, 133 Transparent organic polymer substrate

The invention claimed is:

1. A transparent electroconductive laminate for a transparent touch panel,
wherein the laminate comprises a transparent organic polymer substrate which has, on at least one surface thereof, a cured resin layer, and a transparent electroconductive layer in this order, and
wherein, with respect to the reflection spectrum measured by projecting light having a wavelength of 450 to 700 nm from the transparent electroconductive layer side of the transparent electroconductive laminate, the difference spectrum between the reflection spectrum of the transparent electroconductive laminate and the reflection spectrum obtained when the transparent electroconductive layer is removed from the transparent electroconductive laminate satisfies following conditions (B-a1) and (B-a2):
(B-a1) the maximum absolute value of the difference spectrum is 2.0% or less, and
(B-a2) the integrated value of the difference spectrum is from −150 nm·% to 150 nm·%,
wherein the transparent electroconductive layer is disposed only on a part of the cured resin layer to form a patterned transparent electroconductive layer, and
wherein the cured resin layer has a refractive index of 1.55 or more and 1.628 or less.

2. The transparent electroconductive laminate according to claim 1,
wherein the laminate comprises a transparent organic polymer substrate which has, on at least one surface thereof, a hardcoat layer, the cured resin layer, and the transparent electroconductive layer in this order, and
wherein the laminate satisfies the following conditions (A-a) to (A-f):
(A-a) with respect to light having a wavelength of 550 nm, the refractive index n3 of the transparent organic polymer substrate and the refractive index n3h of the hardcoat layer satisfy the following formula:

$$|n_3 - n_{3h}| \leq 0.02$$

(A-b) the thickness of the hardcoat layer is from 1 to 10 μm,
(A-c) the thickness of the cured resin layer is from 5 to 500 nm,
(A-d) the thickness of the transparent electroconductive layer is from 5 to 200 nm,
(A-e) the total light transmittance is 85% or more, and
(A-f) the chromaticness index b* value of the L*a*b* color system is from −1.0 to less than 1.5.

3. The transparent electroconductive laminate according to claim 2, wherein the cured resin layer has a refractive index of 1.628.

4. The transparent electroconductive laminate according to claim 1, wherein following conditions (B-b1) to (B-b3) are further satisfied, assuming that the refractive index of the transparent organic polymer substrate is $n_3$, the thickness and refractive index of the cured resin layer are $d_2$ (nm) and $n_2$, respectively, and the thickness and refractive index of the transparent electroconductive layer are $d_1$ (nm) and $n_1$, respectively:

$$n_1 > n_2 > n_3, \quad \text{(B-b1)}$$

$$0.44 < n_2/(n_1+n_3) < 0.49, \quad \text{(B-b2)}$$

and $$245 < n_2 d_2/(n_1 d_1)^{-0.12} < 275. \quad \text{(B-b3)}$$

5. The transparent electroconductive laminate according to claim 1, wherein the laminate further satisfies following conditions (B-c) to (B-f):
(B-c) the cured resin layer contains a resin component and first ultrafine particles having an average primary particle diameter of 1 to 100 nm, (B-d) the resin component and the first ultrafine particles contain the same metal and/or metalloid element, (B-e) in the cured resin layer, the content of the first ultrafine particles is from 0.01 to 3 parts by mass per 100 parts by mass of the resin component, and (B-f) the thickness of the cured resin layer is from 0.01 to 0.5 μm.

6. The transparent electroconductive laminate according to claim 5, wherein (B-g) the cured resin layer further contains second ultrafine particles having an average primary particle diameter of 1 to 100 nm and having a refractive index larger than that of the resin component.

7. The transparent electroconductive laminate according to claim 6, wherein the cured resin layer contains the second ultrafine particles, and thereby the refractive index of the cured resin layer is increased by 0.01 or more, in comparison with the cured resin layer not containing the second ultrafine particles.

8. The transparent electroconductive laminate according to claim 5, wherein the transparent electroconductive layer has from 10 to 300 protrusions having a height of 30 to 200 nm per 50 μm square.

9. The transparent electroconductive laminate according to claim 5, wherein the surface roughness Ra of the transparent electroconductive layer is 20 nm or less.

10. The transparent electroconductive laminate according to claim 5, wherein the metal and/or metalloid element is/are one or more elements selected from the group consisting of Al, Bi, Ca, Hf, In, Mg, Sb, Si, Sn, Ti, Y, Zn and Zr.

11. The transparent electroconductive laminate according to claim 5, wherein an adhesive layer is provided between the transparent electroconductive layer and the cured resin layer, and wherein all of the adhesive layer, the resin component of the cured resin layer, and the ultrafine particles of the cured resin layer contain the same metal and/or metalloid element.

12. The transparent electroconductive laminate according to claim 1, wherein the laminate has the total light transmittance of 85% or more and a haze of 2% or less.

13. The transparent electroconductive laminate according to claim 1, wherein the laminate comprises an additional cured resin layer between the transparent organic polymer substrate and the cured resin layer.

14. The transparent electroconductive laminate according to claim 13, wherein the additional cured resin layer has the surface roughness Ra of from 20 nm to less than 500 nm.

15. A capacitance-type transparent touch panel, comprising at least one transparent electrode substrate each having a transparent electroconductive layer on at least one surface thereof, wherein the transparent electroconductive laminate according to claim 1 is used as at least one transparent electrode substrate.

16. The transparent touch panel according to claim 15, wherein, on the observation side of the transparent touch panel, a polarizing plate is stacked on the transparent electroconductive laminate directly or through another substrate.

17. A resistant film-type transparent touch panel, comprising two transparent electrode substrates each having a transparent electroconductive layer on at least one surface thereof, and disposed by arranging respective transparent electroconductive layers to face each other, wherein the transparent electroconductive laminate according to claim 1 is used as at least one of the transparent electrode substrates.

18. The transparent electroconductive laminate according to claim 1, wherein the laminate comprises a transparent organic polymer substrate which has, on at least one surface thereof, a cured resin layer directly formed on the transparent organic polymer substrate, and a transparent electroconductive layer directly formed on the cured resin layer, wherein the transparent organic polymer substrate is a polycarbonate transparent organic polymer substrate.

19. The transparent electroconductive laminate according to claim 1, wherein the laminate consists of a transparent organic polymer substrate which has, on at least one surface thereof, a cured resin layer, and a transparent electroconductive layer in this order, wherein the transparent organic polymer substrate is a polycarbonate transparent organic polymer substrate.

20. The transparent electroconductive laminate according to claim 1, wherein the laminate consists of a transparent organic polymer substrate which has, on only one surface thereof, a cured resin layer, and a transparent electroconductive layer in this order, wherein the transparent organic polymer substrate is a polycarbonate transparent organic polymer substrate.

21. The transparent electroconductive laminate according to claim 1, wherein the cured resin layer has a refractive index of 1.60 or more and 1.628 or less.

* * * * *